United States Patent
Cirik et al.

(10) Patent No.: US 11,025,331 B2
(45) Date of Patent: Jun. 1, 2021

(54) TIMING IN BEAM FAILURE RECOVERY PROCEDURE

(71) Applicants: Ali Cagatay Cirik, Herndon, VA (US); Esmael Dinan, McLean, VA (US); Hua Zhou, Herndon, VA (US); Hyoungsuk Jeon, Centreville, VA (US); Alireza Babaei, Fairfax, VA (US)

(72) Inventors: Ali Cagatay Cirik, Herndon, VA (US); Esmael Dinan, McLean, VA (US); Hua Zhou, Herndon, VA (US); Hyoungsuk Jeon, Centreville, VA (US); Alireza Babaei, Fairfax, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 16/366,706

(22) Filed: Mar. 27, 2019

(65) Prior Publication Data

US 2019/0306867 A1 Oct. 3, 2019

Related U.S. Application Data

(60) Provisional application No. 62/650,739, filed on Mar. 30, 2018, provisional application No. 62/650,814, filed on Mar. 30, 2018.

(51) Int. Cl.
*H04B 7/08* (2006.01)
*H04W 76/38* (2018.01)
(Continued)

(52) U.S. Cl.
CPC ........... *H04B 7/088* (2013.01); *H04B 7/0639* (2013.01); *H04L 5/0023* (2013.01);
(Continued)

(58) Field of Classification Search
CPC ..... H04B 7/088; H04B 7/0639; H04L 5/0023; H04W 76/19; H04W 72/042;
(Continued)

(56) References Cited

U.S. PATENT DOCUMENTS

2018/0278467 A1* 9/2018 John Wilson ....... H04W 72/046
2018/0279145 A1 9/2018 Jung et al.
(Continued)

FOREIGN PATENT DOCUMENTS

WO 2018031327 2/2018
WO 2018085145 5/2018
(Continued)

OTHER PUBLICATIONS

R1-1800242_CATT; 3GPP TSG RAN WG1 Meeting AH 1801; Vancouver, Canada, Jan. 22-26, 2018; ; Source:CATT; Title:Remaining issues on DL beam recovery; Agenda Item:7.2.2.4;.
(Continued)

*Primary Examiner* — Rownak Islam
(74) *Attorney, Agent, or Firm* — David Grossman; Kavon Nasabzadeh; Philip Smith

(57) ABSTRACT

A wireless device receives one or more messages comprising configuration parameters. The configuration parameters indicate: a plurality of bandwidth parts (BWPs) comprising a first BWP and a second BWP; and a timer value for a BWP inactivity timer. The BWP inactivity timer associated with the timer value starts in response to switching to the first BWP as an active BWP. A beam failure recovery procedure is initiated based on reaching a number of beam failure instance indications for the first BWP. Based on an expiry of the BWP inactivity timer during the beam failure recovery procedure: the beam failure recovery procedure for the first BWP is aborted; and the active BWP is switched from the first BWP to the second BWP.

18 Claims, 50 Drawing Sheets

(51) Int. Cl.
| | |
|---|---|
| H04W 76/11 | (2018.01) |
| H04B 7/06 | (2006.01) |
| H04W 74/00 | (2009.01) |
| H04W 74/08 | (2009.01) |
| H04W 36/00 | (2009.01) |
| H04L 5/00 | (2006.01) |
| H04W 72/00 | (2009.01) |
| H04W 72/08 | (2009.01) |
| H04W 72/04 | (2009.01) |
| H04W 76/19 | (2018.01) |

(52) U.S. Cl.
CPC ..... *H04W 36/0069* (2018.08); *H04W 72/005* (2013.01); *H04W 72/042* (2013.01); *H04W 72/0453* (2013.01); *H04W 72/085* (2013.01); *H04W 74/006* (2013.01); *H04W 74/0833* (2013.01); *H04W 76/11* (2018.02); *H04W 76/19* (2018.02); *H04W 76/38* (2018.02); *H04W 74/0866* (2013.01)

(58) Field of Classification Search
CPC ............. H04W 76/11; H04W 72/0453; H04W 72/085; H04W 36/0069; H04W 76/38; H04W 72/005; H04W 74/006; H04W 74/0833; H04W 74/0866
See application file for complete search history.

(56) References Cited

U.S. PATENT DOCUMENTS

| | | | |
|---|---|---|---|
| 2018/0324867 A1 | 11/2018 | Basu Mallick et al. | |
| 2019/0020506 A1 | 1/2019 | Cheng et al. | |
| 2019/0052339 A1* | 2/2019 | Zhou | H04L 27/2692 |
| 2019/0166555 A1* | 5/2019 | Cheng | H04W 72/14 |
| 2019/0200396 A1* | 6/2019 | Agiwal | H04W 72/14 |
| 2019/0230730 A1* | 7/2019 | Wang | H04W 76/19 |
| 2019/0281480 A1* | 9/2019 | Wei | H04B 7/06 |
| 2020/0177263 A1* | 6/2020 | Zhang | H04W 74/02 |

FOREIGN PATENT DOCUMENTS

| | | |
|---|---|---|
| WO | 2018128426 | 7/2018 |
| WO | 2018174632 | 9/2018 |
| WO | 2018202188 | 11/2018 |
| WO | 2018204922 | 11/2018 |
| WO | 2018231621 | 12/2018 |
| WO | 2018232090 | 12/2018 |
| WO | 2018232259 | 12/2018 |

OTHER PUBLICATIONS

R1-1800661 Docomo; 3GPP TSG RAN WG1 Meeting AH 1801; Vancouver, Canada, Jan. 22-26, 2018; ; Source:NTT Docomo; Title:Remaining issues on beam recovery; Agenda Item:7.2.2.4.
R1-1801722_CATT; 3GPP TSG RAN WG1 Meeting #92; Athens, Greece, Feb. 26-Mar. 2, 2018 ; ; Source:CATT; Title:Remaining issues on DL beam failure recovery; Agenda Item:7.1.2.2.4.
R1-1802397_Intel Read; 3GPP TSG RAN WG1 Meeting #92; Athens, Greece, Feb. 26-Mar. 2, 2018 ; ; Source: Intel Corporation; Title:Remaining Issues on Beam Failure Recovery; Agenda item:7.1.2.24.
R1-1802472_NTT Read; 3GPP TSG RAN WG1 Meeting #92; Athens, Greece, Feb. 26-Mar. 2, 2018; ; Source:NTT Docomo; Title:Remaining issues on beam recovery; Agenda Item:7.1.2.2.4.
R1-1802744_Ericsson; 3GPP TSG RAN WG1 Meeting #92; Athens, Greece, Feb. 26-Mar. 2, 2018; ; Source:Ericsson; Title:Remaining details on beam recovery; Agenda Item:7.1.2.2.4.
R1-1802824_Qualcomm_READ; 3GPP TSG RAN WG1 Meeting #92 ; Athens, Greece, Feb. 26-Mar. 2, 2018 ; ; Agenda item:7.1.2.2.4; Source:Qualcomm Incorporated; Title: Beam recovery procedures.

R2-1800049_Asustek_read; 3GPP TSG-RAN WG2 Meeting #AH-1801 ; Vancouver, Canada, Jan. 22-26, 2018 ; ; Agenda Item:10.3.1.13; Source: ASUSTeK; Title:UE behaviours upon beam failure and recovery.
R2-1800160 CATT; 3GPP TSG-RAN WG2 NR Ad hoc 0118; Vancouver, Canada, Jan. 22-Jan. 26, 2018; ; Source:CATT ; Title:BWP for Beam Failure Recovery; Agenda Item:10.3.1.4.2.
R2-1800254 CATT_read; 3GPP TSG-RAN WG2 NR Ad hoc 0118; Vancouver, Canada, Jan. 22-Jan. 26, 2018; ; Source:CATT ; Title:RA Procedure and Parameters for BFR; Agenda Item:10.3.1.4.2.
R2-1800632 Huawei; 3GPP TSG-RAN WG2 Ad Hoc ; Vancouver, Canada,Jan. 22-Jan. 26, 2018; ; Agenda item:10.2.2.1; Source: Huawei, HiSilicon; Title: Remaining issue or beam failure recovery.
R2-1800822_Spreadtrum_read; 3GPP TSG-RAN WG2 NR Ad Hoc ; Vancouver, Canada, Jan. 22-26, 2018; CR-Form-v11.2; ; Change Request.
R2-1800895_VIVO; 3GPP TSG-RAN WG2 NR Ad hoc 1801 R2-1800895 Vancouver, Canada, Jan. 22-26, 2018 ; ; Source:vivo; Title:Discussion on the impact on beam failure recovery; Agenda Item:10.3.1.4.3.
R2-1801009 Huawei; 3GPP TSG-RAN2 Meeting #AH-1801; Vancouver, Canada, Jan. 22-26, 2018; Agenda Item:10.3.1.4.3; Source: Huawei, HiSilicon; Title: General consideration on RA procedure for beam failure recovery; Document for:Discussion and decision.
R2-1801049 Huawei; 3GPP TSG-RAN WG2#AH-1801; Vancouver, Canada, Jan. 22-26, 2018; ; Source: Huawei, HiSilicon; Title: non-contention based random access for beam failure recovery in CA; Agenda Item:10.3.1.4.3.
R2-1801404 Docomo; 3GPP TSG-RAN WG2 NR Ad hoc 1801 ; Vancouver, Canada, Jan. 22-Jan. 26, 2018; Source:NTT Docomo, Inc.; Title:Discussion on Beam failure recovery; Document for:Discussion and decisions; Agenda Item: 10.3.1.4.3.
R2-1801814_Huawei; 3GPP TSG-RAN WG2 #101; Athens, Greece, Feb. 26-Mar. 2, 2018; ; Agenda item:10.3.1.13; Source: Huawei, HiSilicon; Title: Beam failure recovery for SCell.
R2-1801816 Remaining issues for BWP inactivity timer; 3GPP TSG-RAN2 Meeting #101; Athens, Greece, Feb. 26-Mar. 2, 2018; ; Agenda Item:10.3.1.2; Source: Huawei, HiSilicon; Title:Remaining issues for BWP inactivity timer.
R2-1801890; 3GPP TSG-RAN WG2 Meeting #101; Athens, Greece, Feb. 26-Mar. 2, 2018; ; Agenda Item:10.3.1.2; Source: ASUSTeK; Title:Remaining issues on BWP inactivity timer.
R2-1801926_ZTE Read; 3GPP TSG RAN WG2 NR Meeting#101; Athens, Greece, Feb. 26-Mar. 2, 2018; ; Source:ZTE, Sanechips; Title:Remaining Considerations on RACH procedure for BFR; Agenda Item:10.3.1.4.2.
R2-1802001 Restart Scell inactive timer due to configration grant; 3GPP TSG-RAN WG2 Meeting#101; Athens, Greece, Feb. 26-Mar. 2, 2018; ; Source:vivo ; Title:Restart Scell inactive timer due to configuration grant; Agenda Item:10.3.1.2.
R2-1802006_VIVO; 3GPP TSG-RAN WG2 Meeting #101 Athens, Greece, Feb. 26-Mar. 2, 2018 (Resubmission of R2-1800895) ; ; Source:vivo; Title:Discussion on the impact on beam failure recovery; Agenda Item:10.3.1.4.3.
R2-1802141_READ; 3GPP TSG-RAN WG2#101; Athens, Greece, Feb. 26-Mar. 2, 2018; ; Source:CATT; Title:Further consideration on BWP inactivity timer; Agenda Item:10.3.1.2.
R2-1802151_CATT_READ; 3GPP TSG-RAN WG2#101; Athens, Greece, Feb. 26-Mar. 2, 2018; ; Source:CATT ; Title:Beam failure recovery; Agenda Item:10.3.1.4.2.
R2-1802490_CATT+Huawei; 3GPP TSG-RAN WG2 Meeting#101; Athens, Greece, Feb. 26-Mar. 3, 2018; ; Agenda item:10.3.1.4.2; Source: CATT, Huawei, HiSilicon; Title: Discussions on beam failure recovery for CA.
R2-1802545_READ; 3GPP TSG-RAN WG2 Meeting #101; Athens, Greece, Feb. 26-Mar. 2, 2018; Agenda Item:10.3.1.2; Source: Fujitsu; Title:Remaining issue on BWP timer ; Document for:Decision.
R2-1803061_READ; 3GPP TSG-RAN WG2 Meeting #101; Athens, Greece, Feb. 26-Mar. 2, 2018; ; Agenda Item:10.3.1.2; Source:MediaTek Inc.; Title:BWP ambiguity or contention-based RACH procedure.

(56) References Cited

OTHER PUBLICATIONS

R2-1803195_Ericsson; 3GPP TSG-RAN WG2#101Tdoc ; Athens, Greece, Feb. 26-Mar. 2, 2018; ; Agenda Item:10.3.1.4.2; Source:Ericsson; Title:Beam Failure Recovery in SCell.
R2-1803203_READ; 3GPP TSG-RAN WG2 #101Tdoc ; Athens, Greece, Feb. 26-Mar. 2, 2018; ; Agenda Item:10.3.1.4.3; Source:Ericsson; Title:BWP selection and RA.
R2-1803228_READ; 3GPP TSG-RAN WG2 Meeting #101; Athens, Greece, Feb. 26-Mar. 2, 2018; ; ; Agenda item:10.3.1.2; Source:Nokia, Nokia Shanghai Bell.
R2-1803229_Nokia_READ; 3GPP TSG-RAN WG2 Meeting #101; Athens, Greece, Feb. 26-Mar. 2, 2018Revision of R2-1800961; Agenda item:10.3.1.4.2; Source:Nokia, Nokia Shanghai Bell.
3GPP TS 38.211 V15.0.0 (Dec. 2017); 3rd Generation Partnership Project; Technical Specification Group Radio Access Network; NR; Physical channels and modulation; (Release 15).
3GPP TS 38321 V15.0.0 (Dec. 2017); 3rd Generation Partnership Project; Technical Specification Group Radio Access Network; NR; Medium Access Control (MAC) protocol specification (Release 15).
R1-1721346; 3GPP TSG RAN WG1 Meeting #91; Reno, USA, Nov. 27-Dec. 1, 2017; Title: LS to RAN2 on Beam Failure Recovery; Release: Rel-15; Work Item: NR_newRAT-Core; Source: MediaTek [RAN1]; To: RAN2.
Invitation to Pay Additional Fees dated Jul. 4, 2019 in PCT International Application No. PCT/US2019/024329.

* cited by examiner

| Index | LCID values |
|---|---|
| 000000 | CCCH |
| 000001-100000 | Identity of a logical channel |
| 100001-110111 | Reserved |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 18A

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 18B

Receive, by a wireless device, message(s) comprising configuration parameters indicating: BWPs comprising a 1st BWP and a 2nd BWP; and a parameter indicating a 1st period of time
4310

Switch to the 1st BWP as an active BWP
4320

Reach a number of beam failure instance indications for the 1st BWP?
4330

YES

Initiate a beam failure recovery procedure
4340

Receive any DCI for the 1st BWP during the 1st period of time?
4350

No

Switch the 1st BWP to the 2nd BWP as the active BWP during the beam failure recovery procedure
4360

Abort the beam failure recovery procedure for the 1st BWP
4370

FIG. 43

TIMING IN BEAM FAILURE RECOVERY PROCEDURE

CROSS-REFERENCE TO RELATED APPLICATIONS

This application claims the benefit of U.S. Provisional Application No. 62/650,739, filed Mar. 30, 2018, and U.S. Provisional Application No. 62/650,814, filed Mar. 30, 2018, which are hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 18A and FIG. 18B are examples of LCIDs as per an aspect of an embodiment of the present disclosure.

FIG. 43 is a flow diagram of an aspect of an embodiment of the present disclosure.

DETAILED DESCRIPTION OF EMBODIMENTS

Figure 1:
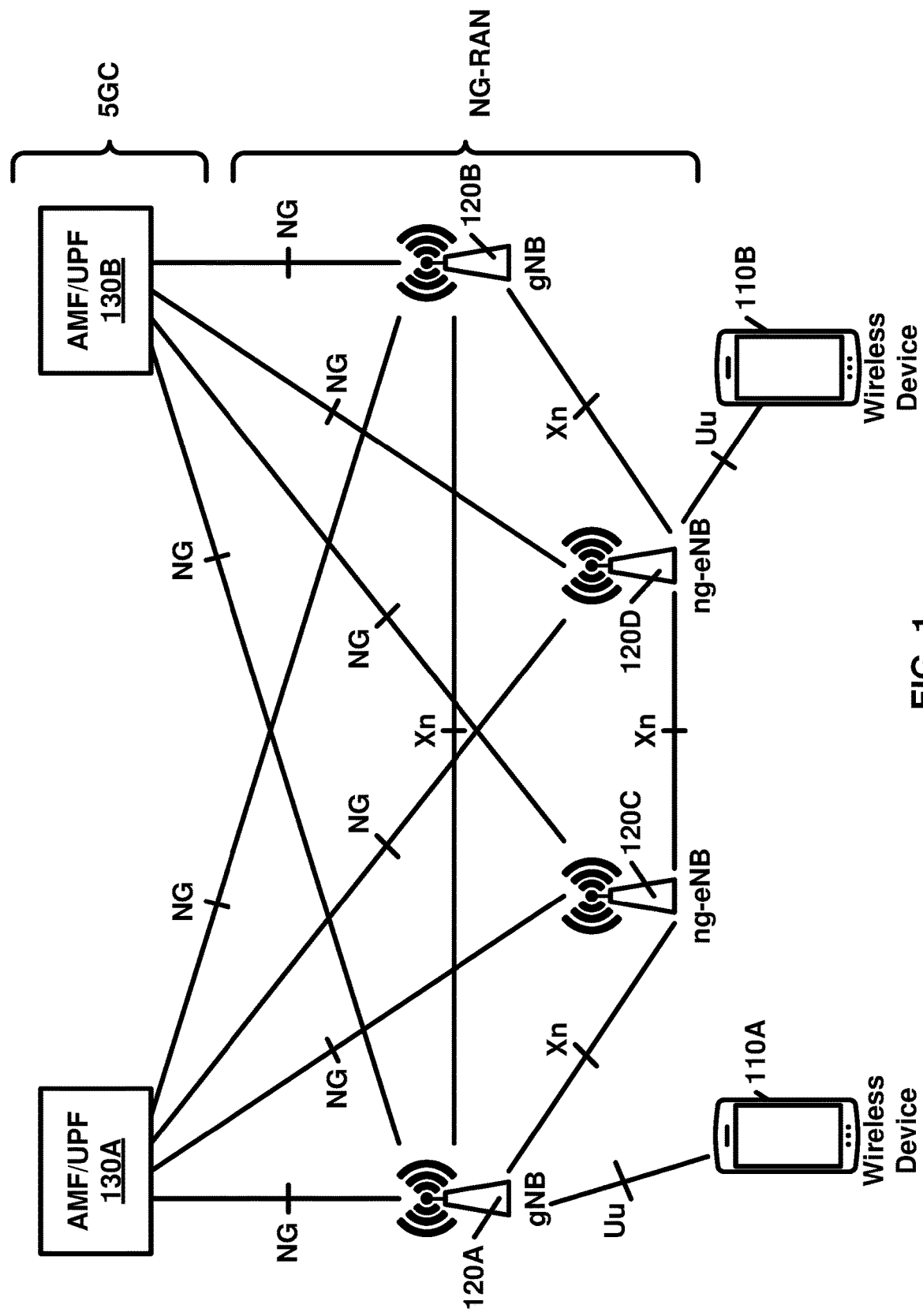
FIG. 1 is a diagram of an example RAN architecture as per an aspect of an embodiment of the present disclosure.

Example embodiments of the present disclosure enable operation of beam failure recovery procedure. Embodiments of the technology disclosed herein may be employed in the technical field of multicarrier communication systems. More particularly, the embodiments of the technology disclosed herein may relate to beam failure recovery procedure in a multicarrier communication system.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
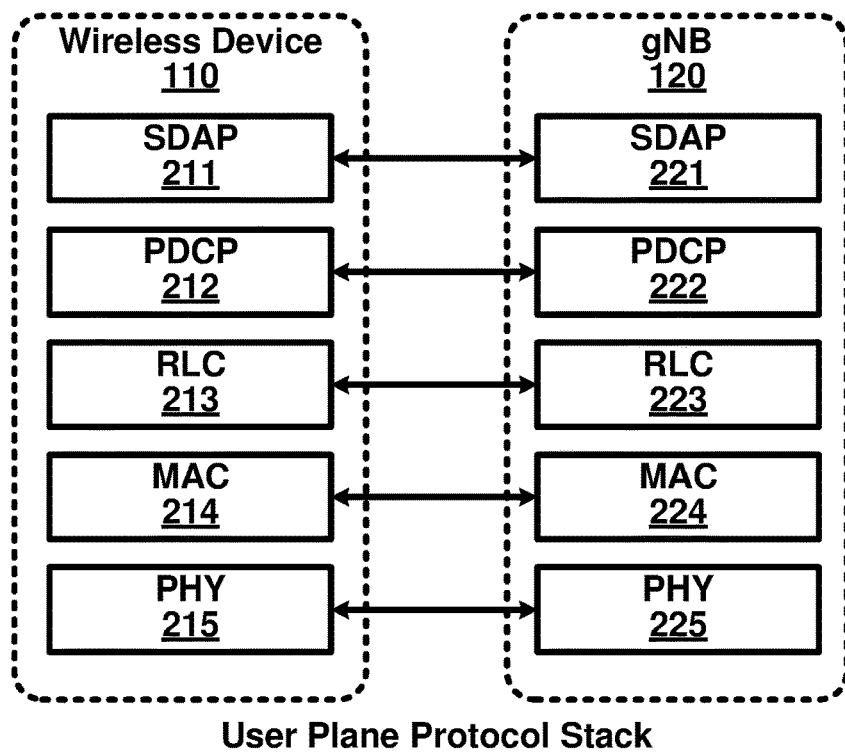
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
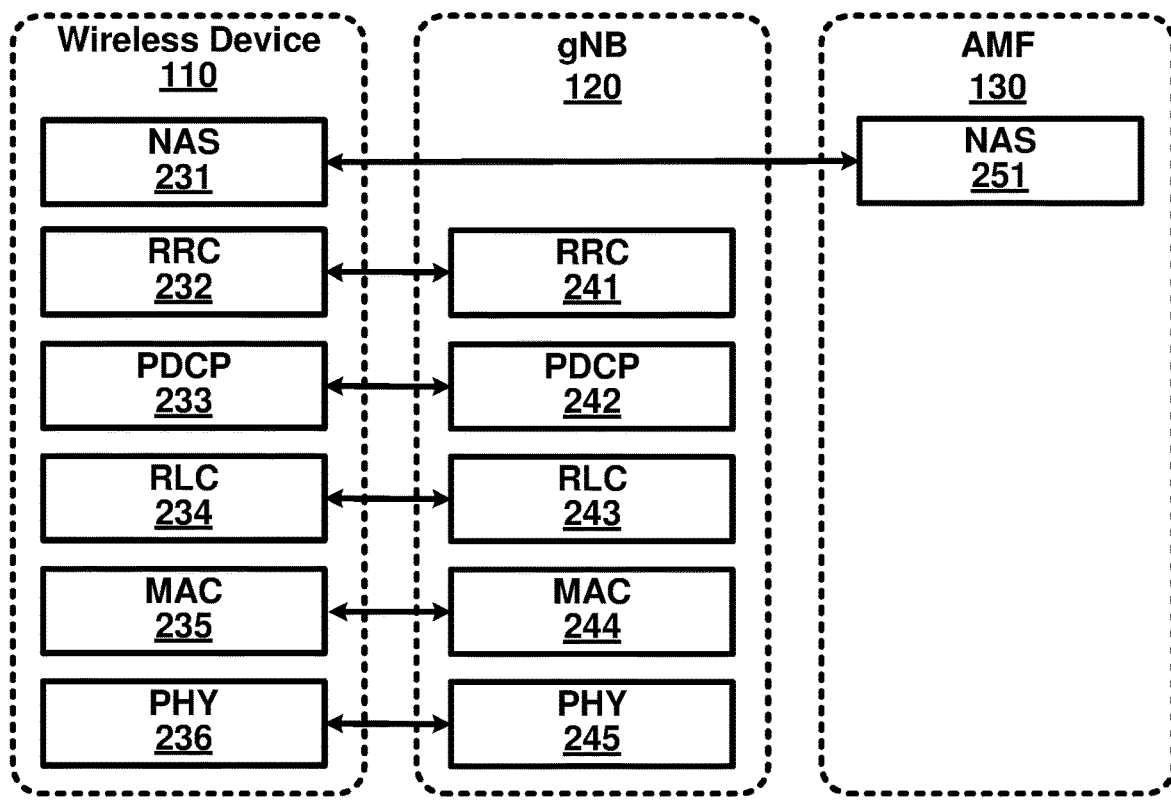
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
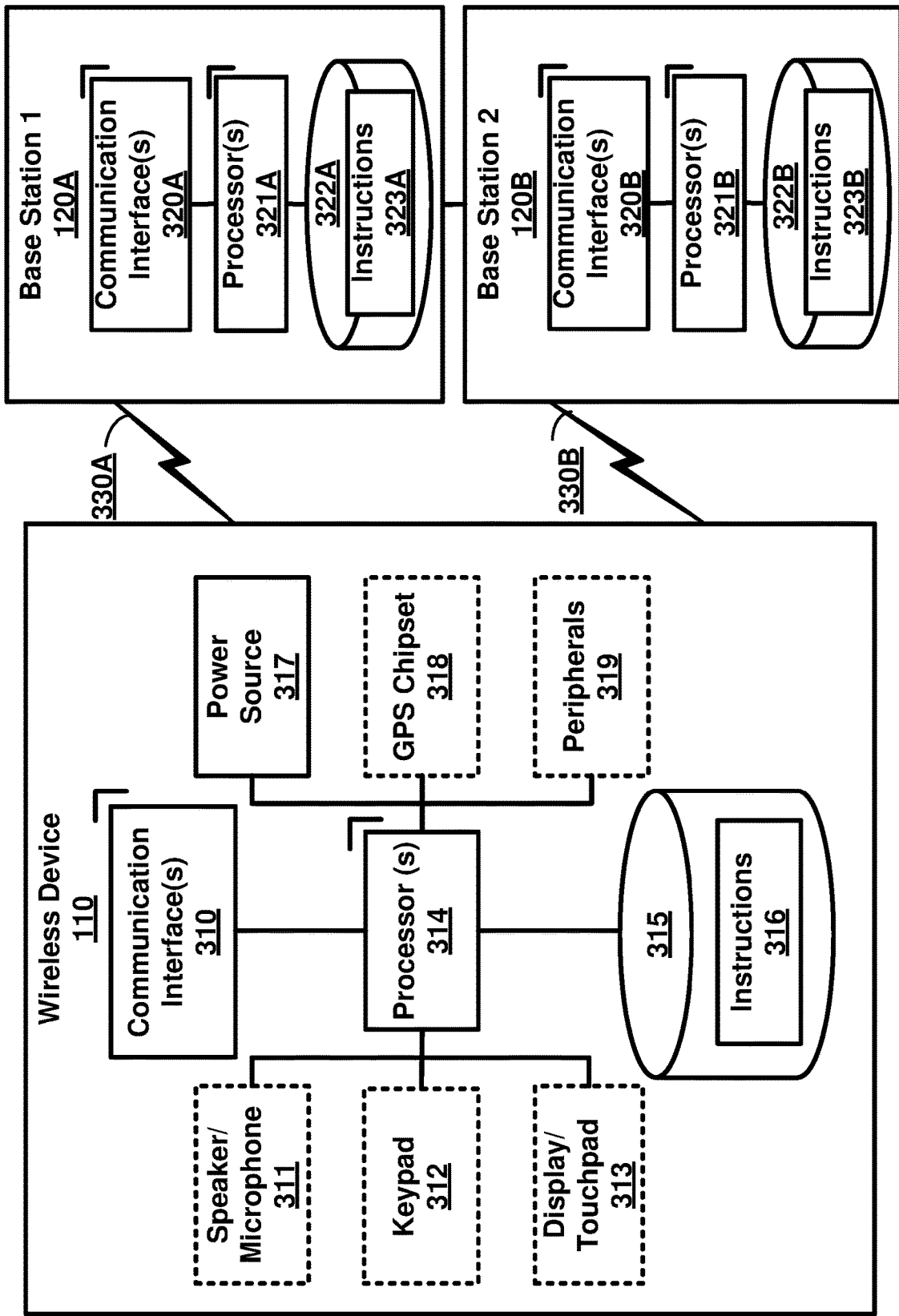
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC-_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

Figure 4A:
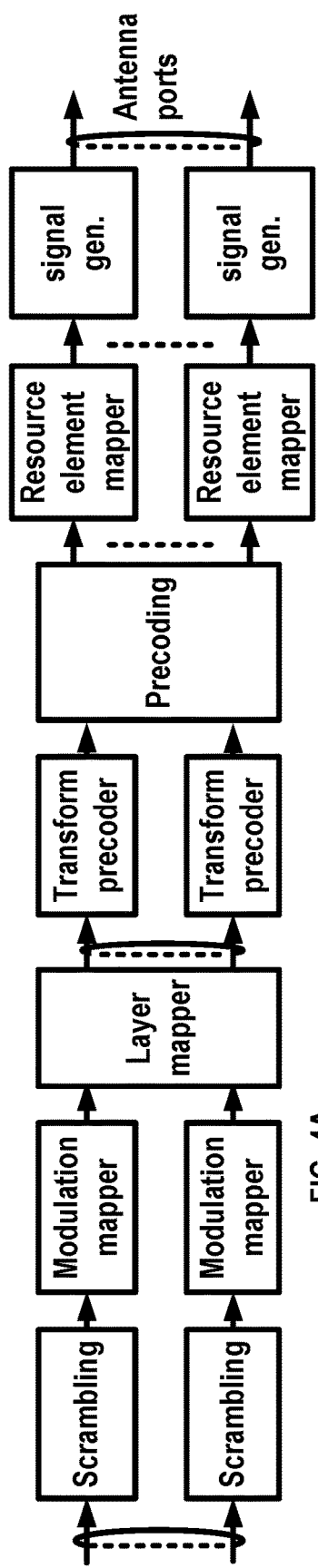
FIG. 4A, FIG. 4B, FIG. 4C and FIG. 4D are example diagrams for uplink and downlink signal transmission as per an aspect of an embodiment of the present disclosure.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

Figure 4B:
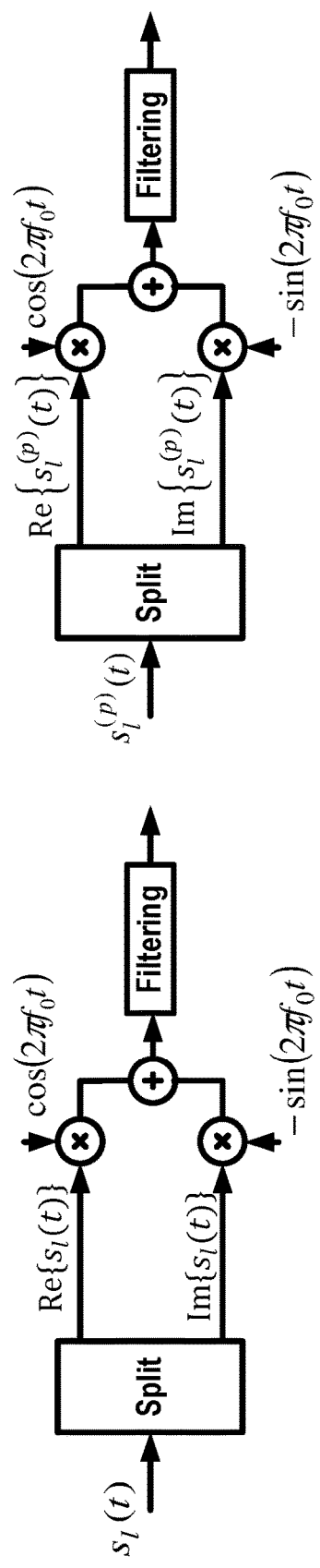

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

Figure 4D:
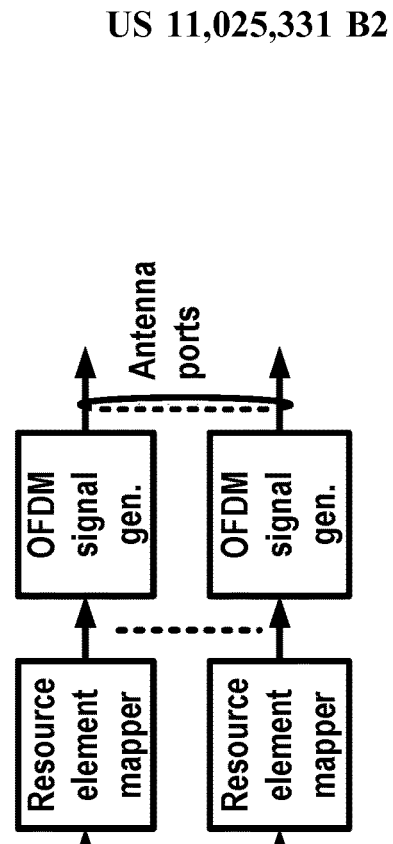
Figure 4C:
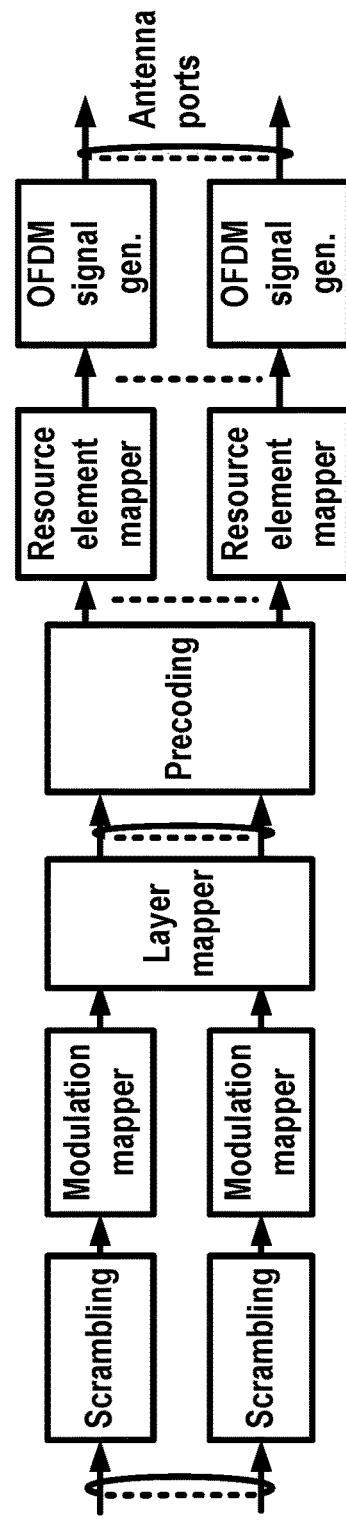

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
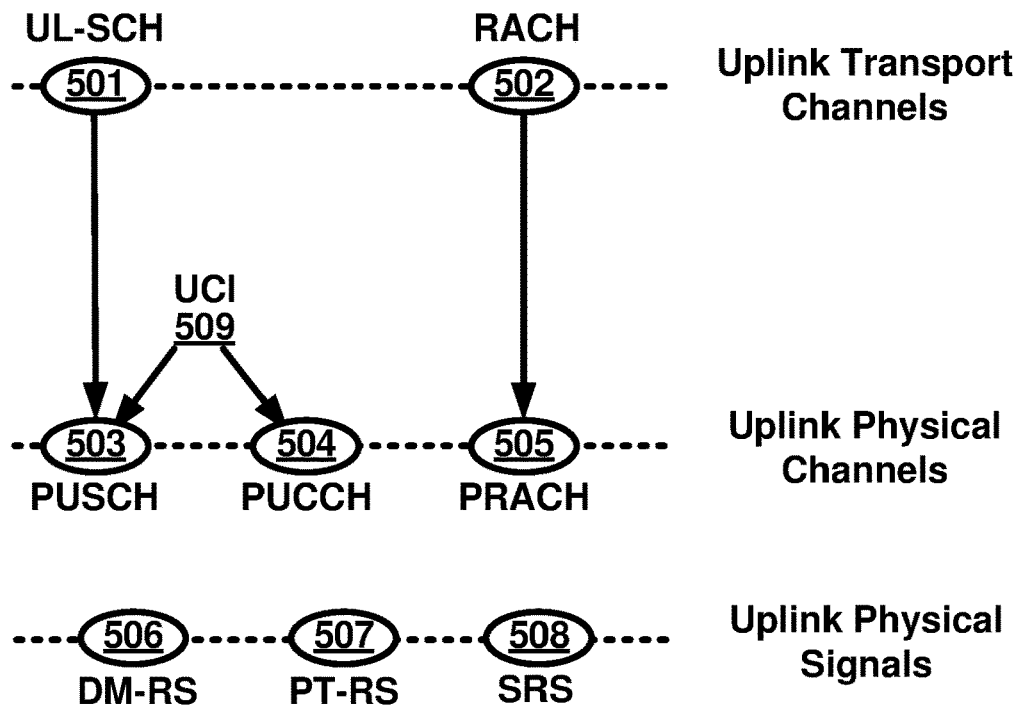
FIG. 5A is a diagram of an example uplink channel mapping and example uplink physical signals as per an aspect of an embodiment of the present disclosure.
Figure 5B:
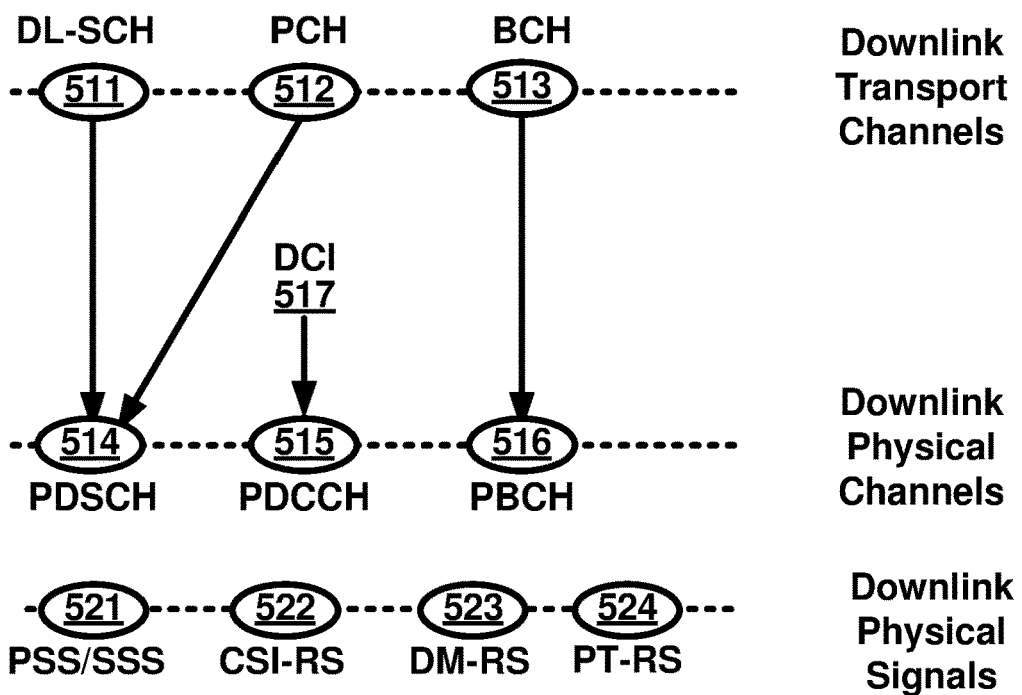
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (minislot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SS/PBCH blocks when the downlink CSI-RS 522 and SS/PBCH blocks are spatially quasi co-located and resource elements associated with the downlink CSI-RS 522 are the outside of PRBs configured for SS/PBCH blocks.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
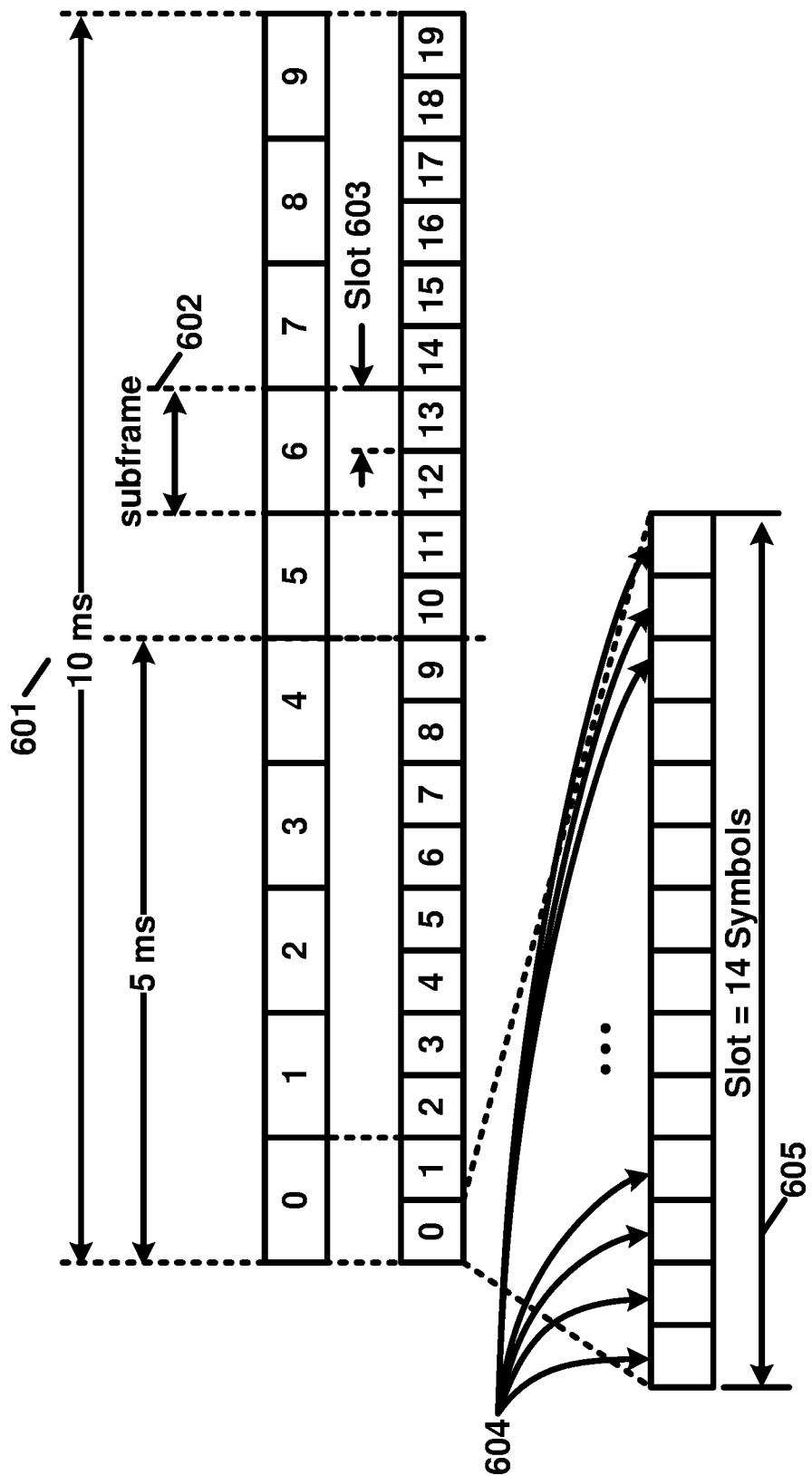
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
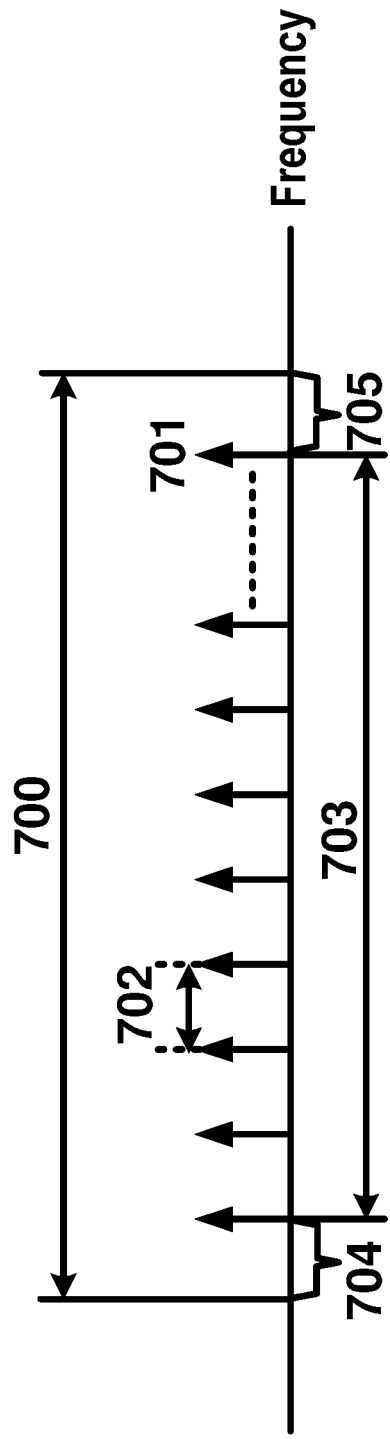
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
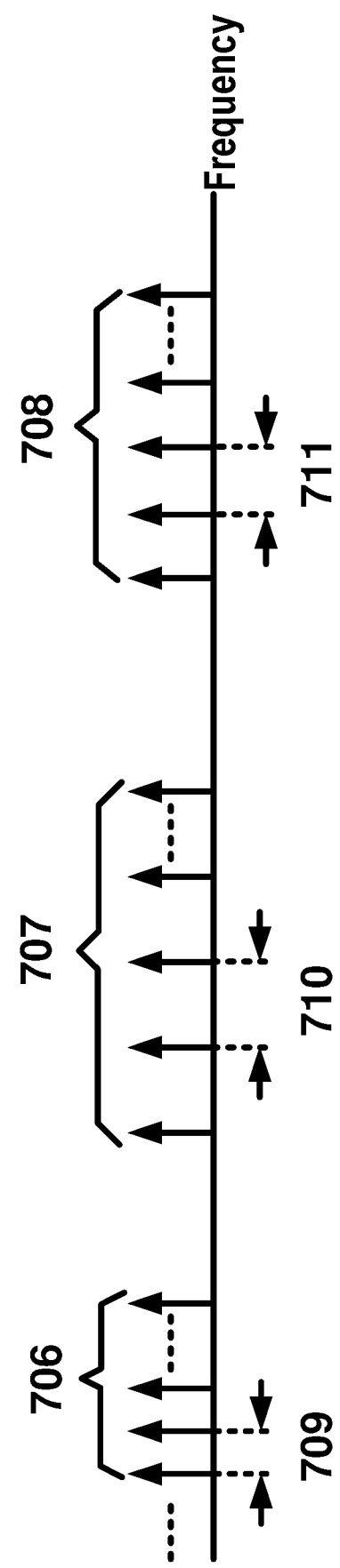

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
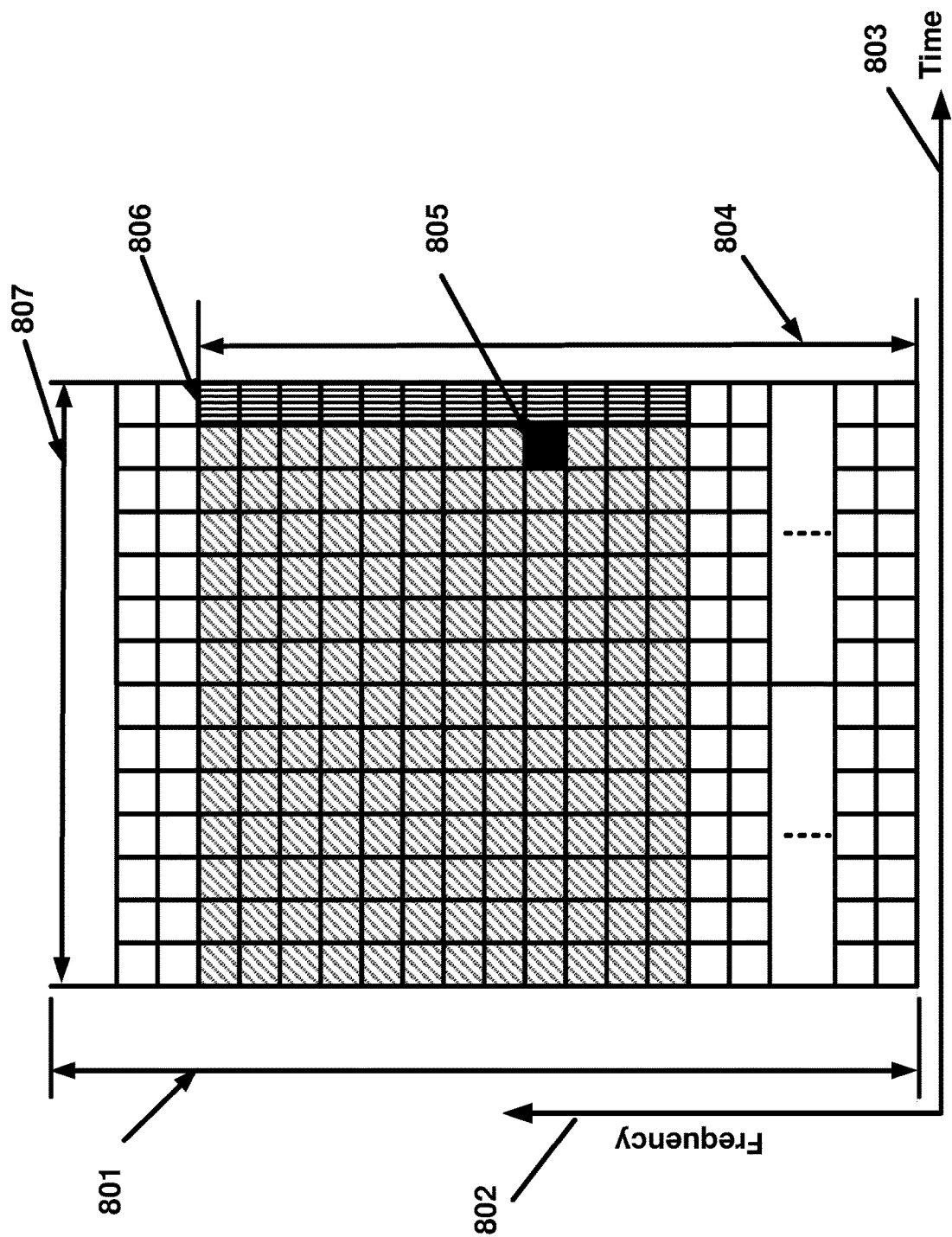
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCLed with the DM-RS antenna port(s). Different set of DM-RS antenna port(s) for a DL data channel may be indicated as QCL with different set of the RS antenna port(s).

Figure 9A:
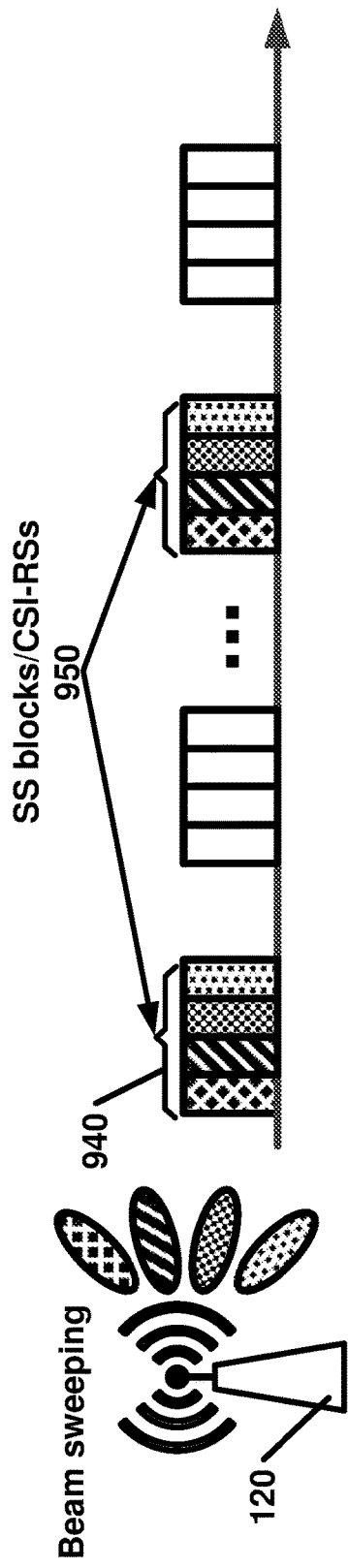
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
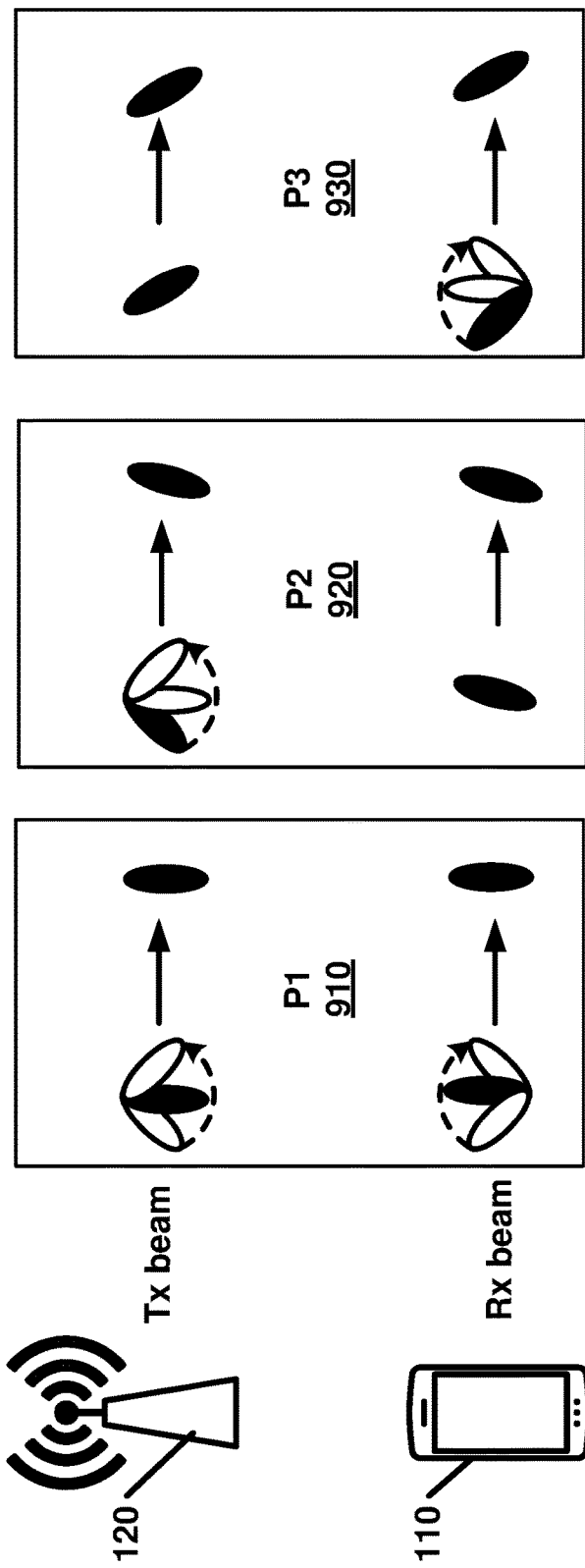
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
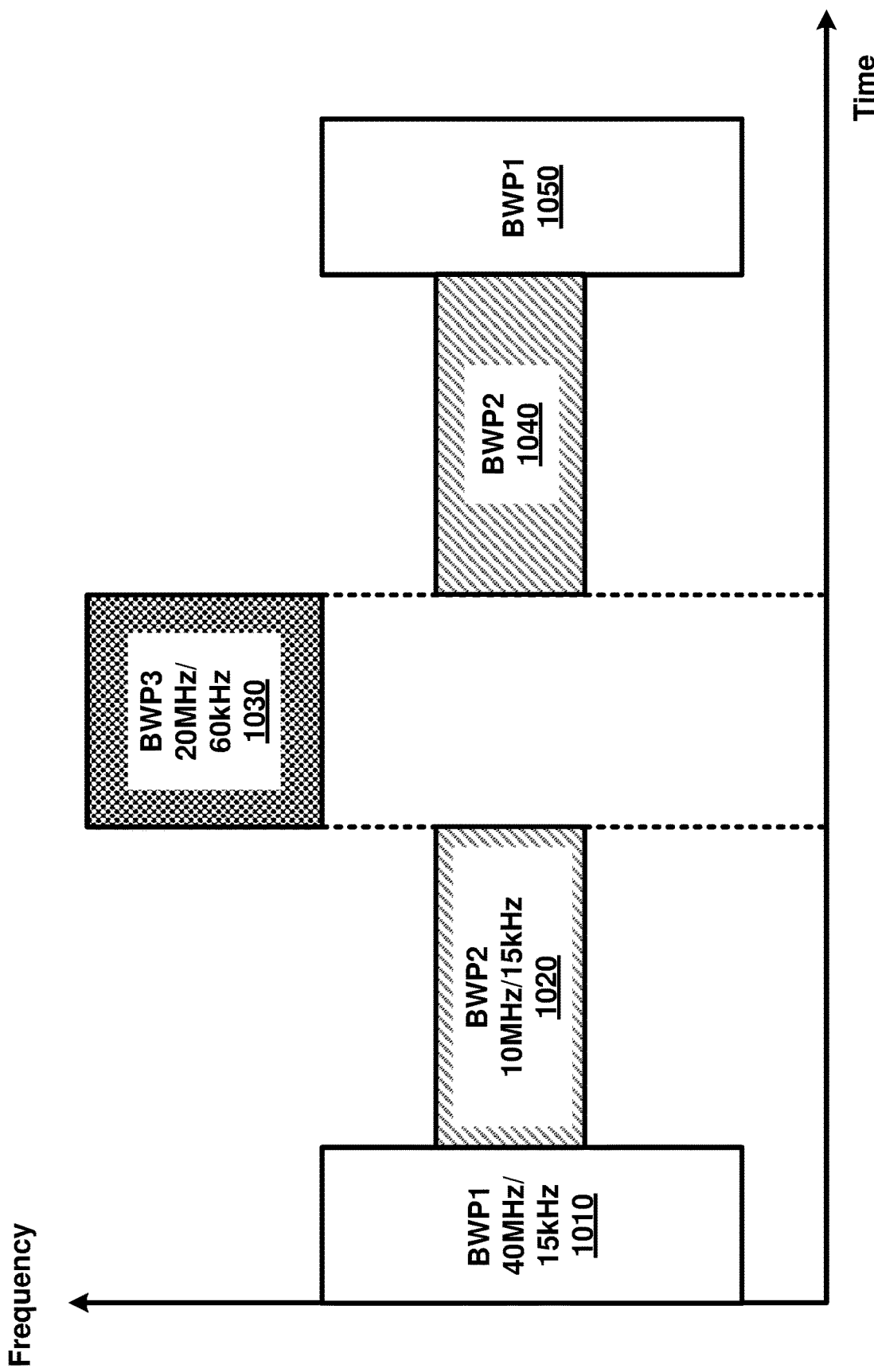
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
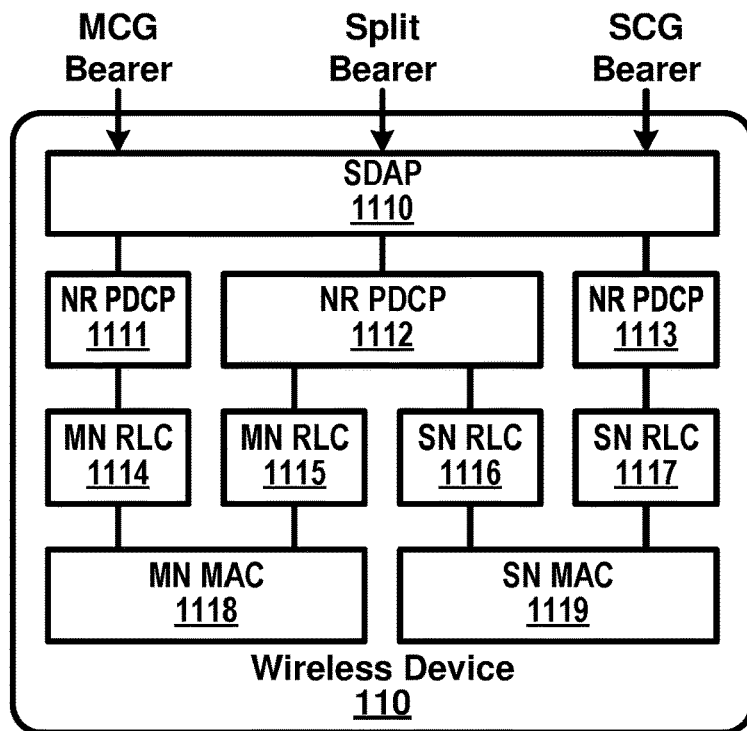
FIG. 11A, and FIG. 11B are diagrams of an example multi connectivity as per an aspect of an embodiment of the present disclosure.
Figure 11B:
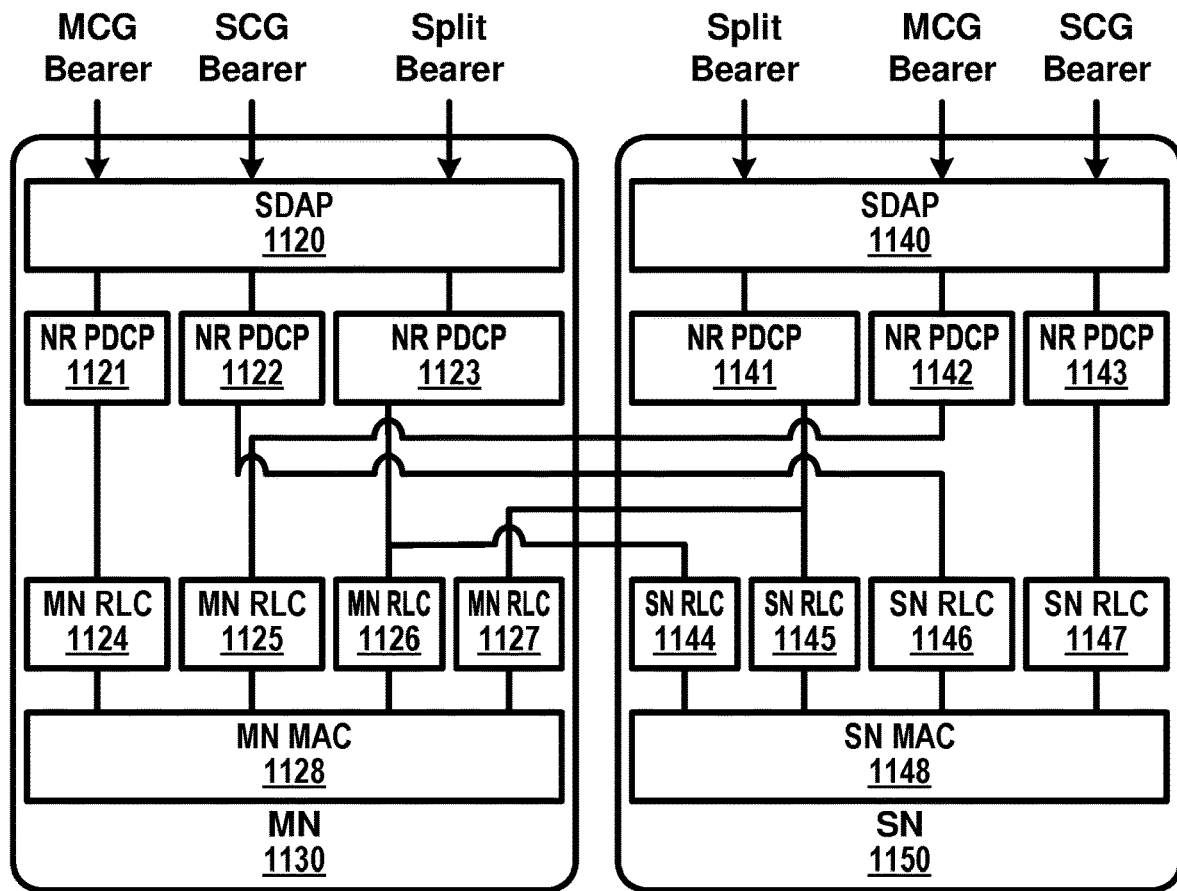

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
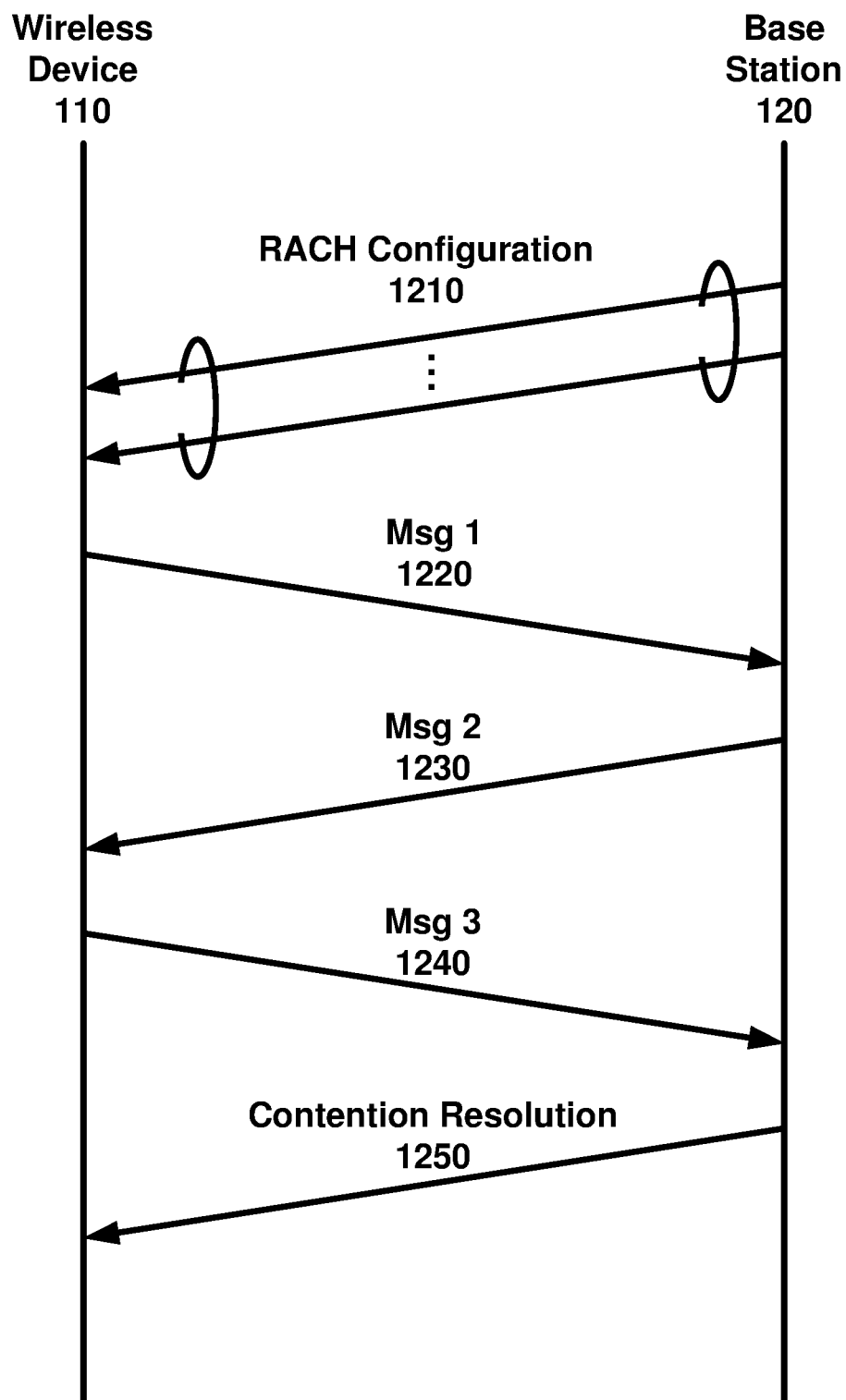
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-Response Window) to monitor a random access response. For beam failure recovery request, a base station may configure a UE with a different time window (e.g., bfr-ResponseWindow) to monitor response on beam failure recovery request. For example, a UE may start a time window (e.g., ra-Response Window or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
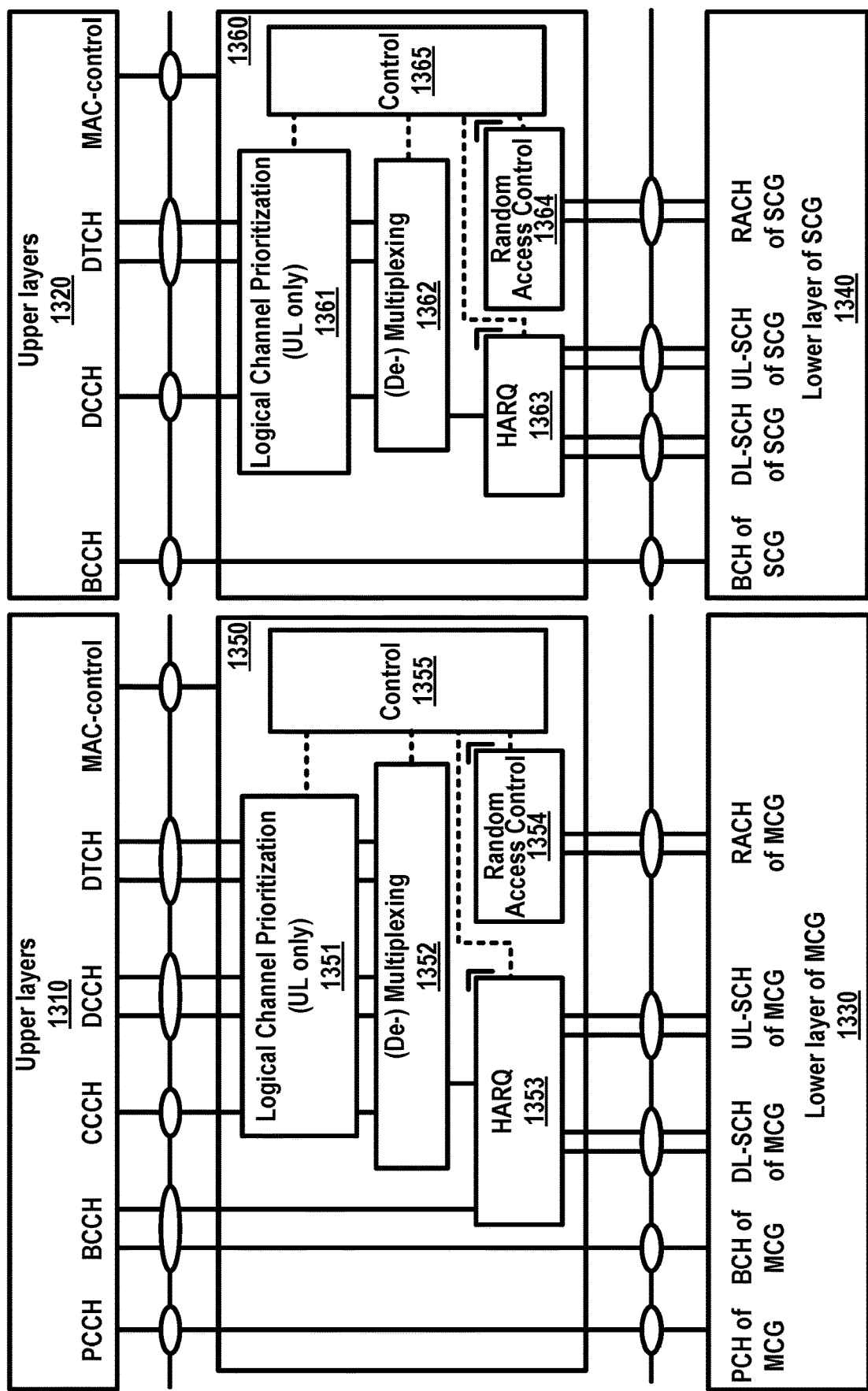
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
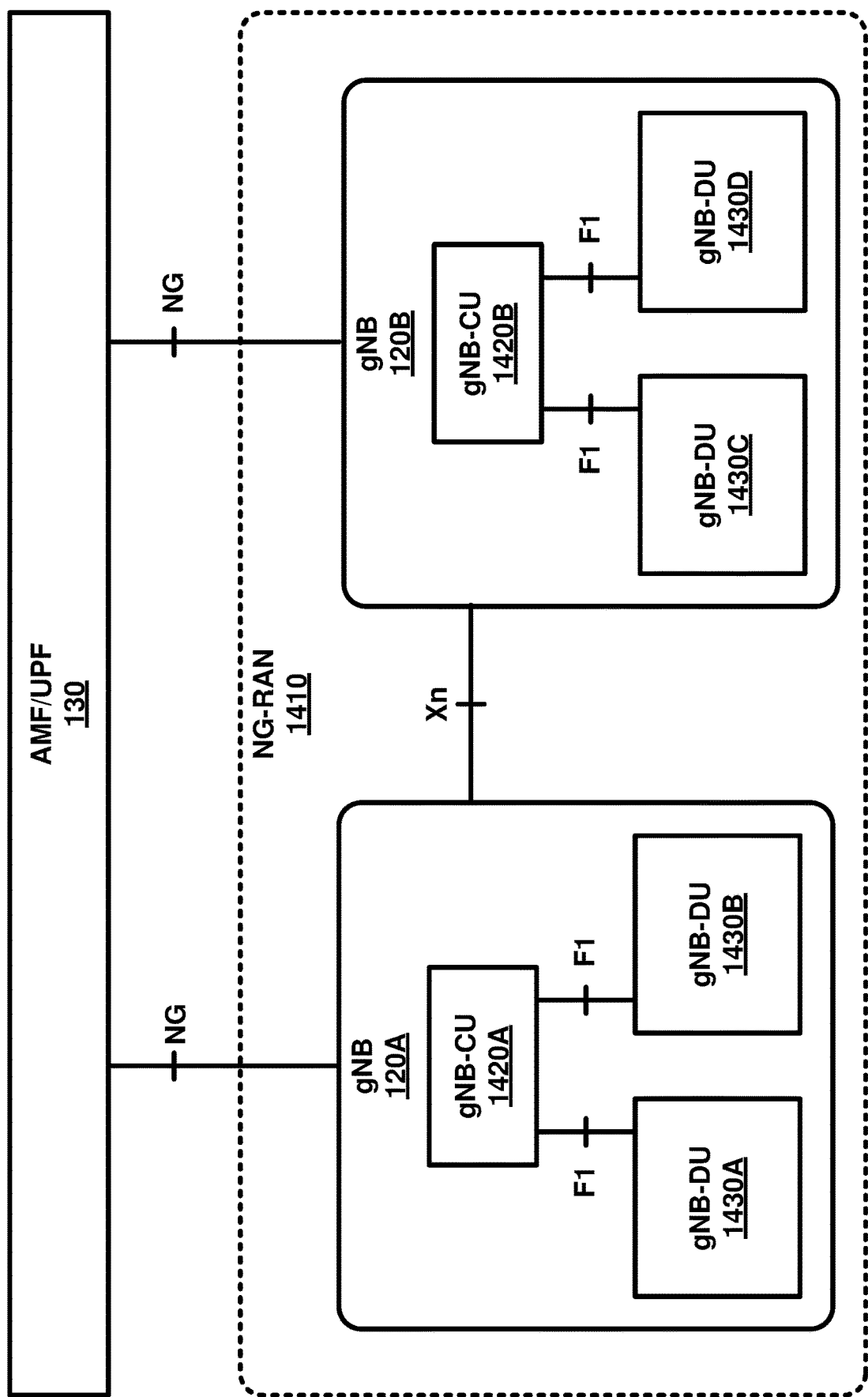
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
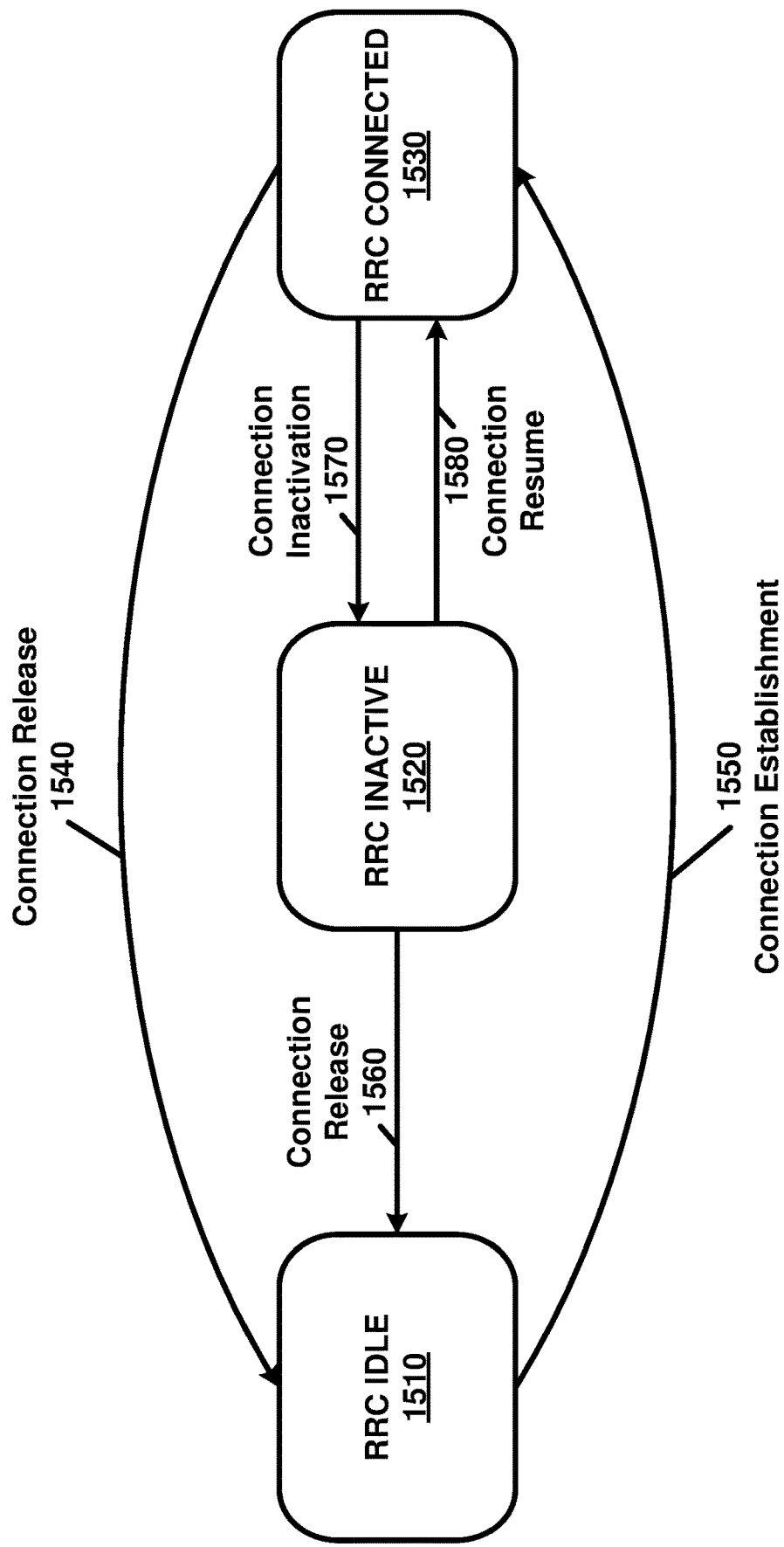
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

Example MAC PDU Structure.

A gNB may transmit one or more MAC PDU to a wireless device. In an example, a MAC PDU may be a bit string that is byte aligned (e.g., multiple of eight bits) in length. In an example, bit strings may be represented by tables in which the most significant bit is the leftmost bit of the first line of the table, and the least significant bit is the rightmost bit on the last line of the table, and more generally, the bit string may be read from the left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., multiple of eight bits) in length. In an example, a MAC SDU may be included into a MAC PDU from the first bit onward.

In an example, a MAC CE may be a bit string that is byte aligned (e.g., multiple of eight bits) in length.

In an example, a MAC subheader may be a bit string that is byte aligned (e.g., multiple of eight bits) in length. In an example, a MAC subheader may be placed immediately in front of the corresponding MAC SDU, or MAC CE, or padding.

In an example, a MAC entity may ignore a value of reserved bits in a DL MAC PDU.

In an example, a MAC PDU may comprise one or more MAC subPDUs. a MAC subPDU of the one or more MAC subPDUs may comprise at least one of: a MAC subheader only (including padding); a MAC subhearder and a MAC SDU; a MAC subheader and a MAC CE; and/or a MAC subheader and padding. In an example, the MAC SDU may be of variable size. In an example, a MAC subhearder may correspond to a MAC SDU, or a MAC CE, or padding.

In an example, a MAC subheader may comprise: an R field with one bit; a F field with one bit in length; a LCID field with multiple bits in length; a L field with multiple bits in length, when the MAC subheader corresponds to a MAC SDU, or a variable-sized MAC CE, or padding.

Figure 16A:
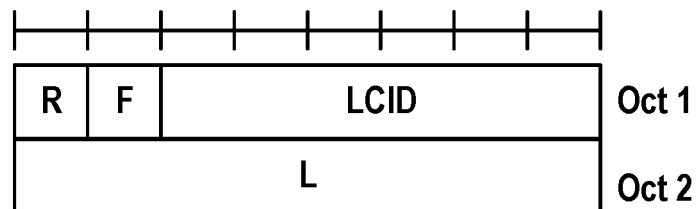
FIG. 16A, FIG. 16B and FIG. 16C are examples of MAC subheaders as per an aspect of an embodiment of the present disclosure.
Figure 16B:
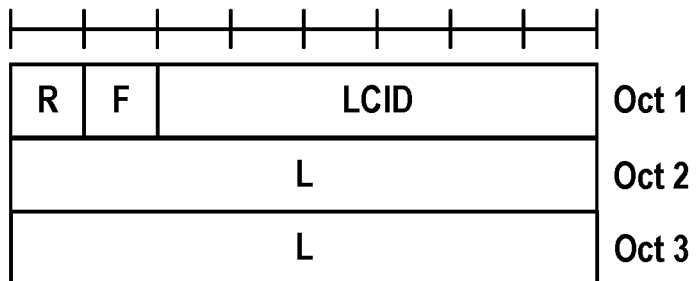

FIG. 16A shows example of a MAC subheader with an eight-bit L field. In the example, the LCID field may have six bits in length, and the L field may have eight bits in length. FIG. 16B shows example of a MAC subheader with a sixteen-bit L field. In the example, the LCID field may have six bits in length, and the L field may have sixteen bits in length.

Figure 16C:
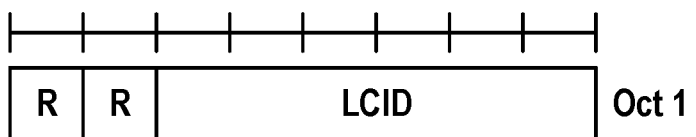

In an example, a MAC subheader may comprise: a R field with two bits in length; and a LCID field with multiple bits in length, when the MAC subheader corresponds to a fixed sized MAC CE, or padding. FIG. 16C shows example of the MAC subheader. In the example, the LCID field may have six bits in length, and the R field may have two bits in length.

Figure 17A:
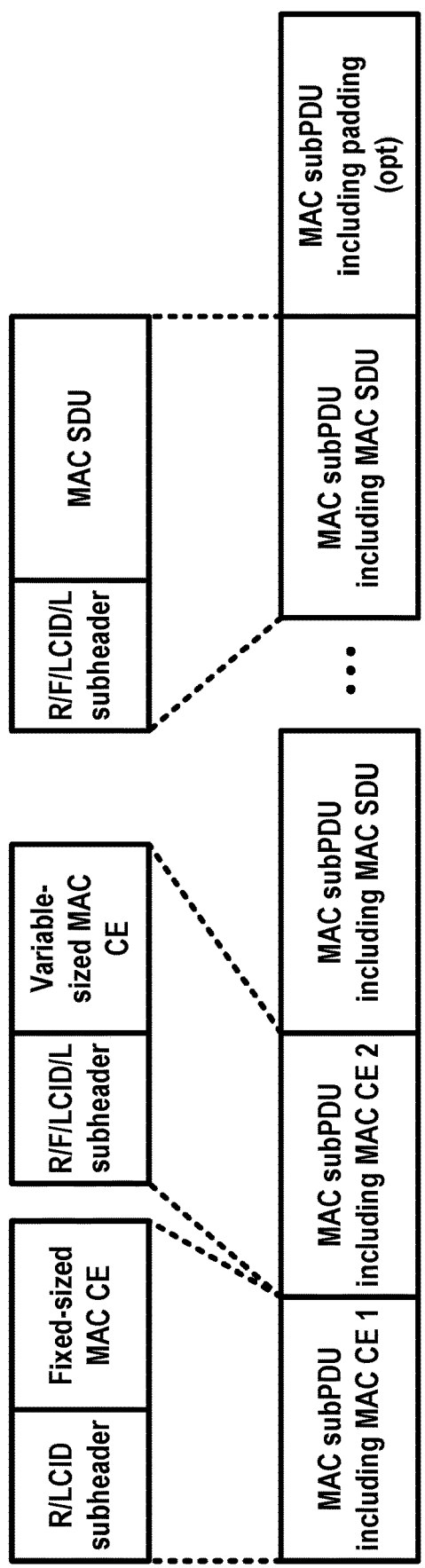
FIG. 17A and FIG. 17B are examples of MAC PDUs as per an aspect of an embodiment of the present disclosure.

FIG. 17A shows example of a DL MAC PDU. In the example, multiple MAC CEs may be placed together. A MAC subPDU comprising MAC CE may be placed before any MAC subPDU comprising a MAC SDU, or a MAC subPDU comprising padding.

Figure 17B:
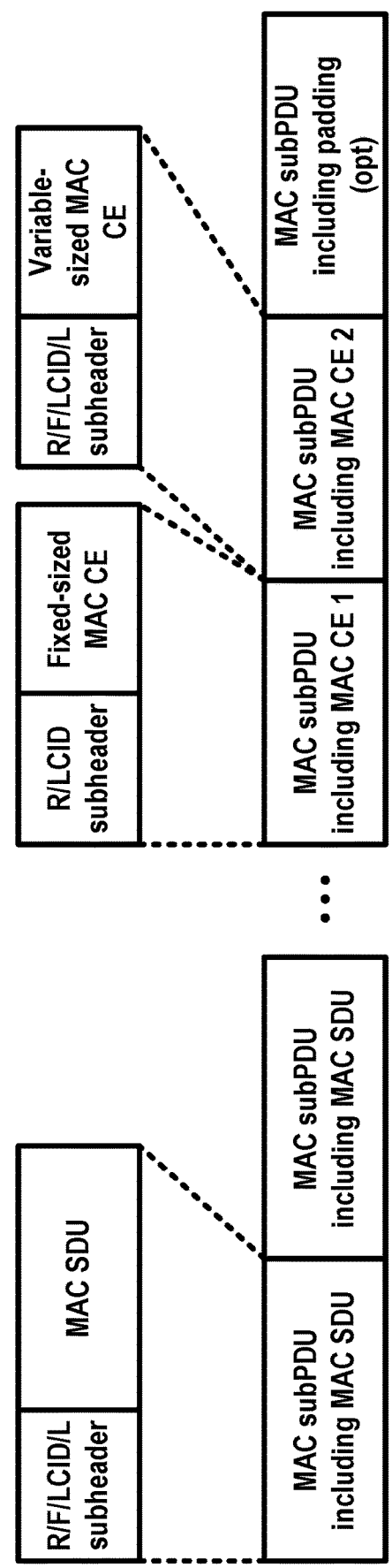

FIG. 17B shows example of a UL MAC PDU. In the example, multiple MAC CEs may be placed together. A MAC subPDU comprising MAC CE may be placed after all MAC subPDU comprising a MAC SDU. The MAC subPDU may be placed before a MAC subPDU comprising padding.

In an example, a MAC entity of a gNB may transmit to a MAC entity of a wireless device one or more MAC CEs. FIG. 18A shows example of multiple LCIDs associated with the one or more MAC CEs. In the example, the one or more MAC CEs may comprise at least one of: a UE contention resolution identity MAC CE; a timing advance command MAC CE; a DRX command MAC CE; a Long DRX command MAC CE; a SCell activation/deactivation MAC CE (1 Octet); a SCell activation/deactivation MAC CE (4 Octet); and/or a duplication activation/deactivation MAC CE. In an example, a MAC CE may have a LCID in the corresponding MAC subheader. Different MAC CE may have different LCID in the corresponding MAC subheader. For example, the LCID with 111011 in a MAC subheader may indicate a MAC CE associated with the MAC subheader is a long DRX command MAC CE.

In an example, the MAC entity of the wireless device may transmit to the MAC entity of the gNB one or more MAC CEs. FIG. 18B shows example of the one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry PHR MAC CE; a multiple entry PHR MAC CE; a short truncated BSR; and/or a long truncated BSR. In an example, a MAC CE may have a LCID in the corresponding MAC subheader. Different MAC CE may have different LCID in the corresponding MAC subheader. For example, the LCID with 111011 in a MAC subheader may indicate a MAC CE associated with the MAC subheader is a short-truncated command MAC CE.

Example of Carrier Aggregation

In a carrier aggregation (CA), two or more component carriers (CCs) may be aggregated. A wireless device may simultaneously receive or transmit on one or more CCs depending on capabilities of the wireless device. In an example, the CA may be supported for contiguous CCs. In an example, the CA may be supported for non-contiguous CCs.

When configured with a CA, a wireless device may have one RRC connection with a network. During an RRC connection establishment/re-establishment/handover, a cell providing a NAS mobility information may be a serving cell. During an RRC connection re-establishment/handover procedure, a cell providing a security input may be a serving cell. In an example, the serving cell may be referred to as a primary cell (PCell). In an example, a gNB may transmit, to a wireless device, one or more messages comprising configuration parameters of a plurality of one or more secondary cells (SCells), depending on capabilities of the wireless device.

When configured with CA, a base station and/or a wireless device may employ an activation/deactivation mechanism of an SCell for an efficient battery consumption. When a wireless device is configured with one or more SCells, a gNB may activate or deactivate at least one of the one or more SCells. Upon configuration of an SCell, the SCell may be deactivated.

In an example, a wireless device may activate/deactivate an SCell in response to receiving an SCell Activation/Deactivation MAC CE.

In an example, a base station may transmit, to a wireless device, one or more messages comprising an sCellDeactivationTimer timer. In an example, a wireless device may deactivate an SCell in response to an expiry of the sCellDeactivationTimer timer.

When a wireless device receives an SCell Activation/Deactivation MAC CE activating an SCell, the wireless device may activate the SCell. In response to the activating the SCell, the wireless device may perform operations comprising SRS transmissions on the SCell, CQI/PMI/RI/CRI reporting for the SCell on a PCell, PDCCH monitoring on the SCell, PDCCH monitoring for the SCell on the PCell, and/or PUCCH transmissions on the SCell.

In an example, in response to the activating the SCell, the wireless device may start or restart an sCellDeactivationTimer timer associated with the SCell. The wireless device may start the sCellDeactivationTimer timer in the slot when the SCell Activation/Deactivation MAC CE has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

In an example, when a wireless device receives an SCell Activation/Deactivation MAC CE deactivating an activated SCell, the wireless device may deactivate the activated SCell.

In an example, when an sCellDeactivationTimer timer associated with an activated SCell expires, the wireless device may deactivate the activated SCell. In response to the deactivating the activated SCell, the wireless device may stop the sCellDeactivationTimer timer associated with the activated SCell. In an example, in response to the deactivating the activated SCell, the wireless device may clear one or more configured downlink assignments and/or one or more configured uplink grant Type 2 associated with the activated SCell. In an example, in response to the deactivating the activated SCell, the wireless device may further suspend one or more configured uplink grant Type 1 associated with the activated SCell. The wireless device may flush HARQ buffers associated with the activated SCell.

In an example, when an SCell is deactivated, a wireless device may not perform operations comprising transmitting SRS on the SCell, reporting CQI/PMI/RI/CRI for the SCell on a PCell, transmitting on UL-SCH on the SCell, transmitting on RACH on the SCell, monitoring at least one first PDCCH on the SCell, monitoring at least one second PDCCH for the SCell on the PCell, transmitting a PUCCH on the SCell.

In an example, when at least one first PDCCH on an activated SCell indicates an uplink grant or a downlink assignment, a wireless device may restart an sCellDeactivationTimer timer associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart an sCellDeactivationTimer timer associated with the activated SCell.

In an example, when an SCell is deactivated, if there is an ongoing random access procedure on the SCell, a wireless device may abort the ongoing random access procedure on the SCell.

Example of SCell Activation/Deactivation MAC-CE

Figure 19A:
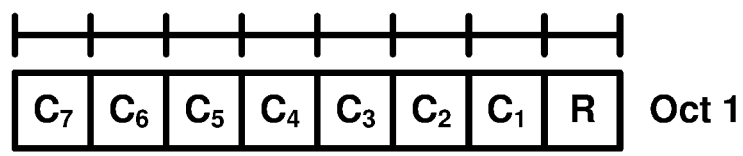
FIG. 19A and FIG. 19B are examples of SCell activation/deactivation MAC CE as per an aspect of an embodiment of the present disclosure.

FIG. 19A shows an example of an SCell Activation/Deactivation MAC CE of one octet. A first MAC PDU subheader with a first LCID may identify the SCell Activation/Deactivation MAC CE of one octet. FIG. 18A shows an example of the first LCID. The SCell Activation/Deactivation MAC CE of one octet may have a fixed size. The SCell Activation/Deactivation MAC CE of one octet may comprise a single octet. The single octet may comprise a first number of C-fields (e.g. seven) and a second number of R-fields (e.g. one).

Figure 19B:
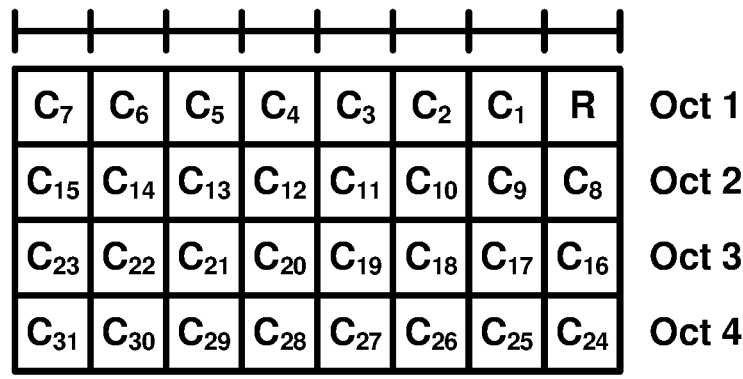

FIG. 19B shows an example of an SCell Activation/Deactivation MAC CE of four octets. A second MAC PDU subheader with a second LCID may identify the SCell Activation/Deactivation MAC CE of four octets. FIG. 18B shows an example of the second LCID. The SCell Activation/Deactivation MAC CE of four octets may have a fixed size. The SCell Activation/Deactivation MAC CE of four octets may comprise four octets. The four octets may comprise a third number of C-fields (e.g. 31) and a fourth number of R-fields (e.g. 1).

In FIG. 19A and/or FIG. 19B, a C_i field may indicate an activation/deactivation status of an SCell with an SCell index i. In an example, when the C_i field is set to one, an SCell with an SCell index i may be activated. In an example, when the C_i field is set to zero, an SCell with an SCell index i may be deactivated. In FIG. 19A and FIG. 19B, an R field may indicate a reserved bit. The R field may be set to zero.

Example Bandwidth Parts (BWPs)

A base station (gNB) may configure a wireless device (UE) with uplink (UL) bandwidth parts (BWPs) and downlink (DL) BWPs to enable bandwidth adaptation (BA) on a PCell. If carrier aggregation is configured, the gNB may configure the UE with at least DL BWP(s) (i.e. there may be no UL BWPS in the UL) to enable BA on an SCell. For the PCell, a first initial BWP may be a first BWP used for initial access. For the SCell, a second initial BWP is a second BWP configured for the UE to first operate at the SCell when the SCell is activated.

In paired spectrum (e.g. FDD), a first DL and a first UL can switch BWP independently. In unpaired spectrum (e.g. TDD), a second DL and a second UL switch BWP simultaneously. Switching between configured BWPs may happen by means of a DCI or an inactivity timer. When the inactivity timer is configured for a serving cell, an expiry of the inactivity timer associated to that cell may switch an active BWP to a default BWP. The default BWP may be configured by the network.

In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may enable reasonable UE battery consumption. BWPs other than the one UL BWP and the one DL BWP that the UE may be configured with may be deactivated. On deactivated BWPs, the UE may not monitor PDCCH, may not transmit on PUCCH, PRACH and UL-SCH.

In an example, a Serving Cell may be configured with at most a first number (e.g., four) BWPs. In an example, for an activated Serving Cell, there may be one active BWP at any point in time.

In an example, a BWP switching for a Serving Cell may be used to activate an inactive BWP and deactivate an active BWP at a time. In an example, the BWP switching may be controlled by a PDCCH indicating a downlink assignment or an uplink grant. In an example, the BWP switching may be controlled by an inactivity timer (e.g. bandwidthpartInactivityTimer). In an example, the BWP switching may be controlled by a MAC entity in response to initiating a Random Access procedure. Upon addition of SpCell or activation of an SCell, one BWP may be initially active without receiving a PDCCH indicating a downlink assignment or an uplink grant. The active BWP for a Serving Cell may be indicated by RRC and/or PDCCH. In an example, for unpaired spectrum, a DL BWP may be paired with a UL BWP, and BWP switching may be common for both UL and DL.

In an example, a MAC entity may apply normal operations on an active BWP for an activated Serving Cell configured with a BWP including: transmitting on UL-SCH; transmitting on RACH; monitoring a PDCCH; transmitting PUCCH; receiving DL-SCH; (re-) initializing any suspended configured uplink grants of configured grant Type 1 according to a stored configuration, if any, and to start in a symbol based on some procedure.

In an example, on an inactive BWP for each activated Serving Cell configured with a BWP, a MAC entity may not transmit on UL-SCH; may not transmit on RACH; may not monitor a PDCCH; may not transmit PUCCH; may not transmit SRS, may not receive DL-SCH; may clear any configured downlink assignment and configured uplink grant of configured grant Type 2; may suspend any configured uplink grant of configured Type 1.

In an example, upon initiation of a Random Access procedure, if PRACH resources are configured for an active UL BWP, a MAC entity may perform the Random Access procedure on an active DL BWP and the active UL BWP. In an example, upon initiation of a Random Access procedure, if PRACH resources are not configured for an active UL BWP, a MAC entity may switch to an initial DL BWP and an initial UL BWP. In response to the switching, the MAC entity may perform the Random Access procedure on the initial DL BWP and the initial UL BWP.

In an example, if a MAC entity receives a PDCCH for a BWP switching of a serving cell while a Random Access procedure associated with this serving cell is not ongoing, a UE may perform the BWP switching to a BWP indicated by the PDCCH.

In an example, if a MAC entity receives a PDCCH for a BWP switching while a Random Access procedure is ongoing in the MAC entity, it may be up to UE implementation whether to switch BWP or ignore the PDCCH for the BWP switching. In an example, if the MAC entity decides to perform the BWP switching, the MAC entity may stop the ongoing Random Access procedure and initiate a second Random Access procedure on a new activated BWP. In an example, if the MAC decides to ignore the PDCCH for the BWP switching, the MAC entity may continue with the ongoing Random Access procedure on the active BWP.

In an example, if a MAC entity receives a PDCCH for a BWP switching addressed to a C-RNTI for a successful completion of a Random Access procedure, a UE may perform the BWP switching to a BWP indicated by the PDCCH.

In an example, if a BWP-InactivityTimer is configured, for an activated Serving Cell, if a Default-DL-BWP is configured, and an active DL BWP is not a BWP indicated by the Default-DL-BWP; or if the Default-DL-BWP is not configured, and the active DL BWP is not the initial BWP: if a PDCCH addressed to C-RNTI or CS-RNTI indicating downlink assignment or uplink grant is received on the active BWP: if there is not an ongoing random access procedure associated with the activated Serving Cell, the MAC entity may start or restart the BWP-InactivityTimer associated with the active DL BWP.

In an example, if a BWP-InactivityTimer is configured, for an activated Serving Cell, if a Default-DL-BWP is configured, and an active DL BWP is not a BWP indicated by the Default-DL-BWP; or if the Default-DL-BWP is not configured, and the active DL BWP is not the initial BWP: if a MAC-PDU is transmitted in a configured uplink grant or received in a configured downlink assignment; if there is not an ongoing random access procedure associated with the activated Serving Cell, the MAC entity may start or restart the BWP-InactivityTimer associated with the active DL BWP.

In an example, if a BWP-InactivityTimer is configured, for an activated Serving Cell, if a Default-DL-BWP is configured, and an active DL BWP is not a BWP indicated by the Default-DL-BWP; or if the Default-DL-BWP is not configured, and the active DL BWP is not the initial BWP: if a PDCCH addressed to C-RNTI or CS-RNTI indicating downlink assignment or uplink grant is received on the active BWP; or if a MAC-PDU is transmitted in a configured uplink grant or received in a configured downlink assignment: if an ongoing random access procedure associated with the activated Serving Cell is successfully completed in response to receiving the PDCCH addressed to a C-RNTI, the MAC entity may start or restart the BWP-InactivityTimer associated with the active DL BWP.

In an example, if a BWP-InactivityTimer is configured, for an activated Serving Cell, if a Default-DL-BWP is configured, and an active DL BWP is not a BWP indicated by the Default-DL-BWP; or if the Default-DL-BWP is not configured, and the active DL BWP is not the initial BWP: if a PDCCH for a BWP switching is received on the active DL BWP, a MAC entity may start or restart the BWP-InactivityTimer associated with the active DL BWP in response to switching the active BWP.

In an example, if BWP-InactivityTimer is configured, for an activated Serving Cell, if the Default-DL-BWP is configured, and the active DL BWP is not the BWP indicated by the Default-DL-BWP; or if the Default-DL-BWP is not configured, and the active DL BWP is not the initial BWP: if Random Access procedure is initiated, the MAC entity may stop the BWP-InactivityTimer associated with the active DL BWP of the activated Serving Cell. If the activated Serving Cell is an SCell (other than a PSCell), the MAC entity may stop a second BWP-InactivityTimer associated with a second active DL BWP of an SpCell.

In an example, if BWP-InactivityTimer is configured, for an activated Serving Cell, if the Default-DL-BWP is configured, and the active DL BWP is not the BWP indicated by the Default-DL-BWP; or if the Default-DL-BWP is not configured, and the active DL BWP is not the initial BWP: if BWP-InactivityTimer associated with the active DL BWP expires: if the Default-DL-BWP is configured, the MAC entity may perform BWP switching to a BWP indicated by the Default-DL-BWP. Otherwise, the MAC entity may perform BWP switching to the initial DL BWP.

In an example, a UE may be configured for operation in bandwidth parts (BWPs) of a serving cell. In an example, the UE may be configured by higher layers for the serving cell a set of (e.g., at most four) bandwidth parts (BWPs) for receptions by the UE (e.g., DL BWP set) in a DL bandwidth by parameter DL-BWP. In an example, the UE may be configured with a set of (e.g., at most four) BWPs for transmissions by the UE (e.g., UL BWP set) in an UL bandwidth by parameter UL-BWP for the serving cell.

In an example, an initial active DL BWP may be defined, for example, by a location and number of contiguous PRBs, a subcarrier spacing, and a cyclic prefix, for the control resource set for Type0-PDCCH common search space. In an example, for operation on a primary cell, a UE may be provided by higher layer with a parameter initial-UL-BWP, an initial active UL BWP for a random access procedure.

In an example, if a UE has a dedicated BWP configuration, the UE may be provided by higher layer parameter Active-BWP-DL-Pcell a first active DL BWP for receptions. If a UE has a dedicated BWP configuration, the UE may be provided by higher layer parameter Active-BWP-UL-Pcell a first active UL BWP for transmissions on a primary cell.

In an example, for a DL BWP or an UL BWP in a set of DL BWPs or UL BWPs, respectively, the UE may be configured with the following parameters for the serving cell: a subcarrier spacing provided by higher layer parameter DL-BWP-mu or UL-BWP-mu; a cyclic prefix provided by higher layer parameter DL-BWP-CP or UL-BWP-CP; a PRB offset with respect to the PRB determined by higher layer parameters offset-pointA-low-scs and ref-scs and a number of contiguous PRBs provided by higher layer parameter DL-BWP-BW or UL-BWP-BW; an index in the set of DL BWPs or UL BWPs by respective higher layer parameters DL-BWP-index or UL-BWP-index; a DCI format 1_0 or DCI format 1_1 detection to a PDSCH reception timing values by higher layer parameter DL-data-time-domain; a PDSCH reception to a HARQ-ACK transmission timing values by higher layer parameter DL-data-DL-acknowledgement; and a DCI 0_0 or DCI 0_1 detection to a PUSCH transmission timing values by higher layer parameter UL-data-time-domain;

In an example, for an unpaired spectrum operation, a DL BWP from a set of configured DL BWPs with index provided by higher layer parameter DL-BWP-index may be paired with an UL BWP from a set of configured UL BWPs with index provided by higher layer parameter UL-BWP-index when the DL BWP index and the UL BWP index are equal. For unpaired spectrum operation, a UE may not be expected to receive a configuration where the center frequency for a DL BWP is different than the center frequency for an UL BWP when the DL-BWP-index of the DL BWP is equal to the UL-BWP-index of the UL BWP.

In an example, for a DL BWP in a set of DL BWPs on the primary cell, a UE may be configured control resource sets for every type of common search space and for UE-specific search space. In an example, the UE may not be expected to be configured without a common search space on the PCell, or on the PSCell, in the active DL BWP. In an example, for an UL BWP in a set of UL BWPs, the UE may be configured resource sets for PUCCH transmissions. In an example, a UE may receive PDCCH and PDSCH in a DL BWP according to a configured subcarrier spacing and CP length for the DL BWP. A UE may transmit PUCCH and PUSCH in an UL BWP according to a configured subcarrier spacing and CP length for the UL BWP.

In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions. In an example, for the primary cell, a UE may be provided by higher layer parameter Default-DL-BWP, a default DL BWP among the configured DL BWPs. In an example, if a UE is not provided a default DL BWP by higher layer parameter Default-DL-BWP, the default BWP may be the initial active DL BWP.

In an example, a UE may be expected to detect a DCI format 0_1 indicating active UL BWP change, or a DCI format 1_1 indicating active DL BWP change, only if a corresponding PDCCH is received within first 3 symbols of a slot.

In an example, for a primary cell, a UE may be provided by a higher layer parameter Default-DL-BWP a default DL BWP among the configured DL BWPs. If a UE is not provided a default DL BWP by the higher layer parameter Default-DL-BWP, the default DL BWP is the initial active DL BWP.

In an example, a UE may be provided by higher layer parameter BWP-InactivityTimer, a timer value for the primary cell. If configured, the UE may increment the timer, if running, every interval of 1 millisecond for frequency range 1 or every 0.5 milliseconds for frequency range 2 if the UE may not detect a DCI format 1_1 for paired spectrum operation or if the UE may not detect a DCI format 1_1 or DCI format 0_1 for unpaired spectrum operation during the interval.

In an example, if a UE is configured for a secondary cell with higher layer parameter Default-DL-BWP indicating a default DL BWP among the configured DL BWPs and the UE is configured with higher layer parameter BWP-InactivityTimer indicating a timer value, the UE procedures on the secondary cell may be same as on the primary cell using the timer value for the secondary cell and the default DL BWP for the secondary cell.

In an example, if a UE is configured by higher layer parameter Active-BWP-DL-SCell a first active DL BWP and by higher layer parameter Active-BWP-UL-SCell a first active UL BWP on a secondary cell or carrier, the UE may use the indicated DL BWP and the indicated UL BWP on the secondary cell as the respective first active DL BWP and first active UL BWP on the secondary cell or carrier.

In an example, for paired spectrum operation, a UE may not be expected to transmit HARQ-ACK on a PUCCH resource indicated by a DCI format 1_0 or a DCI format 1_1 if the UE changes its active UL BWP on a PCell between a time of a detection of the DCI format 1_0 or the DCI format 1_1 and a time of a corresponding HARQ-ACK transmission on the PUCCH.

In an example, a UE may not be expected to monitor PDCCH when the UE performs RRM measurements over a bandwidth that is not within the active DL BWP for the UE.

Example Downlink Control Information (DCI)

In an example, a gNB may transmit a DCI via a PDCCH for at least one of: scheduling assignment/grant; slot format notification; pre-emption indication; and/or power-control commends. More specifically, the DCI may comprise at least one of: identifier of a DCI format; downlink scheduling assignment(s); uplink scheduling grant(s); slot format indicator; pre-emption indication; power-control for PUCCH/PUSCH; and/or power-control for SRS.

In an example, a downlink scheduling assignment DCI may comprise parameters indicating at least one of: identifier of a DCI format; PDSCH resource indication; transport format; HARQ information; control information related to multiple antenna schemes; and/or a command for power control of the PUCCH.

In an example, an uplink scheduling grant DCI may comprise parameters indicating at least one of: identifier of a DCI format; PUSCH resource indication; transport format; HARQ related information; and/or a power control command of the PUSCH.

In an example, different types of control information may correspond to different DCI message sizes. For example, supporting multiple beams and/or spatial multiplexing in the spatial domain and noncontiguous allocation of RBs in the frequency domain may require a larger scheduling message, in comparison with an uplink grant allowing for frequency-contiguous allocation. DCI may be categorized into different DCI formats, where a format corresponds to a certain message size and/or usage.

In an example, a wireless device may monitor one or more PDCCH for detecting one or more DCI with one or more DCI format, in common search space or wireless device-specific search space. In an example, a wireless device may monitor PDCCH with a limited set of DCI format, to save power consumption. The more DCI format to be detected, the more power be consumed at the wireless device.

In an example, the information in the DCI formats for downlink scheduling may comprise at least one of: identifier of a DCI format; carrier indicator; RB allocation; time resource allocation; bandwidth part indicator; HARQ process number; one or more MCS; one or more NDI; one or more RV; MIMO related information; Downlink assignment index (DAI); TPC for PUCCH; SRS request; and padding if necessary. In an example, the MIMO related information may comprise at least one of: PMI; precoding information; transport block swap flag; power offset between PDSCH and reference signal; reference-signal scrambling sequence; number of layers; and/or antenna ports for the transmission; and/or Transmission Configuration Indication (TCI).

In an example, the information in the DCI formats used for uplink scheduling may comprise at least one of: an identifier of a DCI format; carrier indicator; bandwidth part indication; resource allocation type; RB allocation; time resource allocation; MCS; NDI; Phase rotation of the uplink DMRS; precoding information; CSI request; SRS request; Uplink index/DAI; TPC for PUSCH; and/or padding if necessary.

In an example, a gNB may perform CRC scrambling for a DCI, before transmitting the DCI via a PDCCH. The gNB may perform CRC scrambling by binarily adding multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, or TPC-SRS-RNTI) on the CRC bits of the DCI. The wireless device may check the CRC bits of the DCI, when detecting the DCI. The wireless device may receive the DCI when the CRC is scrambled by a sequence of bits that is the same as the at least one wireless device identifier.

In an example, in order to support wide bandwidth operation, a gNB may transmit one or more PDCCH in different control resource sets (coresets). A gNB may transmit one or more RRC message comprising configuration parameters of one or more coresets. A coreset may comprise at least one of: a first OFDM symbol; a number of consecutive OFDM symbols; a set of resource blocks; a CCE-to-REG mapping. In an example, a gNB may transmit a PDCCH in a dedicated coreset for particular purpose, for example, for beam failure recovery confirmation.

In an example, a wireless device may monitor PDCCH for detecting DCI in one or more configured coresets, to reduce the power consumption.

Example of a BFRQ procedure.

A gNB and/or a wireless device may have multiple antennas, to support a transmission with high data rate in a NR system. When configured with multiple antennas, a wireless device may perform one or more beam management procedures, as shown in FIG. 9B.

A wireless device may perform a downlink beam management based on one or more CSI-RSs, and/or one or more SS block. In a beam management procedure, a wireless device may measure a channel quality of a beam pair link. The beam pair link may comprise a transmitting beam from a gNB and a receiving beam at the wireless device. When configured with multiple beams associated with multiple CSI-RSs or SS blocks, a wireless device may measure the multiple beam pair links between the gNB and the wireless device.

In an example, a wireless device may transmit one or more beam management reports to a gNB. In a beam management report, the wireless device may indicate one or more beam pair quality parameters, comprising at least, one or more beam identifications; RSRP; PMI/CQI/RI of at least a subset of configured multiple beams.

In an example, a gNB and/or a wireless device may perform a downlink beam management procedure on one or multiple Transmission and Receiving Point (TRPs), as shown in FIG. 9B. Based on a wireless device's beam management report, a gNB may transmit to the wireless device a signal indicating that a new beam pair link is a serving beam. The gNB may transmit PDCCH and PDSCH to the wireless device using the serving beam.

In an example, a wireless device or a gNB may trigger a beam failure recovery mechanism. A wireless device may trigger a beam failure recovery request (BFRQ) procedure, e.g., when at least a beam failure occurs. In an example, a beam failure may occur when quality of beam pair link(s) of at least one PDCCH falls below a threshold. The threshold may be a RSRP value (e.g., −140 dbm, −110 dbm) or a SINR value (e.g., −3 dB, −1 dB), which may be configured in a RRC message.

Figure 20A:
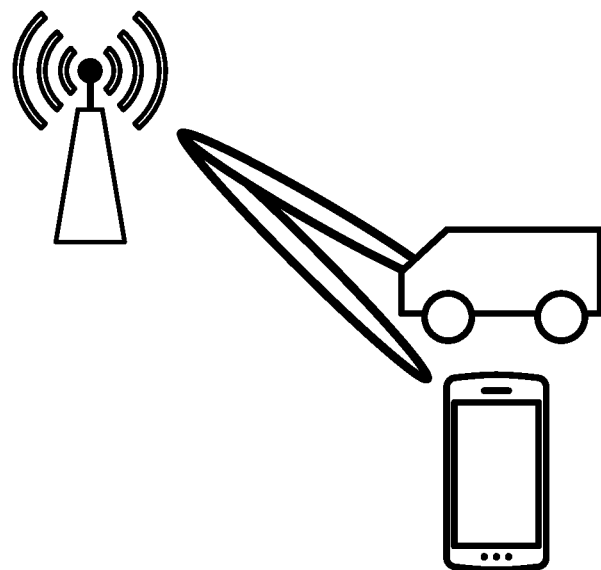
FIG. 20A and FIG. 20B are examples of downlink beam failure scenario as per an aspect of an embodiment of the present disclosure.

FIG. 20A shows example of a first beam failure scenario. In the example, a gNB may transmit a PDCCH from a transmission (Tx) beam to a receiving (Rx) beam of a wireless device from a TRP. When the PDCCH on the beam pair link (between the Tx beam of the gNB and the Rx beam of the wireless device) have a lower-than-threshold RSRP/SINR value due to the beam pair link being blocked (e.g., by a moving car or a building), the gNB and the wireless device may start a beam failure recovery procedure on the TRP.

Figure 20B:
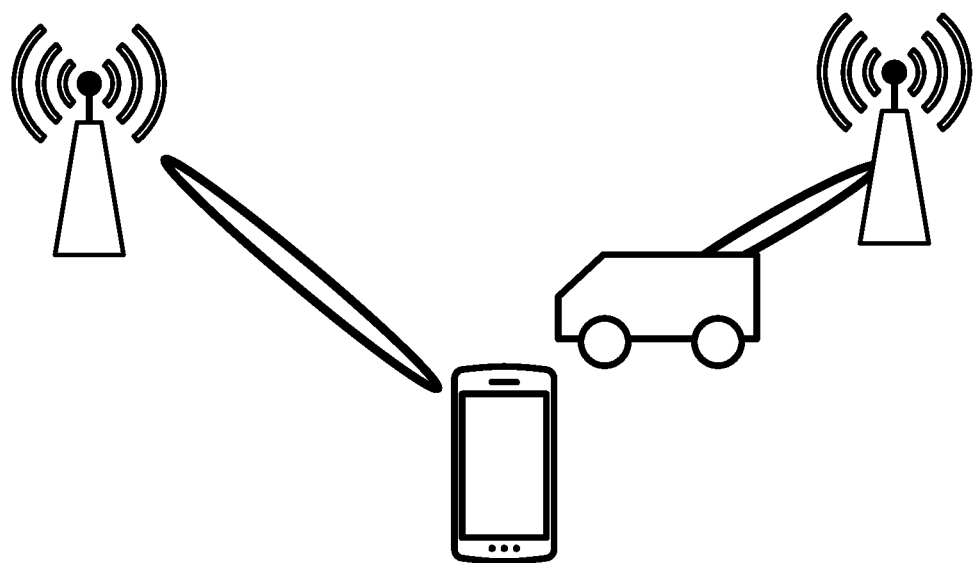

FIG. 20B shows example of a second beam failure scenario. In the example, the gNB may transmit a PDCCH from a beam to a wireless device from a first TRP. When the PDCCH on the beam is blocked, the gNB and the wireless device may start a beam failure recovery procedure on a new beam on a second TRP.

In an example, a wireless device may measure quality of beam pair link using one or more RSs. The one or more RSs may be one or more SS blocks, or one or more CSI-RS resources. A CSI-RS resource may be identified by a CSI-RS resource index (CRI). In an example, quality of beam pair link may be defined as a RSRP value, or a reference signal received quality (e.g. RSRQ) value, and/or a CSI (e.g., SINR) value measured on RS resources. In an example, a gNB may indicate whether an RS resource, used for measuring beam pair link quality, is QCLed (Quasi-Co-Located) with DM-RSs of a PDCCH. The RS resource and the DM-RSs of the PDCCH may be called QCLed when the channel characteristics from a transmission on an RS to a wireless device, and that from a transmission on a PDCCH to the wireless device, are similar or same under a configured criterion. In an example, The RS resource and the DM-RSs of the PDCCH may be called QCLed when doppler shift and/or doppler shift of the channel from a transmission on an RS to a wireless device, and that from a transmission on a PDCCH to the wireless device, are same.

In an example, a wireless device may monitor PDCCH on M beam (e.g. 2, 4, 8) pair links simultaneously, where M≥1 and the value of M may depend at least on capability of the wireless device. In an example, monitoring a PDCCH may comprise detecting a DCI via the PDCCH transmitted on common search spaces and/or wireless device specific search spaces. In an example, monitoring multiple beam pair links may increase robustness against beam pair link blocking. In an example, a gNB may transmit one or more messages comprising parameters indicating a wireless device to monitor PDCCH on different beam pair link(s) in different OFDM symbols.

In an example, a gNB may transmit one or more RRC messages or MAC CEs comprising parameters indicating Rx beam setting of a wireless device for monitoring PDCCH on multiple beam pair links. A gNB may transmit an indication of spatial QCL between an DL RS antenna port(s) and DL RS antenna port(s) for demodulation of DL control channel. In an example, the indication may be a parameter in a MAC CE, or a RRC message, or a DCI, and/or combination of these signaling.

In an example, for reception of data packet on a PDSCH, a gNB may indicate spatial QCL parameters between DL RS antenna port(s) and DM-RS antenna port(s) of DL data channel. A gNB may transmit DCI comprising parameters indicating the RS antenna port(s) QCLed with DM-RS antenna port(s).

In an example, when a gNB transmits a signal indicating QCL parameters between CSI-RS and DM-RS for PDCCH, a wireless device may measure a beam pair link quality based on CSI-RSs QCLed with DM-RS for PDCCH. In an example, when multiple contiguous beam failures occur, the wireless device may start a BFRQ procedure.

In an example, a wireless device transmits a BFRQ signal on an uplink physical channel to a gNB when starting a BFRQ procedure. The gNB may transmit a DCI via a PDCCH in a coreset in response to receiving the BFRQ signal on the uplink physical channel. The wireless may consider the BFRQ procedure successfully completed when receiving the DCI via the PDCCH in the coreset.

In an example, a gNB may transmit one or more messages comprising configuration parameters of an uplink physical channel or signal for transmitting a beam failure recovery request. The uplink physical channel or signal may be based on one of: a contention-free PRACH (BFR-PRACH), which may be a resource orthogonal to resources of other PRACH transmissions; a PUCCH (BFR-PUCCH); and/or a contention-based PRACH resource (CF-PRACH). Combinations of these candidate signal/channels may be configured by the gNB. In an example, when configured with multiple resources for a BFRQ signal, a wireless device may autonomously select a first resource for transmitting the BFRQ signal. In an example, when configured with a BFR-PRACH resource, a BFR-PUCCH resource, and a CF-PRACH resource, the wireless device may select the BFR-PRACH resource for transmitting the BFRQ signal. In an example, when configured with a BFR-PRACH resource, a BFR-PUCCH resource, and a CF-PRACH resource, the gNB may transmit a message to the wireless device indicating a resource for transmitting the BFRQ signal.

In an example, a gNB may transmit a response to a wireless device after receiving one or more BFRQ signals. The response may comprise the CRI associated with the candidate beam the wireless device indicates in the one or multiple BFRQ signals.

In an NR system, when configured with multiple beams, a gNB and/or a wireless device may perform one or more beam management procedure. For example, the wireless device may perform a BFRQ procedure, if one or more beam pair links between the gNB and the wireless device fail.

Figure 21:
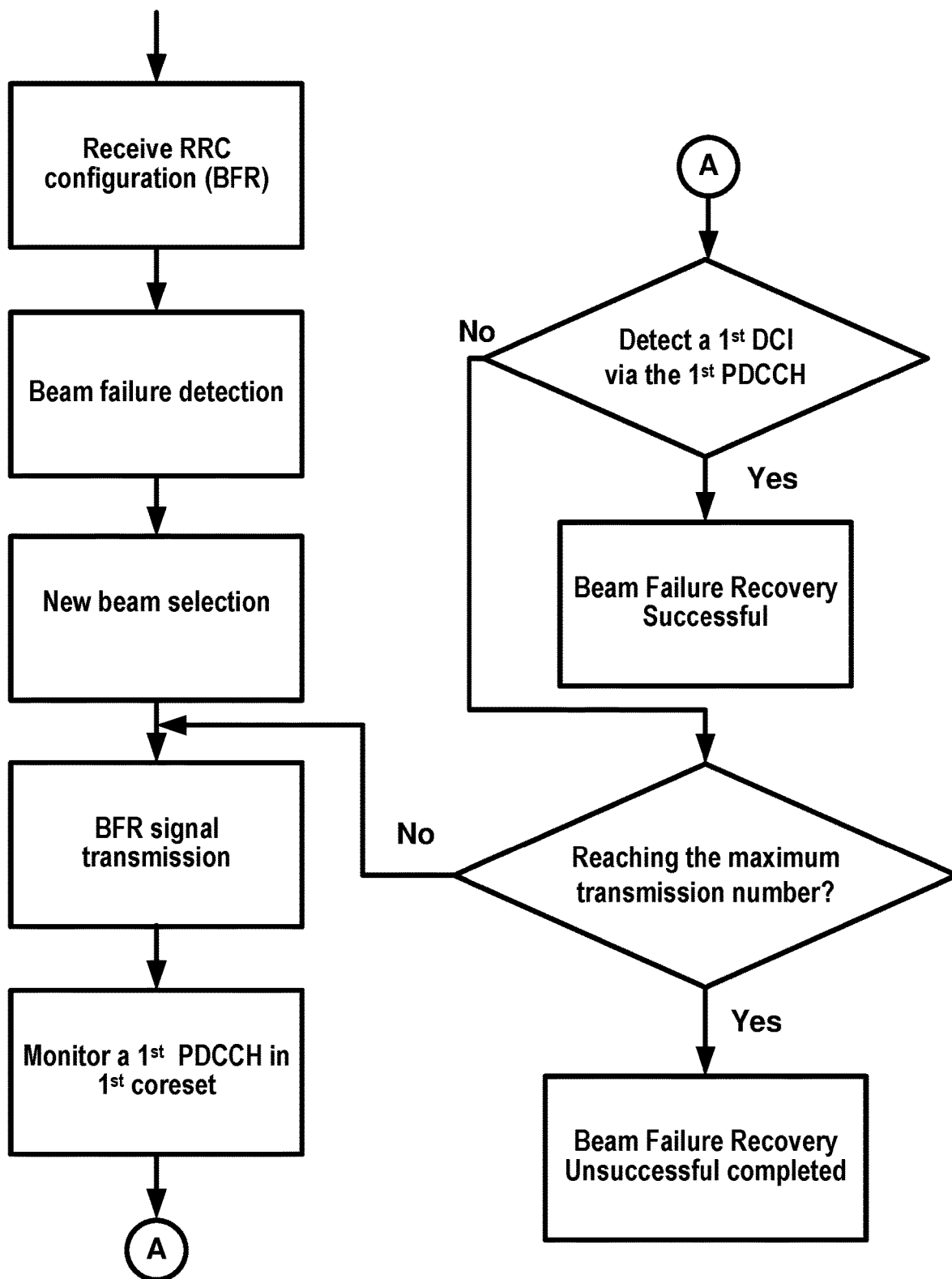
FIG. 21 is an example of downlink beam failure recovery request procedure as per an aspect of an embodiment of the present disclosure.

FIG. 21 shows example of the BFR procedure. A wireless device may receive one or more RRC messages comprising BFR parameters. The wireless device may detect at least one beam failure according to at least one of BFR parameters. The wireless device may start a first timer if configured in response to detecting the at least one beam failure. The wireless device may select a selected beam in response to detecting the at least one beam failure. The selected beam may be a beam with good channel quality (e.g., RSRP, SINR, or BLER) from a set of candidate beams. The candidate beams may be identified by a set of reference signals (e.g., SSBs, or CSI-RSs). The wireless device may transmit at least a first BFR signal to a gNB in response to the selecting the selected beam. The at least first BFR signal may be associated with the selected beam. The wireless device may transmit the at least first BFR signal with a transmission beam corresponding to a receiving beam associated with the selected beam. The at least BFR signal may be a preamble transmitted on a PRACH resource, or a SR signal transmitted on a PUCCH resource, or a beam failure recovery signal transmitted on a PUCCH resource, or a beam report transmitted on a PUCCH/PUSCH resource. The wireless device may start a response window in response to transmitting the at least first BFR signal. In an example, the response window may be a timer with a value configured by the gNB. When the response window is running, the wireless device may monitor a PDCCH in a first coreset. The first coreset may be associated with the BFR procedure. In an example, the wireless device may monitor the PDCCH in the first coreset in condition of transmitting the at least first BFR signal. The wireless device may receive a first DCI via the PDCCH in the first coreset when the response window is running. The wireless device may consider the BFR procedure successfully completed when receiving the first DCI via the PDCCH in the first coreset before the response window expires. The wireless device may stop the first timer if configured in response to the BFR procedure successfully being completed. The wireless device may stop the response window in response to the BFR procedure successfully being completed.

In an example, when the response window expires, and the wireless device does not receive the DCI, the wireless device may, increment a transmission number, wherein, the transmission number is initialized to a first number (e.g., 0) before the BFR procedure is triggered. If the transmission number indicates a number less than the configured maximum transmission number, the wireless device may repeat one or more actions comprising at least one of: a BFR signal transmission; starting the response window; monitoring the PDCCH; incrementing the transmission number if no response received during the response window is running. If the transmission number indicates a number equal or greater than the configured maximum transmission number, the wireless device may declare the BFR procedure is unsuccessfully completed.

A MAC entity of a wireless device may be configured by an RRC with a beam failure recovery procedure. The beam failure recovery procedure may be used for indicating to a serving base station of a new SSB or CSI-RS when a beam failure is detected. The beam failure may be detected on one or more serving SSB(s)/CSI-RS(s) of the serving base station. In an example, the beam failure may be detected by counting a beam failure instance indication from a lower layer of the wireless device (e.g. PHY layer) to the MAC entity.

In an example, an RRC may configure a wireless device with one or more parameters in BeamFailureRecoveryConfig for a beam failure detection and recovery procedure. The one or more parameters may comprise beamFailureInstanceMaxCount for a beam failure detection; beamFailureDetectionTimer for the beam failure detection; beamFailureCandidateBeamThreshold: an RSRP threshold for a beam failure recovery; preamblePowerRampingStep for the beam failure recovery; preambleReceivedTargetPower for the beam failure recovery; preambleTxMax for the beam failure recovery; and ra-ResponseWindow. The ra-ResponseWindow may be a time window to monitor one or more responses for the beam failure recovery using a contention-free Random Access preamble.

In an example, a wireless device may use at least one UE variable for a beam failure detection. BFI_COUNTER may be one of the at least one UE variable. The BFI_COUNTER may be a counter for a beam failure instance indication. The BFI_COUNTER may be initially set to zero.

In an example, if a MAC entity of a wireless device receives a beam failure instance indication from a lower layer (e.g. PHY) of the wireless device, the wireless device may start or restart beamFailureDetectionTimer. In addition to starting or restarting the beamFailureDetectionTimer, the wireless device may increment BFI_COUNTER by one. In an example, the wireless device may initiate a random access procedure (e.g. on an SpCell) in response to the BFI_COUNTER being equal to beamFailureInstanceMaxCount+1. The wireless device may apply the one or more parameters in the BeamFailureRecoveryConfig in response to the initiating the random access procedure. In an example, if the beamFailureDetectionTimer expires, the wireless device may set the BFI_COUNTER to zero. In an example, if the random access procedure is successfully completed, the wireless device may consider the beam failure recovery procedure successfully completed.

If a MAC entity of a wireless device transmits a contention-free random access preamble for a beam failure recovery request (BFRQ), the MAC entity may start ra-ResponseWindow at a first PDCCH occasion from the end of the transmitting the contention-free random access preamble. The ra-ResponseWindow may be configured in BeamFailureRecoveryConfig. While the ra-ResponseWindow is running, the wireless device may monitor at least one PDCCH (e.g. of an SpCell) for a response to the beam failure recovery request. The beam failure recovery request may be identified by a C-RNTI.

In an example, if a MAC entity of a wireless device receives, from a lower layer of the wireless device, a notification of a reception of at least one PDCCH transmission and if the at least one PDCCH transmission is addressed to a C-RNTI and if a contention-free random access preamble for a beam failure recovery request is transmitted by the MAC entity, the wireless device may consider a random access procedure successfully completed.

In an example, a wireless device may initiate a contention-based random access preamble for a beam failure recovery request. When the wireless device transmits Msg3, a MAC entity of the wireless device may start ra-ContentionResolutionTimer. The ra-ContentionResolutionTimer may be configured by RRC. In response to the starting the ra-ContentionResolutionTimer, the wireless device may monitor at least one PDCCH while the ra-ContentionResolutionTimer is running. In an example, if the MAC entity receives, from a lower layer of the wireless device, a notification of a reception of the at least one PDCCH transmission; if a C-RNTI MAC-CE is included in the Msg3; if a random access procedure is initiated for a beam failure recovery and the at least one PDCCH transmission is addressed to a C-RNTI of the wireless device, the wireless device may consider the random access procedure successfully completed. In response to the random access procedure being successfully completed, the wireless device may stop the ra-ContentionResolutionTimer.

In an example, if a random access procedure of a beam failure recovery is successfully completed, the wireless device may consider the beam failure recovery successfully completed.

A wireless device may be configured, for a serving cell, with a first set of periodic CSI-RS resource configuration indexes by higher layer parameter Beam-Failure-Detection-RS-ResourceConfig. The wireless device may further be configured with a second set of CSI-RS resource configuration indexes and/or SS/PBCH block indexes by higher layer parameter Candidate-Beam-RS-List. In an example, the first set and/or the second set may be used for radio link quality measurements on the serving cell. If a wireless device is not provided with higher layer parameter Beam-Failure-Detection-RS-ResourceConfig, the wireless device may determine a first set to include SS/PBCH block indexes and periodic CSI-RS resource configuration indexes. In an example, the SS/PBCH block indexes and the periodic CSI-RS resource configuration indexes may be with same values as one or more RS indexes in one or more RS sets. In an example, the one or more RS indexes in the one or more RS sets may be indicated by one or more TCI states. In an example, the one or more TCI states may be used for respective control resource sets that the wireless device is configured for monitoring PDCCH. The wireless device may expect a single port RS in the first set.

In an example, a first threshold (e.g. Qout,LR) may correspond to a first default value of higher layer parameter RLM-IS-OOS-thresholdConfig. In an example, a second threshold (e.g. Qin,LR) may correspond to a second default value of higher layer parameter Beam-failure-candidate-beam-threshold. A physical layer in the wireless device may assess a first radio link quality according to the first set of periodic CSI-RS resource configurations against the first threshold. For the first set, the wireless device may assess the first radio link quality according to periodic CSI-RS resource configurations or SS/PBCH blocks. In an example, the periodic CSI-RS resource configurations or the SS/PBCH blocks may be associated (e.g. quasi co-located) with at least one DM-RS of PDCCH monitored by the wireless device.

In an example, the wireless device may apply the second threshold to a first L1-RSRP for SS/PBCH blocks. The wireless device may apply the second threshold to a second L1-RSRP for periodic CSI-RS resources after scaling a respective CSI-RS reception power with a value provided by higher layer parameter Pc_SS.

In an example, a physical layer in a wireless device may, in slots where the first radio link quality according to the first set is assessed, provide an indication to higher layers (e.g. MAC). The wireless device may provide an indication to higher layers when the first radio link quality for all corresponding resource configurations in the first set is worse than the first threshold. The wireless device may use the all corresponding resource configurations in the first set to assess the first radio link quality. The physical layer may inform the higher layers (e.g. MAC, RRC) when the first radio link quality is worse than the first threshold with a first periodicity. The first periodicity may be determined by a maximum between the shortest periodicity of periodic CSI-RS configurations or SS/PBCH blocks in the first set and X (e.g. 10 ms).

In an example, in response to a request from higher layers (e.g. MAC), a wireless device may provide to the higher layers the periodic CSI-RS configuration indexes and/or SS/PBCH block indexes from the second set. The wireless device may further provide, to the higher layers, corresponding L1-RSRP measurements that are larger than or equal to the second threshold.

A wireless device may be configured with one control resource set (coreset) by higher layer parameter Beam-failure-Recovery-Response-CORESET. The wireless device may be further configured with an associated search space provided by higher layer parameter search-space-config. The associated search space may be used for monitoring PDCCH in the one control resource set. The wireless device may receive from higher layers (e.g. MAC), by parameter Beam-failure-recovery-request-RACH-Resource, a configuration for a PRACH transmission. For the PRACH transmission in slot n and according to antenna port quasi co-location parameters associated with periodic CSI-RS configuration or SS/PBCH block with a first RS index, the wireless device may monitor the PDCCH for detection of a DCI format starting from slot n+4 within a window. The window may be configured by higher layer parameter Beam-failure-recovery-request-window. The DCI format may be with CRC scrambled by C-RNTI. For a PDSCH reception, the wireless device may assume the antenna port quasi-collocation parameters (e.g. as for monitoring the PDCCH)

until the wireless device receives by higher layers an activation for a TCI state or a parameter TCI-StatesPDCCH.

In an example, if a BWP inactivity timer is configured, for an activated Serving Cell, if a Default-DL-BWP is configured, and an active DL BWP is not a BWP indicated by the Default-DL-BWP; or if the Default-DL-BWP is not configured, and the active DL BWP is not an initial BWP: if a PDCCH addressed to C-RNTI or CS-RNTI indicating downlink assignment or uplink grant is received on the active BWP: if there is not an ongoing random access procedure associated with the activated Serving Cell, the MAC entity may start or restart the BWP inactivity timer associated with the active DL BWP.

In an example, if a BWP inactivity timer is configured, for an activated Serving Cell, if a Default-DL-BWP is configured, and an active DL BWP is not a BWP indicated by the Default-DL-BWP; or if the Default-DL-BWP is not configured, and the active DL BWP is not an initial BWP: if a MAC-PDU is transmitted in a configured uplink grant or received in a configured downlink assignment; if there is not an ongoing random access procedure associated with the activated Serving Cell, the MAC entity may start or restart the BWP inactivity timer associated with the active DL BWP.

In an example, if a BWP inactivity timer is configured, for an activated Serving Cell, if a Default-DL-BWP is configured, and an active DL BWP is not a BWP indicated by the Default-DL-BWP; or if the Default-DL-BWP is not configured, and the active DL BWP is not an initial BWP: if a PDCCH addressed to a C-RNTI is received on the active DL BWP: if an ongoing random access procedure associated with the activated Serving Cell is successfully completed in response to receiving the PDCCH addressed to the C-RNTI, the MAC entity may start or restart the BWP inactivity timer associated with the active DL BWP.

Example of a Beam Failure on SCell

In an example, a base station may transmit, to a wireless device, one or more messages comprising configuration parameters of one or more cells. The one or more cells may comprise at least one PCell/PSCell and one or more SCells. In an example, an SpCell (e.g., PCell or PSCell) and one or more SCells may operate on different frequencies and/or different bands. In an example, an SCell may support a multi-beam operation. In the multi-beam operation, a wireless device may perform one or more beam management procedures (e.g., a beam failure recovery procedure) on the SCell. The wireless device may perform a beam failure recovery (BFR) procedure when at least one of one or more beam pair links between the SCell and the wireless device fails. Existing BFR procedures may result in inefficiencies when there is a beam failure for one of the one or more SCells.

Example embodiments enhance existing BFR procedures to improve downlink radio efficiency and reduce uplink signaling overhead when there is a beam failure for an SCell. In an example, downlink signaling processes are enhanced for recovery of a beam failure for an SCell. In an example, uplink signaling is enhanced for recovery a beam failure for an SCell. Example embodiments provide processes for a wireless device and a base station to enhance a beam failure recovery (BFR) procedure for an SCell.

When there is a beam failure on an SCell, a wireless device may not receive a DCI (e.g. a downlink assignment or an uplink grant) on at least one PDCCH in one or more coresets of the SCell. In response to not receiving the DCI, the wireless device may not restart SCellDeactivationTimer. In an example, an expiry of the SCellDeactivationTimer may occur before a base station expects the SCellDeactivationTimer to expire. The base station may not be aware of the expiry of the SCellDeactivationTimer.

The wireless device may deactivate the SCell in response to the expiry of the SCellDeactivationTimer. In an example, the deactivating the SCell may result in an interruption of an ongoing BFR procedure. In an example, in response to the deactivating the SCell, the base station may reactivate the SCell (via SCell Activation/Deactivation MAC-CE). The reactivating the SCell may result in unnecessary signaling and overhead. In an example, recovering a beam failure on the SCell via the ongoing BFR procedure may be faster than the deactivating and the reactivating the SCell.

Example embodiments enhance existing BFR procedures to improve downlink radio efficiency and reduce uplink signaling overhead when carrier aggregation (CA) is configured for a wireless device.

Example of a Beam Failure on BWP

A base station may configure a wireless device with one or more BWPs to achieve a bandwidth adaptation (BA). For example, a base station may indicate, to a wireless device, which of the one or more (configured) BWPs is an active BWP. The active BWP may comprise an active UL BWP and/or an active DL BWP configured by a higher layer (e.g. RRC).

In an example paired spectrum (e.g., FDD), a gNB and/or a wireless device may switch to an active DL BWP and an active UL BWP independently. In an example unpaired spectrum (e.g., TDD), a gNB and/or a wireless device may switch to an active DL BWP and an active UL BWP simultaneously. A wireless device may perform BWP switching between one or more (configured) BWPs, in response to receiving a DCI (e.g., BWP switching DCI), or in response to a BWP inactivity timer expiring, or in response to initiating a random access procedure.

In an example, when configured with a BWP inactivity timer for a serving cell, a wireless device may switch to a default DL BWP, in response to an expiry of the BWP inactivity timer. The default DL BWP may be configured by a network. The switching the active DL BWP to the default DL BWP may activate the default DL BWP and/or deactivate the active DL BWP.

In existing beam recovery procedures, when a wireless device detects a beam failure on an active BWP, the wireless device may initiate a BFR procedure for the active BWP. In an example, while the BFR procedure is ongoing, the wireless device may miss a DCI transmitted from a base station. In response to the missing the DCI, a first BWP inactivity timer at the wireless device and a second BWP inactivity timer at a base-station for the wireless device may become out of synchronization. The base station may not identify on which DL BWP the wireless device is operating (e.g. active DL BWP or active DL/UL BWP pair). The base station may transmit a downlink signal (e.g. RAR, DCI) on a BWP which may be deactivated by the wireless device due to the first BWP inactivity timer expiring. This misalignment may lead to unnecessary delays, data losses or signaling overhead.

In an example, during a BFR procedure, misalignment on which BWP is an active BWP at a base station and a wireless device may occur when the wireless device misses a DCI transmitted from the base station. In an example, the DCI may indicate BWP switching. In an example, the DCI may indicate an uplink grant or a downlink assignment which may restart a BWP inactivity timer. The base station may not be aware that the wireless device misses detecting the DCI for BWP switching. Recovery from the misalignment caused by the wireless device missing the DCI for BWP switching may result in a transmission delay and signaling overhead.

In an example, due to misalignment on an active BWP between a wireless device and a base station, the base station may not be aware of an expiry of an BWP inactivity timer. In an example, the wireless device may switch from an active DL BWP to a default DL BWP in response to the expiry of the BWP inactivity timer. The base station may assume the wireless device operating on the active DL BWP. In response to receiving a beam failure recovery request (BFRQ) signal (e.g., preamble) via an active UL BWP for a BFR procedure of the active DL BWP, the base station may not know on which DL BWP a response of the BFRQ signal is transmitted. In an example, the base station may transmit the response on the active DL BWP, which the wireless device may not be monitoring. This may increase the latency of the BFR procedure. In an example, the base station may transmit the response of the BFRQ signal on both the active DL BWP and the default DL BWP. This may result in a waste of radio resource for redundant transmission of the response.

In an example embodiment, a wireless device may perform one or more beam management procedures (e.g., a BFR procedure) on an active BWP. The wireless device may perform a BFR procedure when at least one of one or more beam pair links of the wireless device on the active BWP fails. There is a need to improve existing BFR procedures. Example embodiments enhance existing BFR procedures to improve downlink radio efficiency and reduce uplink signaling overhead when BWPs are configured for a cell.

In an example embodiment, uplink resources/configuration of a BFRQ signal on a first UL BWP may be linked to a first DL BWP. The linkage may be implicit or explicit. The wireless device may monitor a response of the BFRQ signal on the first DL BWP. The first DL BWP may be different than the active DL BWP. The wireless device may perform switching to the first DL BWP for monitoring the response of the BFRQ signal in response to transmitting the BFRQ signal.

In an example embodiment, linking between a UL BWP (e.g., non-initial) and a DL BWP (e.g., non-initial) may be introduced to reduce redundant transmissions of a response of a BFRQ signal. This may reduce network complexity. In an example, a first UL BWP may be linked with a first DL BWP. A wireless device may transmit a first preamble for a BFR procedure via the first UL BWP. The first preamble may be a BFRQ signal of a BFR procedure. In response to receiving the first preamble, the base station may transmit a response of the first preamble on the first DL BWP. In an example, a wireless device may be active on a second DL BWP on which at least a beam failure is identified. In response to transmitting the first preamble via the first UL BWP, the wireless device may switch from the second DL BWP to the first DL BWP to receive a response of the first preamble. In an example, the wireless device may switch from the second DL BWP to the first DL BWP before the transmitting the first preamble.

In an example, the second DL BWP may not be an initial BWP. In an example, the second DL BWP may not be a default DL BWP. In an example, the linkage may be indicated to the wireless device via system information. In an example, the linkage may be controlled by a network in an implicit way (i.e., left to the network's implementation).

In response to the switching, the wireless device may start monitoring, for a DCI, on at least one PDCCH in one or more coresets of the first DL BWP. The DCI may be a response of the BFRQ signal. In response to receiving the DCI, the BFR procedure may be successfully completed.

In an example embodiment, in response to an expiry of an BWP inactivity timer during an ongoing BFR procedure, the wireless device may switch an active BWP to a default BWP. In an example, in response to the switching the active BWP, the wireless device may stop or abort the ongoing BFR procedure. It may be desirable for the wireless device to switch to the default BWP, when the default BWP has a small coreset. Monitoring the small coreset on the default BWP may reduce power consumption of the wireless device. In an example, a second PDCCH in a coreset of the default BWP may not have a beam failure. The second PDCCH of the default BWP may be robust against a beam failure. In an example, a first probability of missing a first DCI in one or more first coresets of the active BWP may be higher than a second probability of missing a second DCI in one or more second coresets of the default BWP.

In an example, in response to switching from an active BWP to a default BWP, a wireless device may start monitoring at least one second PDCCH in one or more coresets of the default BWP. In an example, in response to switching the active BWP, the wireless device may initiate an uplink transmission (e.g. RACH). The base station may be aware of the wireless device switching the active BWP in response to receiving the uplink transmission via the default BWP. In an example, the wireless device may transmit a CSI report based on measurement of a CSI-RS resource associated to the default BWP. In response to receiving the CSI report, the base station may be aware of the default BWP that the wireless device is operating.

In an example embodiment, in response to initiating a BFR procedure, a wireless device may stop a BWP inactivity timer to avoid an unpredicted behavior between a base station and the wireless device. The stopping the BWP inactivity timer during the BFR procedure may avoid implicit BWP switching during the BFR procedure. When a base station receives a BFRQ signal (e.g., preamble) for the BFR procedure, the base station may be aware of the BFR procedure of a DL BWP. The DL BWP may be an active DL BWP that the wireless device is operating on. In response to receiving the BFRQ signal, the base station may transmit a response of the BFRQ signal on the DL BWP. In an example, the wireless device may restart the BWP inactivity timer in response to receiving the response of the BFRQ signal.

In an example, when one or more downlink control channels of an active DL BWP of a serving cell recover during a random access procedure for a beam failure recovery, a wireless device may receive at least one PDCCH. In an example, the at least one PDCCH may be addressed to a C-RNTI of the wireless device. In an example, the at least one PDCCH may be addressed to a CS-RNTI of the wireless device. In response to receiving the at least one PDCCH, the wireless device may stop the random access procedure for the beam failure recovery. In response to stopping the random access procedure, the wireless device may restart the bandwidthPartInactivityTimer associated with the active DL BWP.

In an example, when one or more downlink control channels of an active DL BWP of a serving cell recover during a random access procedure for a beam failure recovery, a wireless device may receive at least one MAC PDU. The at least one MAC PDU may be received in a configured downlink assignment. In response to receiving the at least one MAC PDU, the wireless device may stop the random access procedure for the beam failure recovery. In response to stopping the random access procedure, the wireless device may restart the bandwidthPartInactivityTimer associated with the active DL BWP.

Example embodiments may reduce a duration of a random access procedure for a beam failure recovery. This may reduce battery power consumption. Example embodiments may reduce a duration of activity in an active DL BWP. In an example, the active DL BWP may have a wider bandwidth than a default DL BWP. The monitoring the active DL BWP may result in a high power consumption (e.g. battery). Restarting bandwidthPartInactivityTimer may be used to switch the wireless device from the active DL BWP to the default DL BWP. This may reduce battery power consumption.

Figure 22:
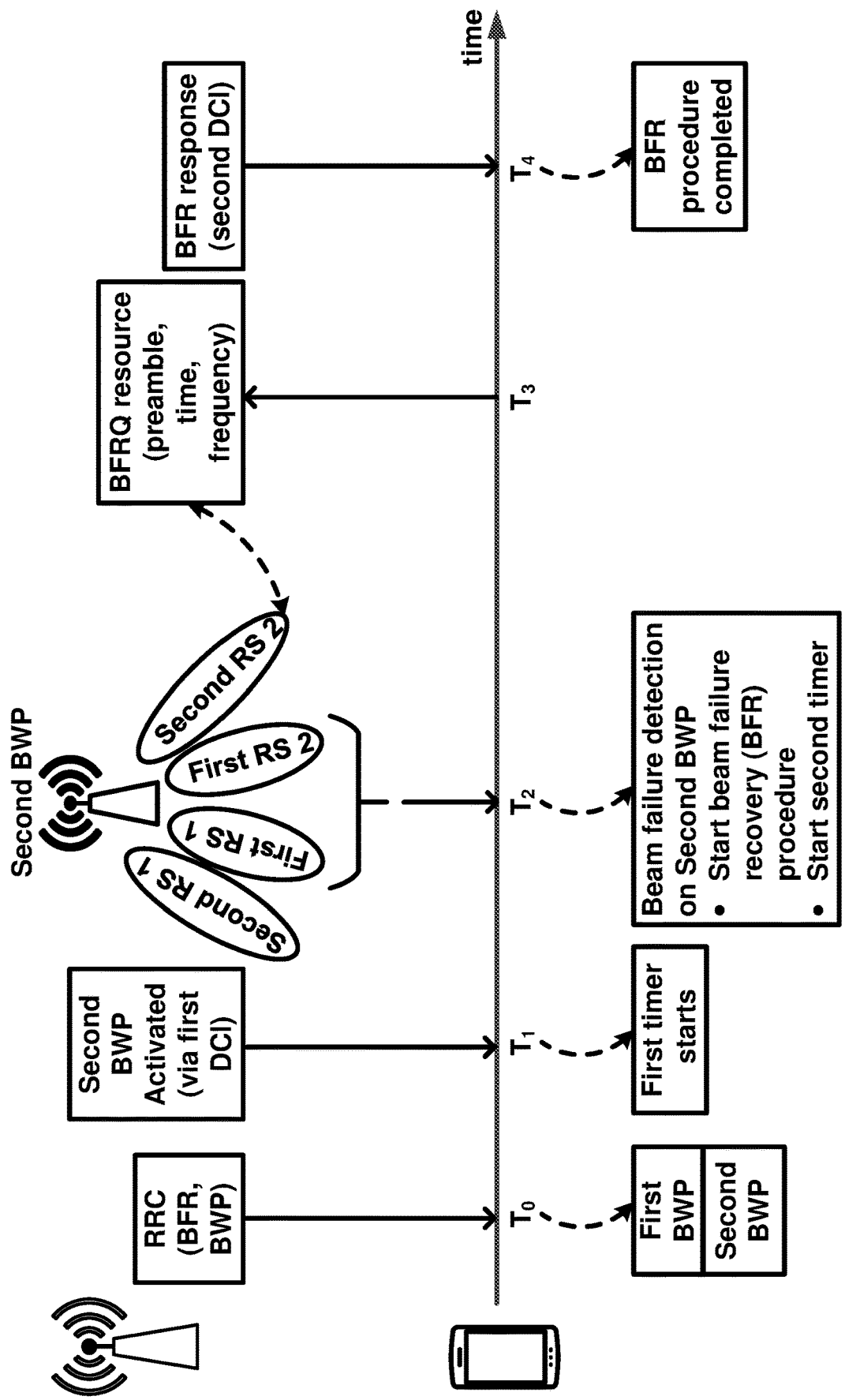
FIG. 22 is an example of downlink beam failure recovery procedure for a bandwidth part as per an aspect of an embodiment of the present disclosure.
Figure 23:
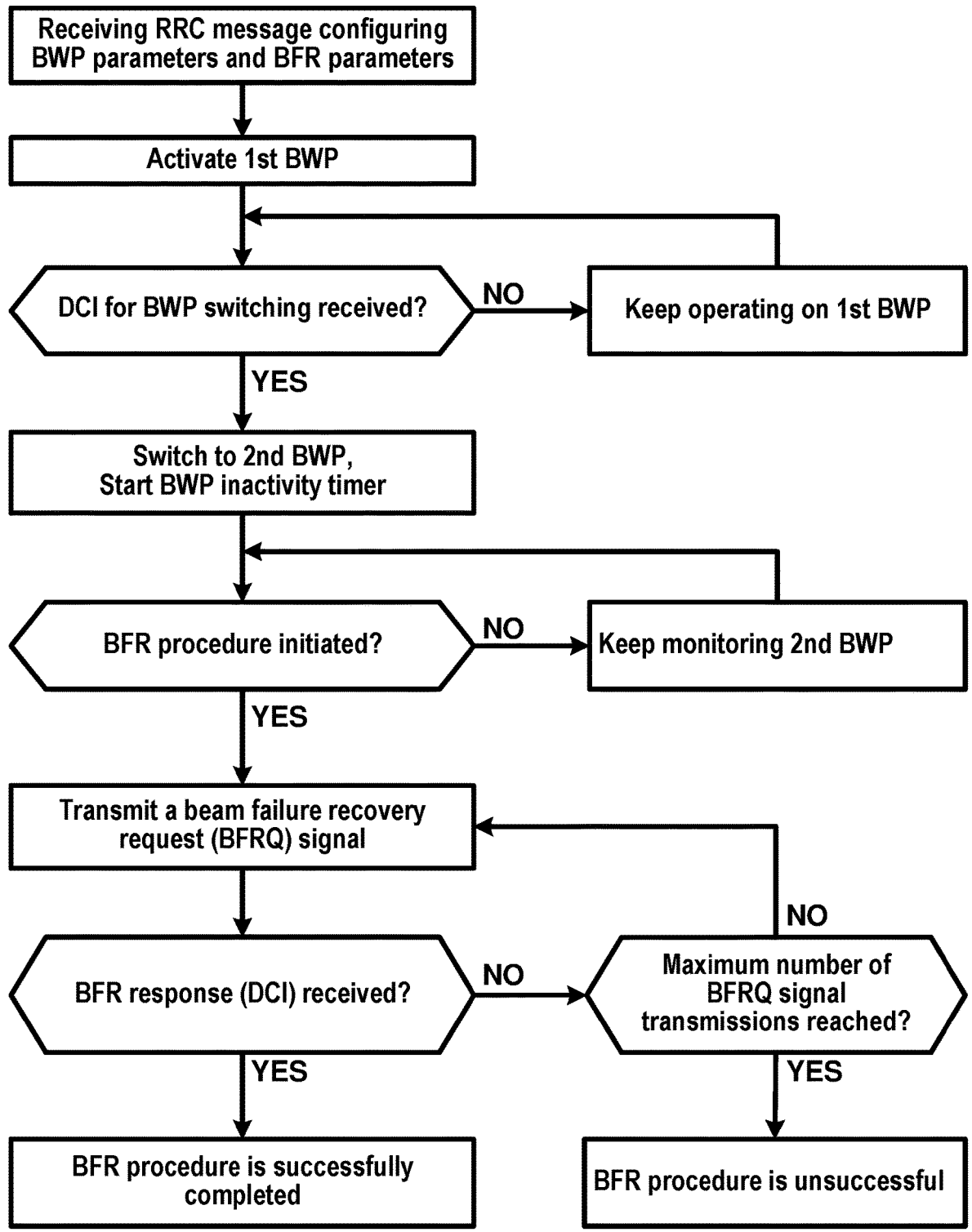
FIG. 23 is an example flowchart of downlink beam failure recovery procedure for a bandwidth part as per an aspect of an embodiment of the present disclosure.

FIG. 22 is an example of downlink beam failure recovery procedure for a bandwidth part as per an aspect of an embodiment of the present disclosure. FIG. 23 is a flow diagram of the downlink beam failure recovery procedure disclosed in FIG. 22. In FIG. 22, a wireless device may receive one or more messages comprising configuration parameters in time T0. The one or more messages may comprise one or more RRC messages (e.g. RRC connection reconfiguration message, or RRC connection reestablishment message, or RRC connection setup message). In an example, the configuration parameters may comprise bandwidth part (BWP) configuration parameters for a plurality of BWPs comprising a first BWP (e.g., default BWP) and a second BWP (e.g., non-default BWP). The configuration parameters may further comprise one or more beam failure recovery (BFR) configuration parameters. The one or more BFR configuration parameters may comprise a first set of RS resource configurations for the second BWP. The first set of RS resource configurations may comprise one or more first RSs (e.g., CSI-RS or SS blocks) of the second BWP. The one or more BFR configuration parameters may further comprise a second set of RS resource configurations comprising one or more second RSs (e.g., CSI-RS or SS blocks) of the second BWP. The wireless device may measure radio link quality of one or more beams associated with the one or more first RSs and/or the one or more second RSs. The one or more BFR configuration parameters may further comprise one or more beam failure recovery request (BFRQ) resources associated with the second BWP. In an example, the one or more BFR configuration parameters may further comprise an association between each of the one or more second RSs and each of the one or more BFRQ resources.

In an example, a wireless device may receive a first DCI indicating switching a current active BWP from a first BWP to a second BWP. In an example, the first DCI may comprise a BWP indicator. The wireless device may determine that the first DCI indicates BWP switching in response to the BWP indicator indicating a BWP different from the current active BWP. At time T1, the wireless device may start a first timer in response to switching the current active BWP from the first BWP to the second BWP.

In an example, the wireless device may assess a first radio link quality of the one or more first RSs (First RS 1 and First RS 2 in FIG. 22) of the second BWP against a first threshold. In an example, the first threshold (e.g. hypothetical BLER, L1-RSRP) may be a first value provided by a higher layer (e.g. RRC, MAC). The wireless device may monitor at least one PDCCH of the second BWP. At least one RS (e.g., DM-RS) of the at least one PDCCH may be associated with (e.g., QCLed) the one or more first RSs.

A wireless device may detect a beam failure on the second BWP when the first radio link quality of the one or more first RSs meets certain criteria. For example, a beam failure may occur when RSRP/SINR of the one or more first RSs is lower than the first threshold and/or BLER is higher than the first threshold. The assessment may be for a consecutive number of times with a value provided by a higher layer (e.g. RRC, MAC).

In response to detecting the beam failure on the second BWP, the wireless device may initiate a random access procedure for a beam failure recovery (BFR) procedure for the second BWP (time T2 in FIG. 22). In response to initiating the BFR procedure, the wireless device may start a second timer (e.g., if configured) and/or initiate a candidate beam identification procedure. For the candidate beam identification procedure, the wireless device may identify a first RS in the one or more second RSs. The first RS (Second RS 2 in FIG. 22) may be associated with a BFRQ resource of the one or more BFRQ resources. The BFRQ resource may comprise at least one preamble and at least one PRACH (e.g. time and/or frequency) resource. In an example, a second radio link quality (e.g. BLER, L1-RSRP) of the first RS may be better (e.g. lower BLER or higher L1-RSRP or higher SINR) than a second threshold. In the example, the second threshold may be a second value provided by the higher layer (e.g. RRC, MAC).

In an example, in response to detecting the beam failure on the second BWP and identifying the first RS of the second BWP, the wireless device may transmit, in a first slot, the at least one preamble via the at least one PRACH resource for a BFR procedure of the second BWP (time T3 in FIG. 22). In response to transmitting the at least one preamble in the first slot, the wireless device may start, from a second slot, monitoring for a BFR response. The monitoring for the BFR response may comprise monitoring at least one second PDCCH in one or more coresets for a second DCI (e.g. a downlink assignment or an uplink grant) within a configured response window. The second DCI may be with CRC scrambled by a C-RNTI of the wireless device. The at least one second PDCCH in one or more coresets may or may not be on the second BWP.

In an example, in response to receiving the second DCI on the at least one second PDCCH in the one or more coresets, within the configured response window, the random access procedure for the BFR procedure may be successfully completed (time T4 in FIG. 22).

In an example, a wireless device may initiate a BFR procedure in response to detecting at least one beam failure indication of an active DL BWP. The at least one beam failure may be associated with at least one downlink control channels of the active DL BWP. In an example, an BWP inactivity timer may expire while the BFR procedure is ongoing (e.g. before a random access procedure for a BFR procedure is initiated). In an example, in response to an expiry of an BWP inactivity timer while the BFR procedure is ongoing, the wireless device may switch the active DL BWP to a default DL BWP.

In an example, in a paired spectrum (e.g., FDD system), a wireless device may only switch an active DL BWP to a default DL BWP in response to an expiry of an BWP inactivity timer. The BWP inactivity timer may be associated with the active DL BWP.

In an example, the wireless device may transmit at least one preamble via at least one PRACH resource for the BFR procedure on an active UL BWP. The active UL BWP may be active before the expiry of the BWP inactivity timer. When the wireless device switches to the default DL BWP, the wireless device may not monitor the at least one downlink control channels of the active DL BWP. In an example, the wireless device may start monitoring at least one second downlink control channels of the default DL BWP in response to the switching to the default DL BWP.

In an example embodiment, the wireless device may stop the beam failure recovery procedure associated with the at least one downlink control channels of the active DL BWP in response to the switching to the default DL BWP. In an example, in response to an expiry of an BWP inactivity timer while a BFR procedure is ongoing (i.e., after detecting a beam failure), a wireless device may stop or abort the ongoing beam failure recovery procedure.

In an example, a base station may not transmit a DCI indicating a downlink assignment or an uplink grant during an ongoing BFR procedure. A BWP inactivity timer may expire during the ongoing BFR procedure. A wireless device may switch an active BWP to a default BWP in response to the BWP inactivity timer being expired. The base station may be aware of the wireless device switching the active BWP to the default BWP due to the aligned BWP inactivity timer being expired. The base station may transmit a DCI on the default BWP. The wireless device may monitor at least one second downlink control channels of the default DL BWP. The embodiment may avoid a DL data loss and reduce signaling overhead and latency used on beam failure recovery.

In an example, during the BFR procedure triggered on an active DL BWP, a wireless device may not receive a DCI (e.g. a downlink assignment or an uplink grant) on at least one PDCCH in one or more coresets of the active DL BWP. The wireless device may not restart a BWP inactivity timer, which may result in the BWP inactivity timer being expired. The BWP inactivity timer being expired at the wireless device may be not known to the base station. Example embodiment may solve the misalignment caused by the wireless device missing the DCI.

In an example, in response to the expiry of the BWP inactivity timer, the wireless device may switch the active BWP to a default BWP. In an example, in response to the switching the active BWP, the wireless device may stop or abort the BFR procedure. The wireless device may start monitoring at least one second PDCCH in one or more coresets of the default BWP. In an example, the base station may transmit a DCI on the one or more coresets of the active BWP. The wireless device may miss the DCI. This may result in a DL data loss. In an example, in response to switching the active BWP, the wireless device may initiate an uplink transmission (e.g. RACH). The base station may be aware of the wireless device switching the active BWP in response to receiving the uplink transmission.

In legacy systems, the wireless device may not stop a BWP inactivity timer when the wireless device transmits an uplink signal (e.g., UCI, SR) via uplink control channels for BFR procedure. In an example implementation, the BWP inactivity timer keeps running (until it is expired) when the wireless device transmits an uplink signal (e.g., UCI, SR) via uplink control channels for BFR procedure. The BFR procedure may continue after the BWP inactivity timer expires. The wireless device may switch from an active BWP (e.g., non-default BWP) to a default BWP based on an expiry of the BWP inactivity timer. Continuing the BFR procedure for a BWP in the default BWP may create inefficiencies if the base station does not switch the wireless device back to the active BWP (the BWP) from the default BWP within a relatively short time (e.g., 5 ms, 20 ms, etc.). The wireless device may transmit uplink signals for the BFR procedure in the default BWP if the wireless device continues the BFR procedure for the BWP in the default BWP. This may result in increased interference to other cells and/or users. The wireless device may monitor downlink control channels of the default BWP for the BFR procedure if the wireless device continues the BFR procedure for the BWP in the default BWP. This may result in increased power and/or battery consumption of the wireless device. There is a need to implement an enhanced procedure for the BFR of the wireless device.

Example embodiments implements an enhanced BFR procedure for a BWP, for example, when a PUCCH based BFR procedure is initiated. A wireless device may continue running a BWP inactivity timer when a PUCCH based BFR is initiated. The wireless device may abort the ongoing BFR procedure for an active BWP when the BWP inactivity timer expires during the BFR procedure. The wireless device may switch to the default BWP from the active BWP based on expiry of the BWP inactivity timer. This enhanced process improves uplink control signaling, reduces uplink overhead and interference, and reduces wireless device battery power consumption.

Figure 24:
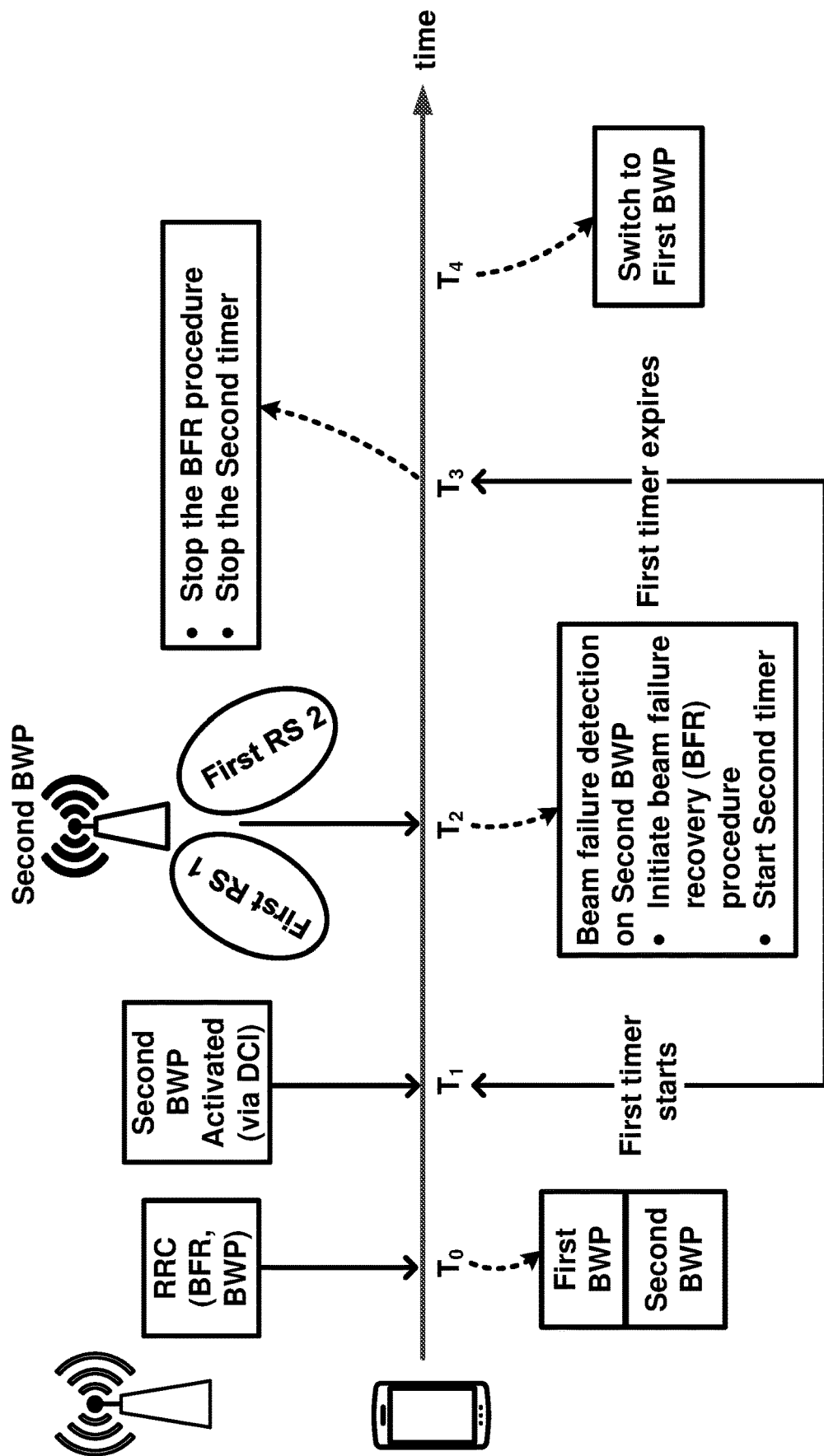
FIG. 24 is an example of downlink beam failure recovery procedure for a bandwidth part as per an aspect of an embodiment of the present disclosure.
Figure 25:
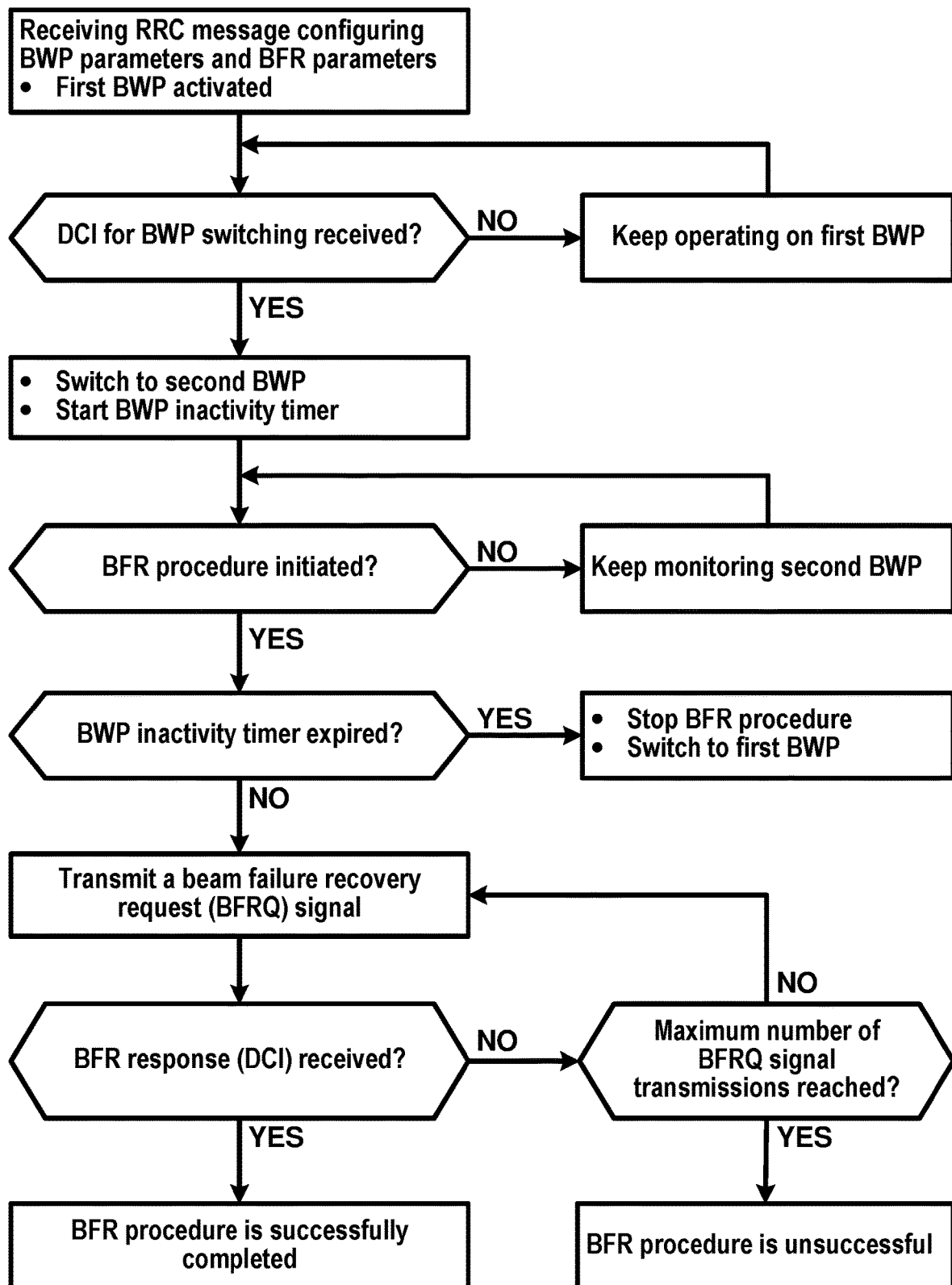
FIG. 25 is an example flowchart of downlink beam failure recovery procedure for a bandwidth part as per an aspect of an embodiment of the present disclosure.

FIG. 24 is an example of downlink beam failure recovery procedure for a bandwidth part as per an aspect of an embodiment of the present disclosure. FIG. 25 is a flow diagram of the downlink beam failure recovery procedure disclosed in FIG. 24. A wireless device may receive one or more messages comprising configuration parameters at time T0. In an example, the configuration parameters may comprise BWP configuration parameters for a plurality of BWPs comprising a first BWP (e.g., default BWP) and a second BWP (e.g., non-default BWP). The configuration parameters may further comprise BFR configuration parameters comprising one or more first RSs. The first BWP may be a current active BWP of a cell. In an example, a wireless device may receive a DCI indicating switching the current active BWP from the first BWP to the second BWP. In an example, the DCI may comprise a BWP indicator. The wireless device may determine that the DCI indicates BWP switching in response to the BWP indicator indicating a BWP different from the current active BWP. At time T1, the wireless device may start a first timer in response to switching the current active BWP from the first BWP to the second BWP.

In an example, the wireless device may initiate a BFR procedure for the second BWP in response to detecting a beam failure based on one or more first RSs (First RS 1 and First RS 2 in FIG. 24) of the second BWP (time T2 in FIG. 24). In response to initiating the BFR procedure, the wireless device may start a second timer (e.g., if configured). At time T3, the first timer may expire while the BFR procedure is ongoing. In an example, the wireless device may stop/abort the BFR procedure for the second BWP in response to the expiry of the first timer at T3. In an example, the wireless device may stop/reset the second timer. At time T4, the wireless device may switch the current active BWP from the second BWP to the first BWP in response to the stopping/aborting the BFR procedure.

In an example, the wireless device may initiate an uplink transmission via the first BWP in response to the switching the current active BWP. In an example, the wireless device may monitor at least one PDCCH of the first BWP in response to the switching the current active BWP. The base station may be aware of the wireless device operating on the first BWP. The base station may transmit a DCI (e.g. uplink grant or a downlink assignment) on the first BWP. This may reduce a DL data loss of the wireless device. In an example, this may reduce a latency of a data transmission.

In an example, a default BWP may have a narrow bandwidth. In an example, an active DL BWP may have a wide bandwidth. When a wireless device is monitoring the active DL BWP for a long time without activity, the wireless device may move to the default BWP (e.g. default UL BWP and/or default DL BWP) for power saving. In an example, monitoring for a DCI in the narrow bandwidth (e.g. default BWP) may reduce power consumption. Monitoring the wide bandwidth until receiving the DCI may not be power efficient. Example embodiment may provide a mechanism to reduce a power consumption for the wireless device.

In an example, a wireless device may receive, from a base station, one or more messages comprising one or more configuration parameters. The one or more configuration parameters may indicate at least one of a plurality of bandwidth parts (BWPs) and a first value of a first BWP inactivity timer. The plurality of BWPs may comprise a first BWP and a second BWP. In an example, the one or more configuration parameters may further indicate at least one of: one or more first reference signals of the first BWP; one or more second RSs of the first BWP; and one or more beam failure recovery request (BFRQ) resources on the first BWP. In an example, the one or more configuration parameters may further indicate an association between each of the one or more second RSs and each of the one or more BFRQ resources. In an example, the one or more first RSs may comprise one or more first CSI-RSs and/or one or more first SS blocks. In an example, the one or more second RSs may comprise one or more second CSI-RSs and/or one or more second SS blocks.

In an example, the wireless device may start the first BWP inactivity timer with the first value in response to switching to the first BWP as an active BWP. In an example, the wireless device may initiate a random access procedure for a beam failure recovery in response to reaching a number of beam failure instance indications for the first BWP. In an example, the number of beam failure instance indications may be configured by a higher layer (e.g. RRC). In an example, the beam failure instance indications may comprise an indication of a beam failure instance from a physical layer of the wireless device to a medium-access layer of the wireless device. The beam failure instance may comprise assessing the one or more first RSs with radio quality lower than a first threshold. In an example, the first threshold may be based on hypothetical BLER, or RSRP, or RSRQ, or SINR.

In an example, the random access procedure may comprise selecting a selected RS, in the one or more second RSs. The selected RS may be associated with a BFRQ resource. In an example, the BFRQ resource may be one of the one or more BRFQ resources. In an example, the BFRQ resource may comprise at least one preamble and at least one random access channel resource. The random access procedure may further comprise transmitting, by the wireless device, the at least one preamble via the at least one random access channel resource. The at least one random access channel resource may comprise one or more time resources and/or one or more frequency resources. In an example, the selected RS may be associated with one of the one or more second RSs with radio quality higher than a second threshold. The second threshold may be based on L1-RSRP, or RSRQ, or hypothetical BLER, or SINR.

In an example, the wireless device may stop or abort the beam failure recovery in response to an expiry of the first BWP inactivity timer. In an example, the wireless device may switch the first BWP to the second BWP as the active BWP in response to the expiry of the first BWP inactivity timer. The wireless device may start monitoring, for a control information, a downlink control channel of the second BWP. In an example, the wireless device may initiate an uplink transmission (e.g. RACH) on the second BWP.

In an example embodiment, the wireless device may stop a BWP inactivity timer of a cell based on the initiation of a BFR procedure using random-access procedure associated with the cell. In an example embodiment, the wireless device may stop the BWP inactivity timer based on the initiation of a random-access procedure for a BFR. In an example embodiment, the BWP inactivity timer does not expire during a RACH based BFR procedure.

In legacy systems, the wireless device may not stop a BWP inactivity timer when the wireless device transmits an uplink signal (e.g., UCI, SR) via uplink control channels for BFR procedure. In an example implementation, the BWP inactivity timer keeps running (until it is expired) when the wireless device transmits an uplink signal (e.g., UCI, SR) via uplink control channels for BFR procedure. The BFR procedure may continue after the BWP inactivity timer expires. The wireless device may switch from an active BWP (e.g., non-default BWP) to a default BWP based on an expiry of the BWP inactivity timer. Continuing the BFR procedure for a BWP (e.g., the active BWP) in the default BWP may create inefficiencies if the base station does not switch the wireless device back to the active BWP (e.g., the BWP) from the default BWP within a relatively short time (e.g., 5 ms, 20 ms, etc.). The wireless device may transmit uplink signals for the BFR procedure in the default BWP if the wireless device continues the BFR procedure for the BWP in the default BWP. This may result in increased interference to other cells and/or users. The wireless device may monitor downlink control channels of the default BWP for the BFR procedure if the wireless device continues the BFR procedure for the BWP in the default BWP. This may result in increased power and/or battery consumption of the wireless device. There is a need to implement an enhanced procedure for the BFR of the wireless device.

Example embodiments implements an enhanced BFR procedure for a BWP, for example, when a PUCCH based BFR procedure is initiated. In an enhanced BFR procedure, a wireless device may stop running a BWP inactivity timer when a PUCCH based BFR is initiated. The wireless device may continue the ongoing BFR procedure for an active BWP and the BWP inactivity timer is stopped during the BFR procedure. The wireless device may not switch to the default BWP from the active BWP based on expiry of the BWP inactivity timer. This enhanced process improves uplink control signaling, reduces uplink overhead and interference, and reduces wireless device battery power consumption.

Figure 26:
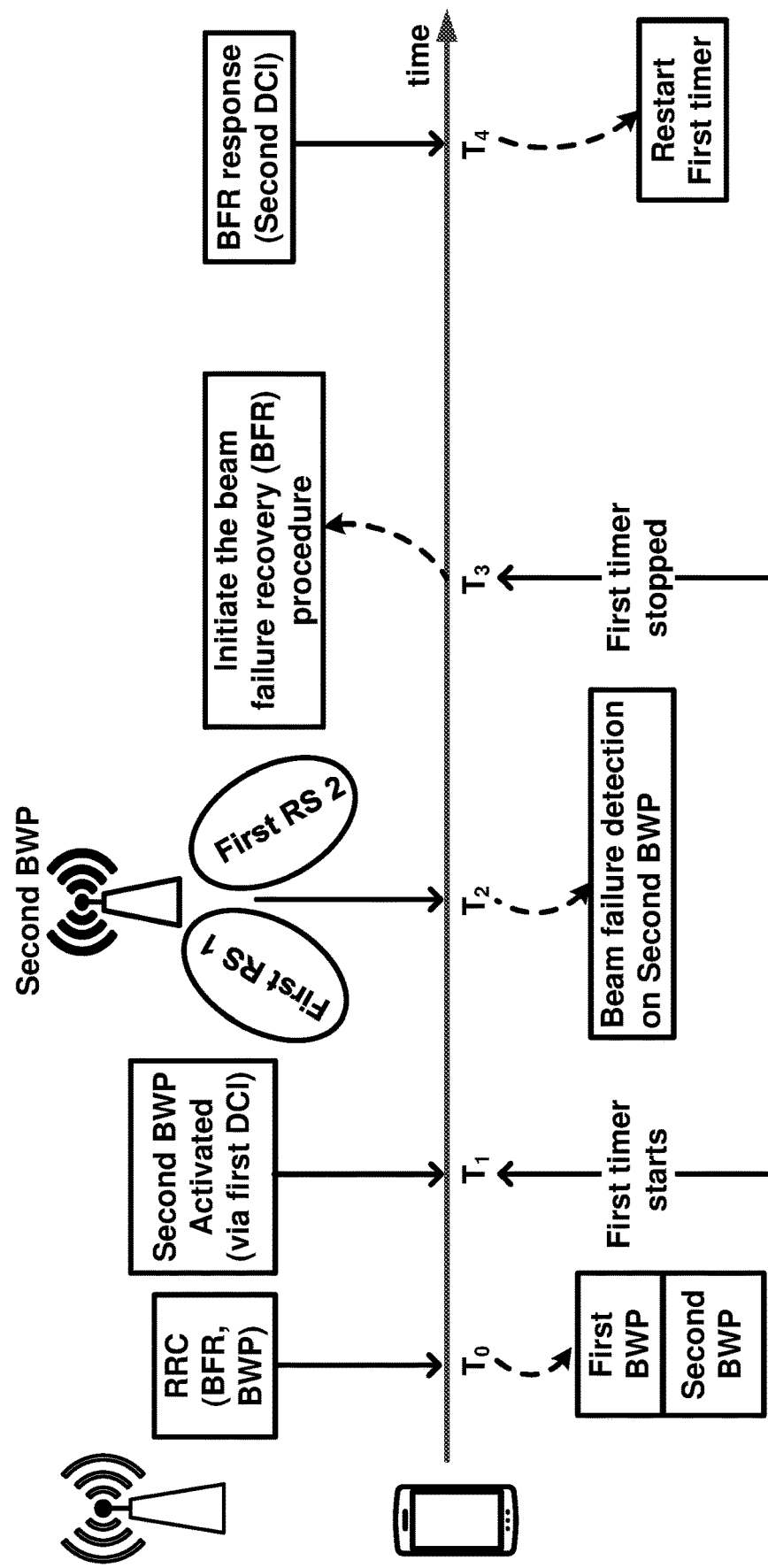
FIG. 26 is an example of downlink beam failure recovery procedure for a bandwidth part as per an aspect of an embodiment of the present disclosure.
Figure 27:
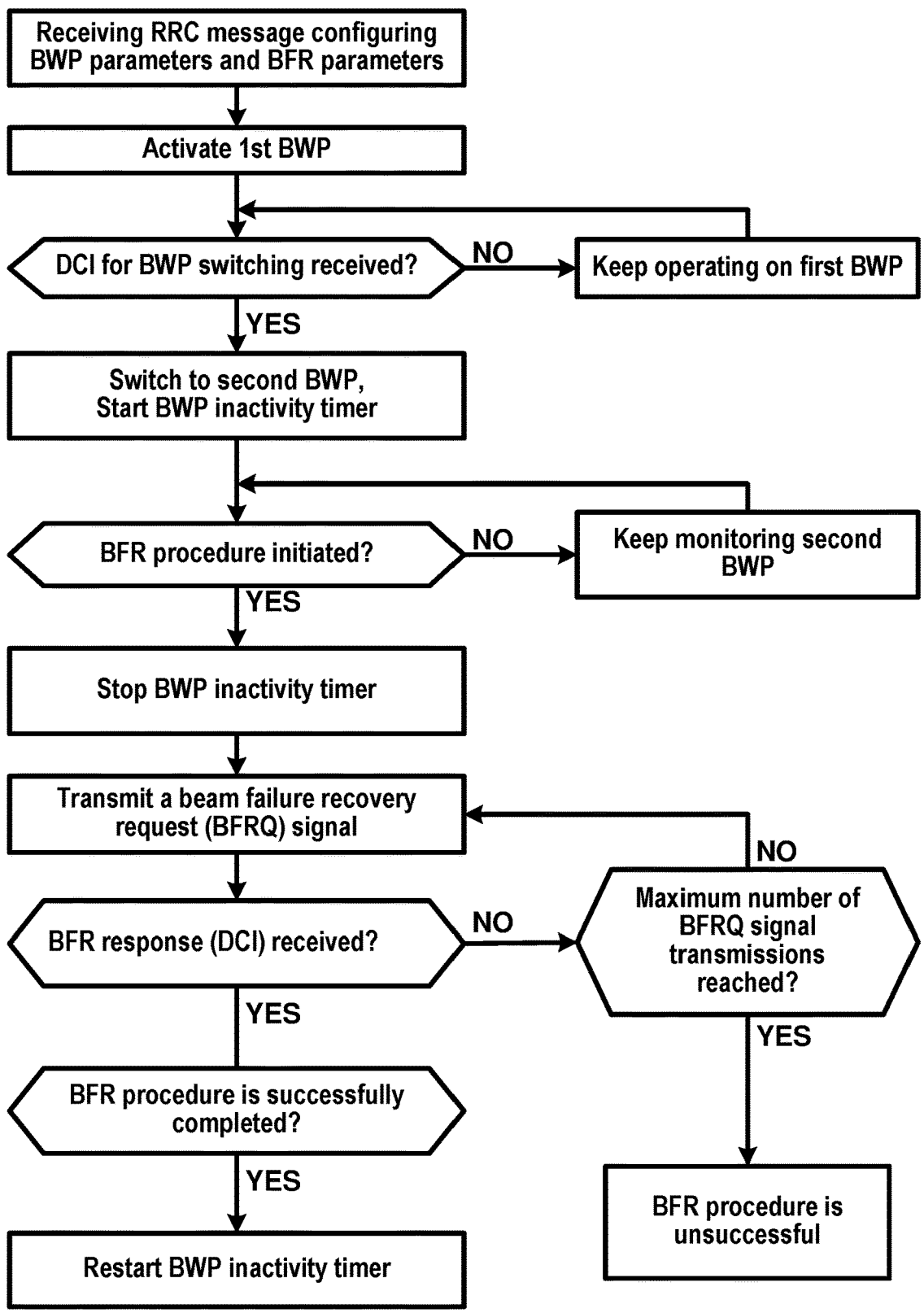
FIG. 27 is an example flowchart of downlink beam failure recovery procedure for a bandwidth part as per an aspect of an embodiment of the present disclosure.

FIG. 26 is an example of downlink beam failure recovery procedure for a bandwidth part as per an aspect of an embodiment of the present disclosure. FIG. 27 is a flow diagram of the downlink beam failure recovery procedure disclosed in FIG. 26. Actions of FIG. 26 at time T0, T1 and/or T2 are similar to actions of FIG. 24 at time T0, T1 and/or T2. A first BWP may be a current active BWP of a cell at time T0. In an example, a wireless device may receive a first DCI indicating switching a current active BWP from the first BWP to a second BWP. The wireless device may start a first timer in response to switching the current active BWP from the first BWP to the second BWP (time T1 in FIG. 26).

In an example, the wireless device may initiate a BFR procedure for the second BWP (time T3 in FIG. 26) in response to detecting a beam failure based on one or more first RSs (First RS 1 and First RS2) of the second BWP (time T2 in FIG. 26). In response to initiating the BFR procedure, the wireless device may stop running the first timer. In response to the stopping the running the first timer, the wireless device may refrain from switching the current active BWP of the cell due to an expiry of the first timer while the BFR procedure is ongoing.

In an example, the wireless device may restart the first timer in response to completing the BFR procedure successfully (time T4 in FIG. 26). The completing the BFR procedure successfully may comprise receiving a BFR response. The BFR response may comprise a second DCI (e.g. a downlink assignment or an uplink grant) on at least one second PDCCH in one or more coresets. The one or more coresets may be associated with the BFR procedure of the second BWP. The second DCI may be addressed to a C-RNTI of the wireless device.

In an example embodiment, a wireless device may receive, from a base station, one or more messages comprising one or more configuration parameters. The one or more configuration parameters may indicate at least one of a plurality of bandwidth parts (BWPs) and a first value of a first BWP inactivity timer. The plurality of BWPs may comprise a first BWP. In an example, the one or more configuration parameters may further indicate at least one of: one or more first reference signals of the first BWP; one or more second RSs of the first BWP; and one or more beam failure recovery request (BFRQ) resources on the first BWP. In an example, the one or more configuration parameters may further indicate an association between each of the one or more second RSs and each of the one or more BFRQ resources. In an example, the one or more first RSs may comprise one or more first CSI-RSs and/or one or more first SS blocks. In an example, the one or more second RSs may comprise one or more second CSI-RSs and/or one or more second SS blocks.

In an example, the wireless device may start the first BWP inactivity timer with the first value in response to switching to the first BWP as an active BWP. The switching may be controlled via a DCI indicating a BWP switching or an expiry of an inactivity timer.

In an example, in response to reaching a number of beam failure instance indications for the first BWP, the wireless device may initiate a random access procedure for a beam failure recovery. In an example, in response to the initiating the random access procedure, the wireless device may stop the first BWP inactivity timer. In an example, the number of beam failure instance indications may be configured by a higher layer (e.g. RRC). In an example, the beam failure instance indications may comprise an indication of a beam failure instance from a physical layer of the wireless device to a medium-access layer of the wireless device. The beam failure instance may comprise assessing the one or more first RSs with radio quality lower than a first threshold. In an example, the first threshold may be based on hypothetical BLER, or RSRP, or RSRQ, or SINR.

In an example, the random access procedure may comprise selecting a selected RS, in the one or more second RSs. The selected RS may be associated with a BFRQ resource. In an example, the BFRQ resource may be one of the one or more BRFQ resources. In an example, the BFRQ resource may comprise at least one preamble and at least one random access channel resource. The random access procedure may further comprise transmitting, by the wireless device, the at least one preamble via the at least one random access channel resource of the first BWP. The at least one random access channel resource may comprise one or more time resources and/or one or more frequency resources. In an example, the selected RS may be associated with one of the one or more second RSs with radio quality higher than a second threshold. The second threshold may be based on L1-RSRP, or RSRQ, or hypothetical BLER, or SINR.

In an example, the wireless device may monitor, for a control information, a downlink control channel of the second BWP. The wireless device may complete the random access procedure for the beam failure recovery in response to receiving the control information. In an example, the monitoring the downlink control channel may comprise searching for the control information in the downlink control channel addressed for an identifier (e.g. C-RNTI) associated with the wireless device.

In an example, the wireless device may restart the first BWP inactivity timer in response to the completing the beam failure recovery.

Figure 28:
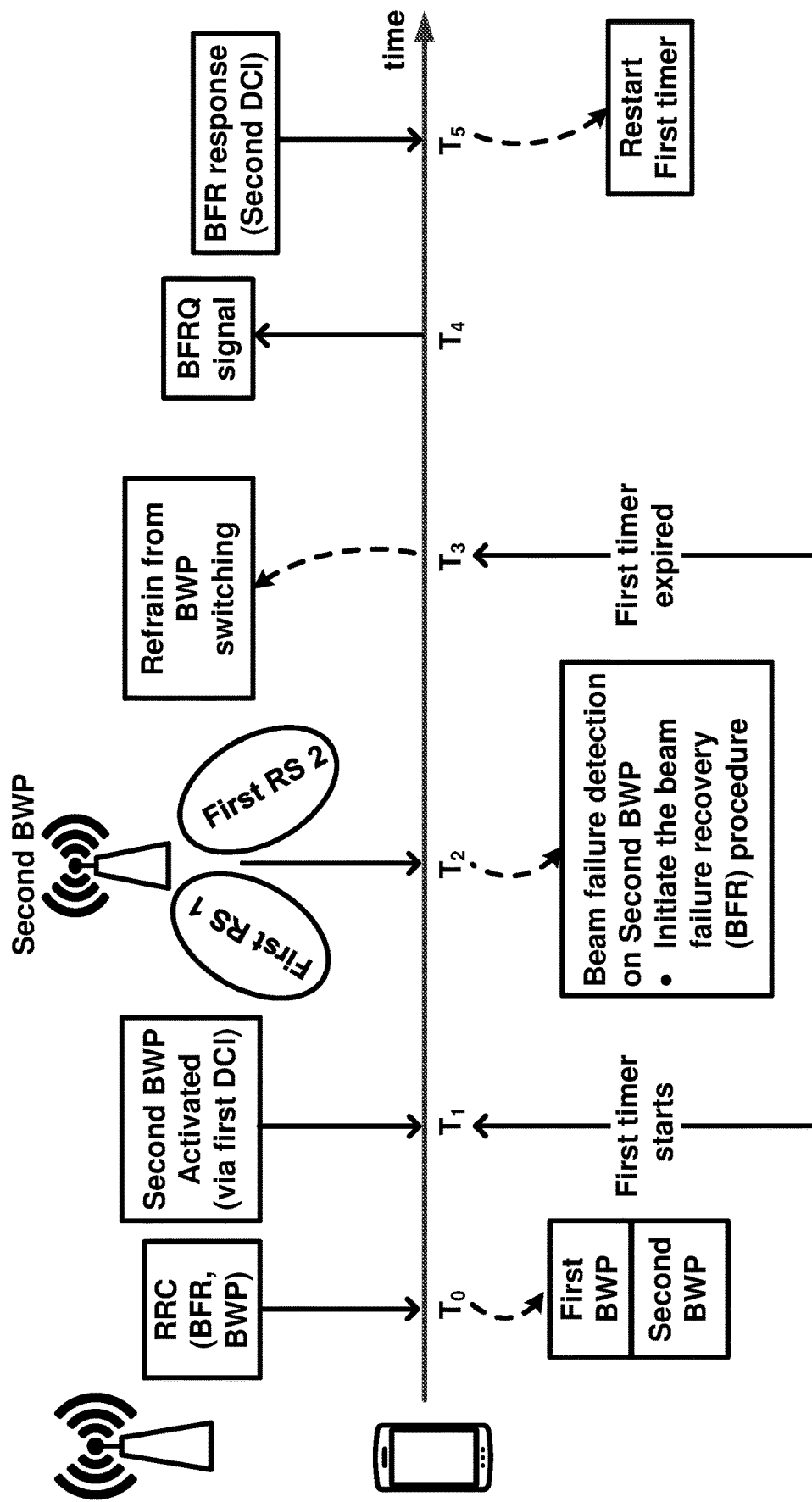
FIG. 28 is an example of downlink beam failure recovery procedure for a bandwidth part as per an aspect of an embodiment of the present disclosure.
Figure 29:
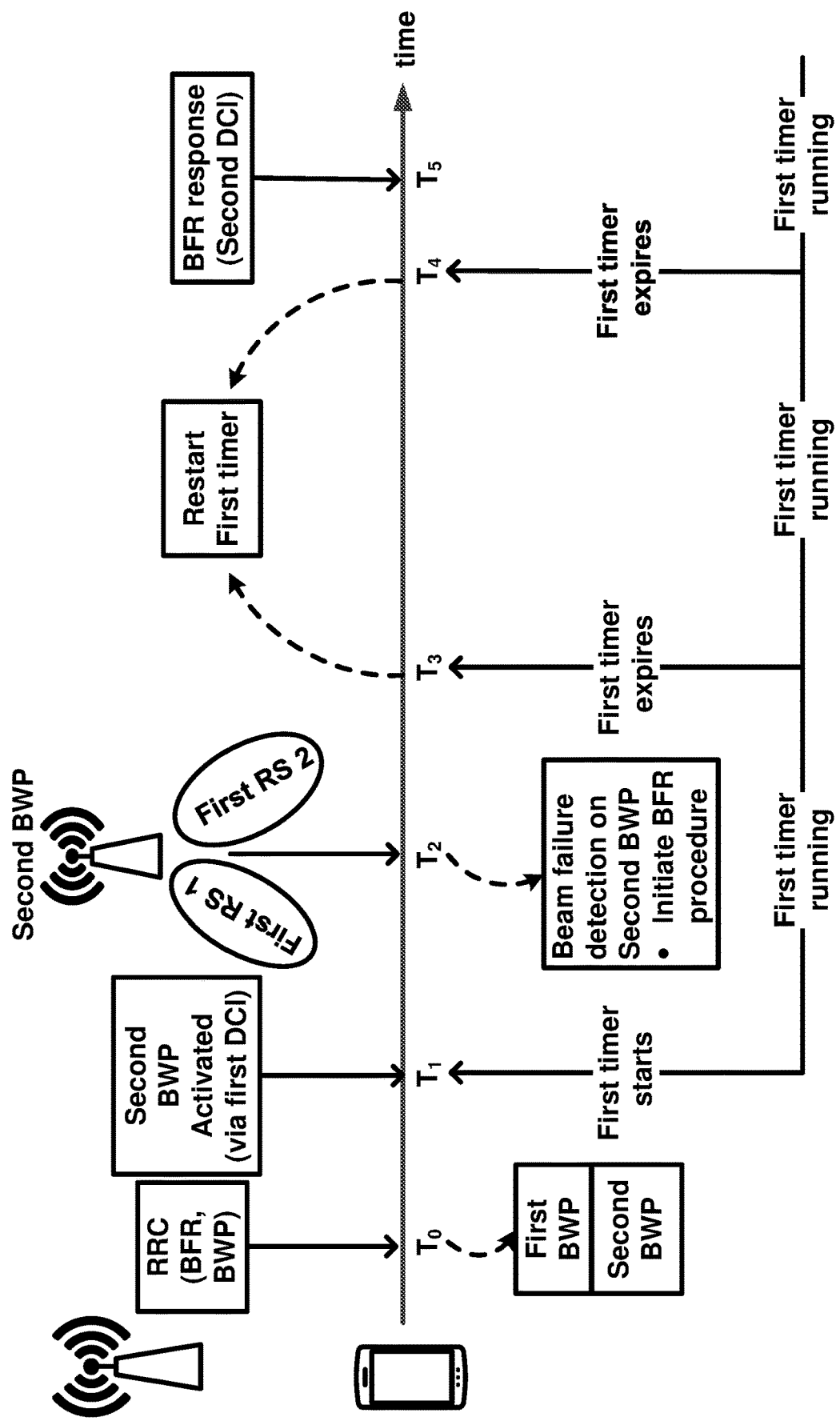
FIG. 29 is an example of downlink beam failure recovery procedure for a bandwidth part as per an aspect of an embodiment of the present disclosure.

FIG. 28 is an example of downlink beam failure recovery procedure for a bandwidth part as per an aspect of an embodiment of the present disclosure. FIG. 29 is a flow diagram of the downlink beam failure recovery procedure disclosed in FIG. 28. Actions of FIG. 28 at time T0, T1 and T2 are similar to actions of FIG. 24 at time T0, T1 and T2. A first BWP may be a current active BWP of a cell in time T0. In an example, a wireless device may receive a first DCI indicating switching the current active BWP from the first BWP to a second BWP. The wireless device may start a first timer in response to switching the current active BWP from the first BWP to the second BWP (time T1 in FIG. 28).

The wireless device may initiate a BFR procedure for the second BWP in response to detecting a beam failure based on one or more first RSs (First RS 1 and First RS 2) of the second BWP (time T2 in FIG. 28). In an example, the first timer may expire while the BFR procedure is ongoing (time T3 in FIG. 28). In an example, the first timer may expire before initiating a BFRQ signal (e.g., preamble transmission). The BFRQ signal may be transmitted at time T4 in FIG. 28. In response to an expiry of the first timer (time T3 in FIG. 28), the wireless device may not switch the current active BWP of the cell from the second BWP to the first BWP (e.g. default BWP). In an example, the wireless device may refrain from switching the current active BWP in response to the expiry of the first timer while the BFR procedure is ongoing. The base station may transmit a BFR response comprising a second DCI (e.g. a downlink assignment or an uplink grant) on at least one second PDCCH in one or more coresets. The one or more coresets may be associated with the BFR procedure of the second BWP. The wireless device may restart the first timer in response to receiving the second DCI.

Figure 30:
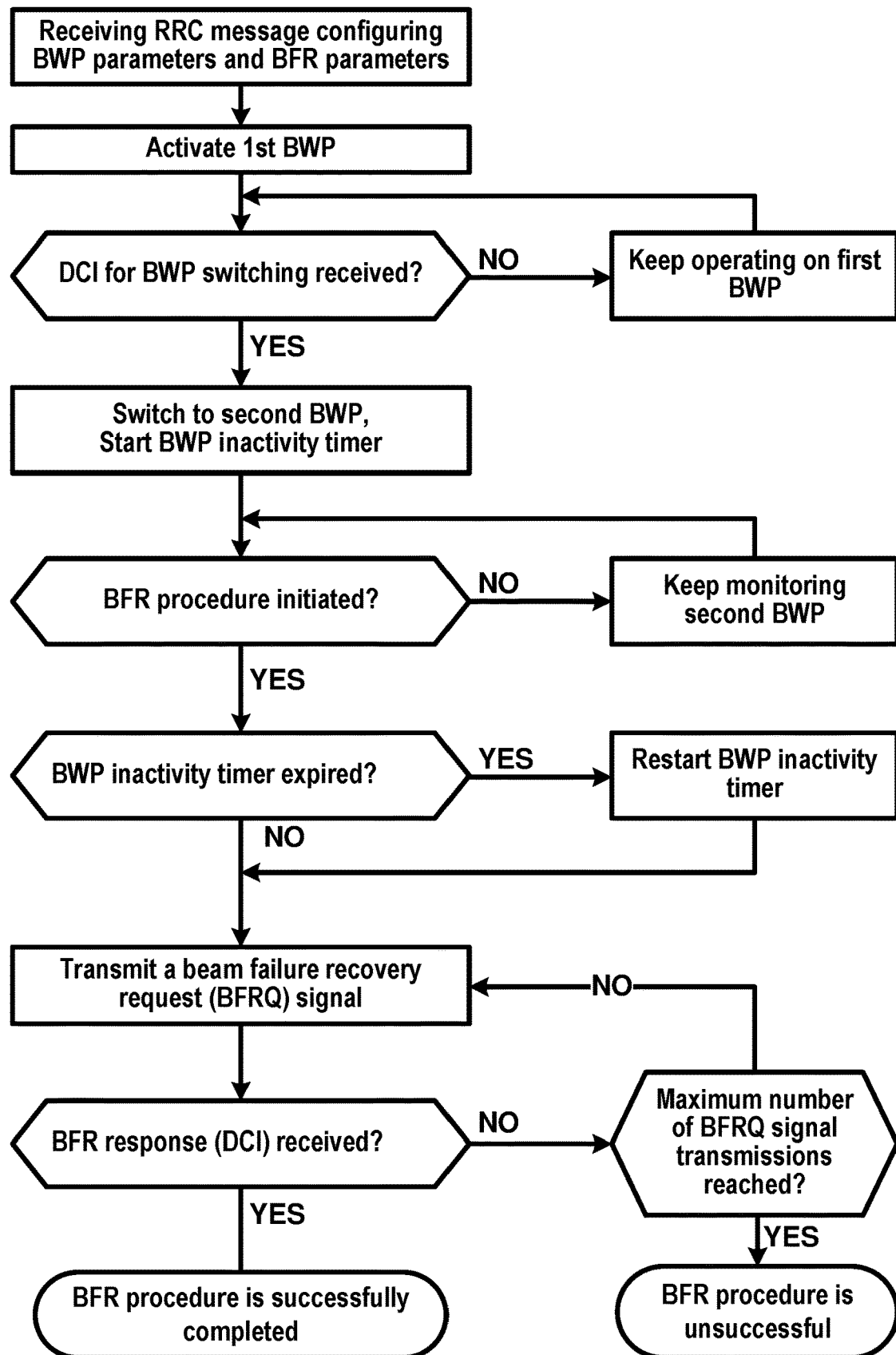
FIG. 30 is an example flowchart of downlink beam failure recovery procedure for a bandwidth part as per an aspect of an embodiment of the present disclosure.

FIG. 29 is an example of downlink beam failure recovery procedure for a bandwidth part as per an aspect of an embodiment of the present disclosure. FIG. 30 is a flow diagram of the downlink beam failure recovery procedure disclosed in FIG. 29. Actions of FIG. 29 at time T0, T1 and T2 are similar to actions of FIG. 24 at time T0, T1 and T2. A first BWP may be a current active BWP of a cell (time T0 in FIG. 29). In an example, a wireless device may receive a first DCI indicating switching the current active BWP from the first BWP to a second BWP. The wireless device may start a first timer in response to switching the current active BWP from the first BWP to the second BWP (time T1 in FIG. 29).

The wireless device may initiate a BFR procedure for the second BWP in response to detecting a beam failure based on one or more first RSs (First RS 1 and First RS 2) of the second BWP (time T2 in FIG. 29). In an example, the first timer may expire while the BFR procedure is ongoing (time T3 and T4 in FIG. 29). In response to an expiry of the first timer while the BFR procedure is ongoing, the wireless device may restart the first timer (time T3 and time T4 in FIG. 29). In an example, the wireless device may restart the first timer until the BFR procedure is completed (time T5 in FIG. 29). The completing the BFR procedure may comprise receiving a BFR response. The BFR response may comprise a second DCI addressed to a C-RNTI of the wireless device. In an example, the wireless device may restart the first timer in response to the receiving the second DCI.

In an example, the wireless device may switch the current active BWP of the cell from the second BWP to the first BWP (e.g. default BWP) in response to the expiry of the first timer while the BFR procedure is not ongoing (e.g. completed).

Figure 31:
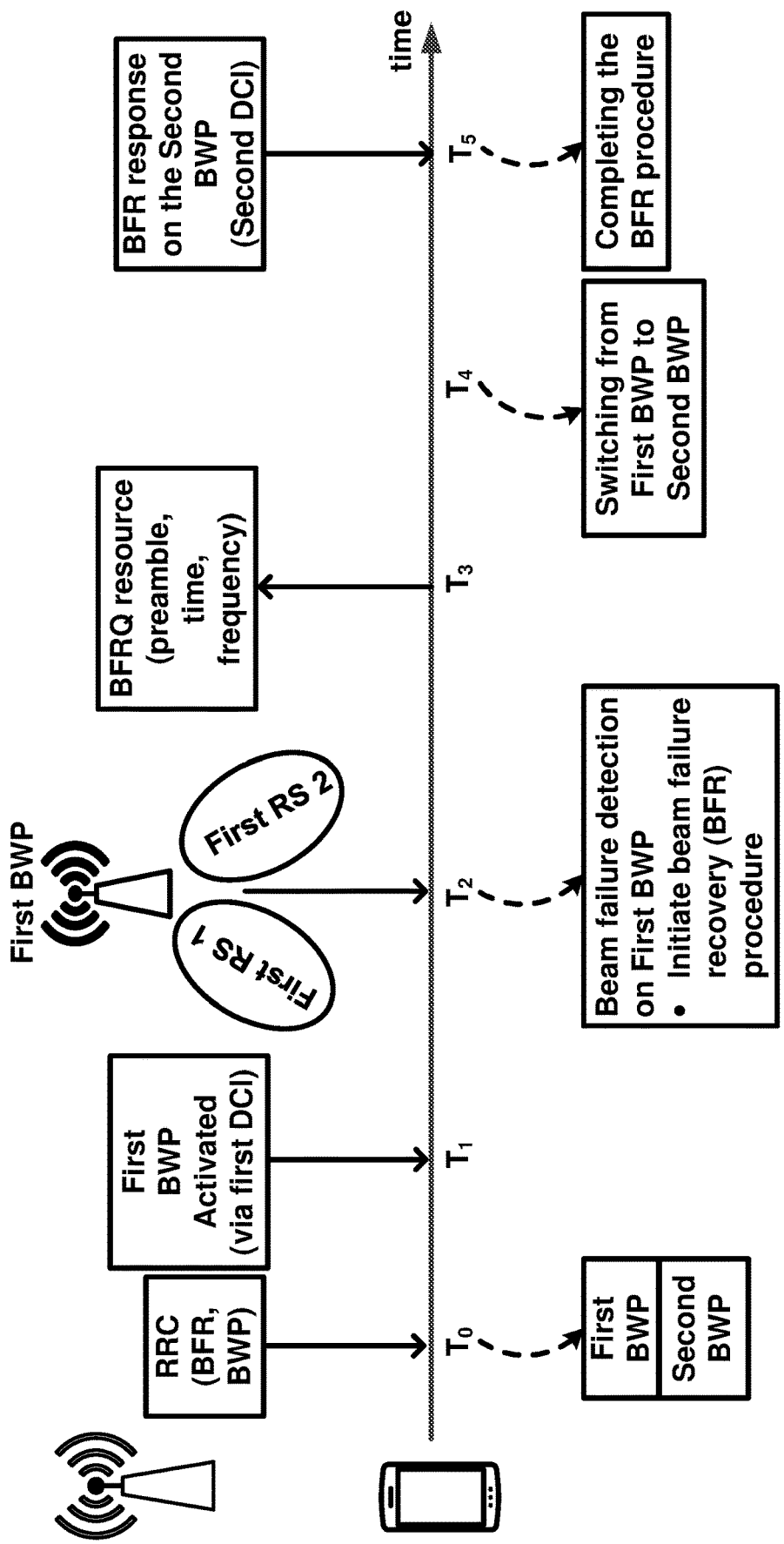
FIG. 31 is an example of downlink beam failure recovery procedure for a bandwidth part as per an aspect of an embodiment of the present disclosure.
Figure 32:
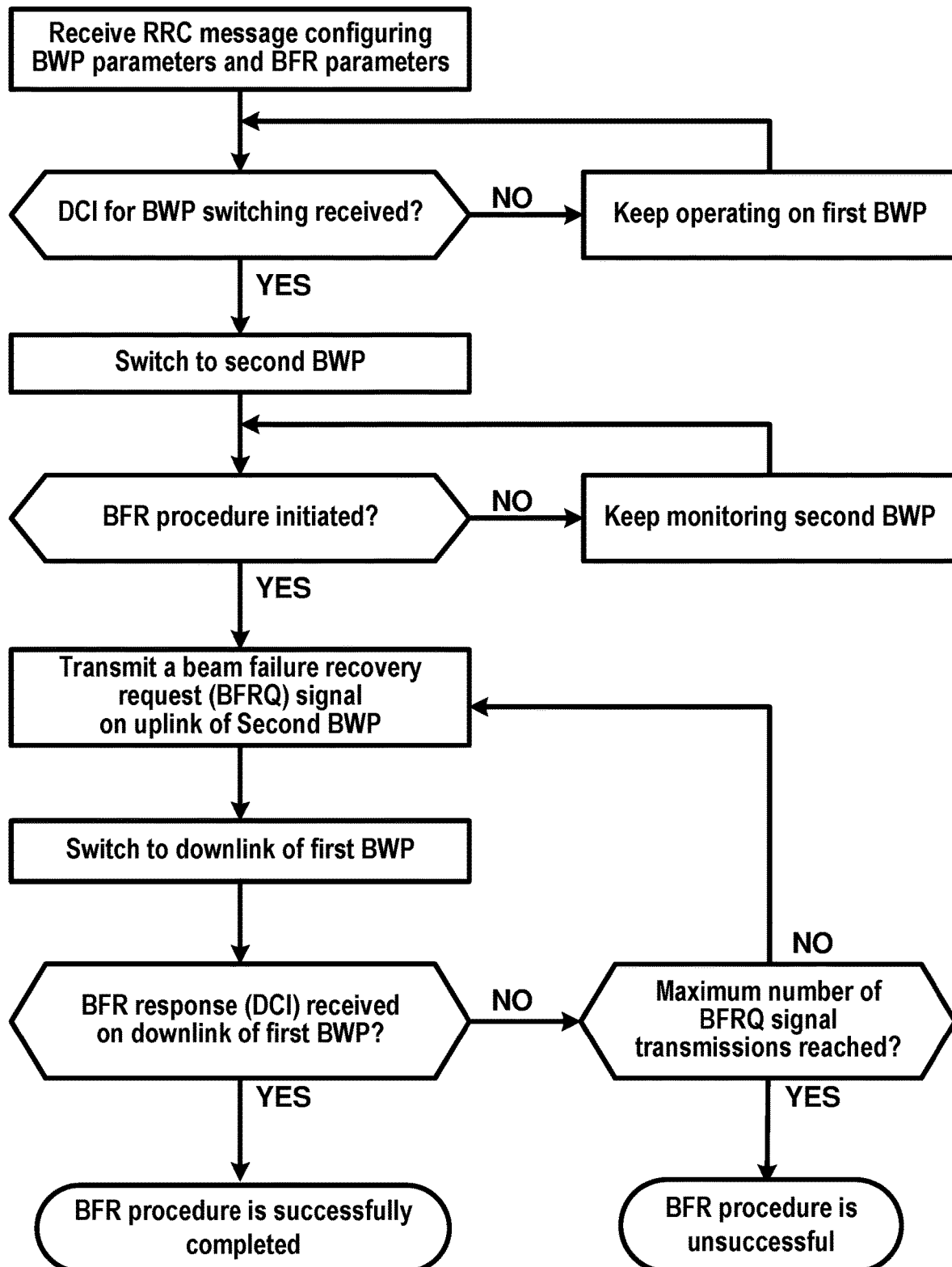
FIG. 32 is an example flowchart of downlink beam failure recovery procedure for a bandwidth part as per an aspect of an embodiment of the present disclosure.

FIG. 31 is an example of downlink beam failure recovery procedure for a bandwidth part as per an aspect of an embodiment of the present disclosure. FIG. 32 is a flow diagram of the downlink beam failure recovery procedure disclosed in FIG. 31. A wireless device may be configured with one or more BWP configuration parameters and one or more BFR configuration parameters at time T0. The wireless device may be configured with a first BWP and a second BWP. In an example, a wireless device may receive a first DCI indicating switching a current active BWP to the first BWP at time T1.

In an example, the wireless device may initiate a BFR procedure for the first BWP (time T2 in FIG. 31) in response to detecting a beam failure based on one or more first RSs (First RS 1 and First RS 2) of the first BWP (time T2 in FIG. 31). In response to initiating the BFR procedure, the wireless device may transmit a BFRQ signal (e.g. preamble) via a BFRQ resource of the first BWP at time T3. The BFRQ resource may comprise at least one preamble and time and frequency resources. In an example, in response to transmitting the BFRQ signal, the wireless device may switch the current active BWP from the first BWP to the second BWP at time T4. The wireless device may switch to the second BWP to receive a BFR response of the BFRQ signal from the base station. In an example, the BFR response may comprise a second DCI (e.g. a downlink assignment or an uplink grant).

In an example, completing the BFR procedure successfully may comprise receiving a BFR response. The completing the BFR procedure successfully may comprise receiving a second DCI (e.g. a downlink assignment or an uplink grant) on at least one second PDCCH in one or more coresets of the second BWP. The second DCI may be addressed to a C-RNTI of the wireless device. In an example, one or more RSs (e.g., DMRS) of the at least one second PDCCH may be associated (e.g. QCLed) with a serving RS of the second BWP.

A wireless device may receive from a base station one or more messages comprising one or more configuration parameters. The one or more configuration parameters may indicate a plurality of bandwidth parts (BWPs). The plurality of BWPs may comprise a first BWP and a second BWP. In an example, the one or more configuration parameters may further indicate at least one of: one or more first reference signals of the first BWP; one or more second RSs of the first BWP; and one or more beam failure recovery request (BFRQ) resources on the first BWP. In an example, the one or more configuration parameters may further indicate an association between each of the one or more second RSs and each of the one or more BFRQ resources. In an example, the one or more first RSs may comprise one or more first CSI-RSs and/or one or more first SS blocks. In an example, the one or more second RSs may comprise one or more second CSI-RSs and/or one or more second SS blocks.

The wireless device may initiate a random access procedure for a beam failure recovery in response to reaching a number of beam failure instance indications for the first BWP. In an example, the number of beam failure instance indications may be configured by a higher layer (e.g. RRC). In an example, the beam failure instance indications may comprise an indication of a beam failure instance from a physical layer of the wireless device to a medium-access layer of the wireless device. The beam failure instance may comprise assessing the one or more first RSs with radio quality lower than a first threshold. In an example, the first threshold may be based on hypothetical BLER, or RSRP, or RSRQ, or SINR.

In an example, the random access procedure may comprise selecting a selected RS, in the one or more second RSs. The selected RS may be associated with a BFRQ resource. In an example, the BFRQ resource may be one of the one or more BRFQ resources. In an example, the BFRQ resource may comprise at least one preamble and at least one random access channel resource. The random access procedure may further comprise transmitting, by the wireless device, the at least one preamble via the at least one random access channel resource of the first BWP. The at least one random access channel resource may comprise one or more time resources and/or one or more frequency resources. In an example, the selected RS may be associated with one of the one or more second RSs with radio quality higher than a second threshold. The second threshold may be based on L1-RSRP, or RSRQ, or hypothetical BLER, or SINR.

In an example, the wireless device may switch from the first BWP to the second BWP in response to the transmitting the at least one preamble. The wireless device may monitor, for a control information, a downlink control channel of the second BWP. The wireless device may complete the beam failure recovery in response to receiving the control information. In an example, the monitoring the downlink control channel may comprise searching for the control information in the downlink control channel addressed for an identifier (e.g. C-RNTI) associated with the wireless device.

Figure 33:
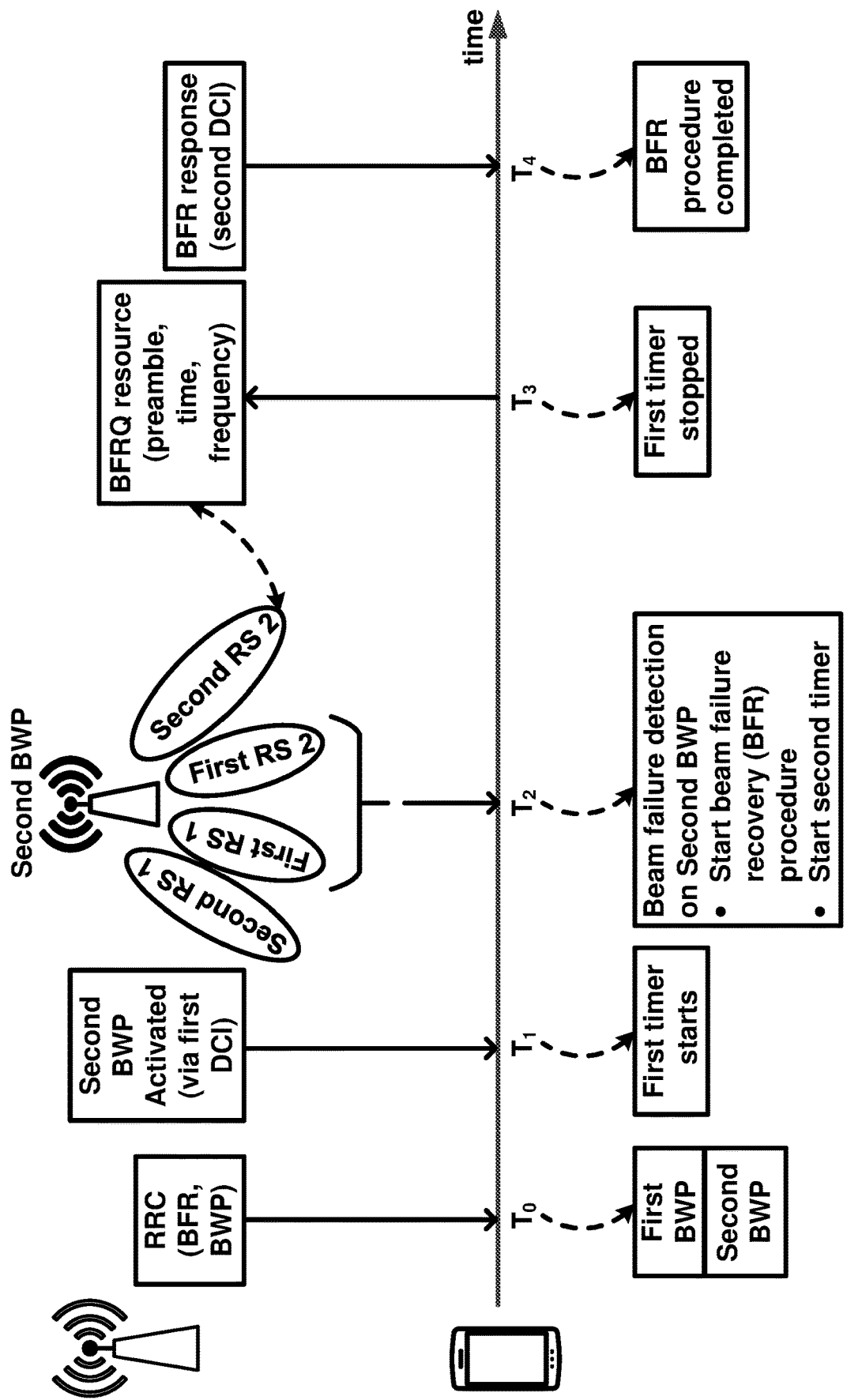
FIG. 33 is an example of downlink beam failure recovery procedure for a bandwidth part as per an aspect of an embodiment of the present disclosure.
Figure 34:
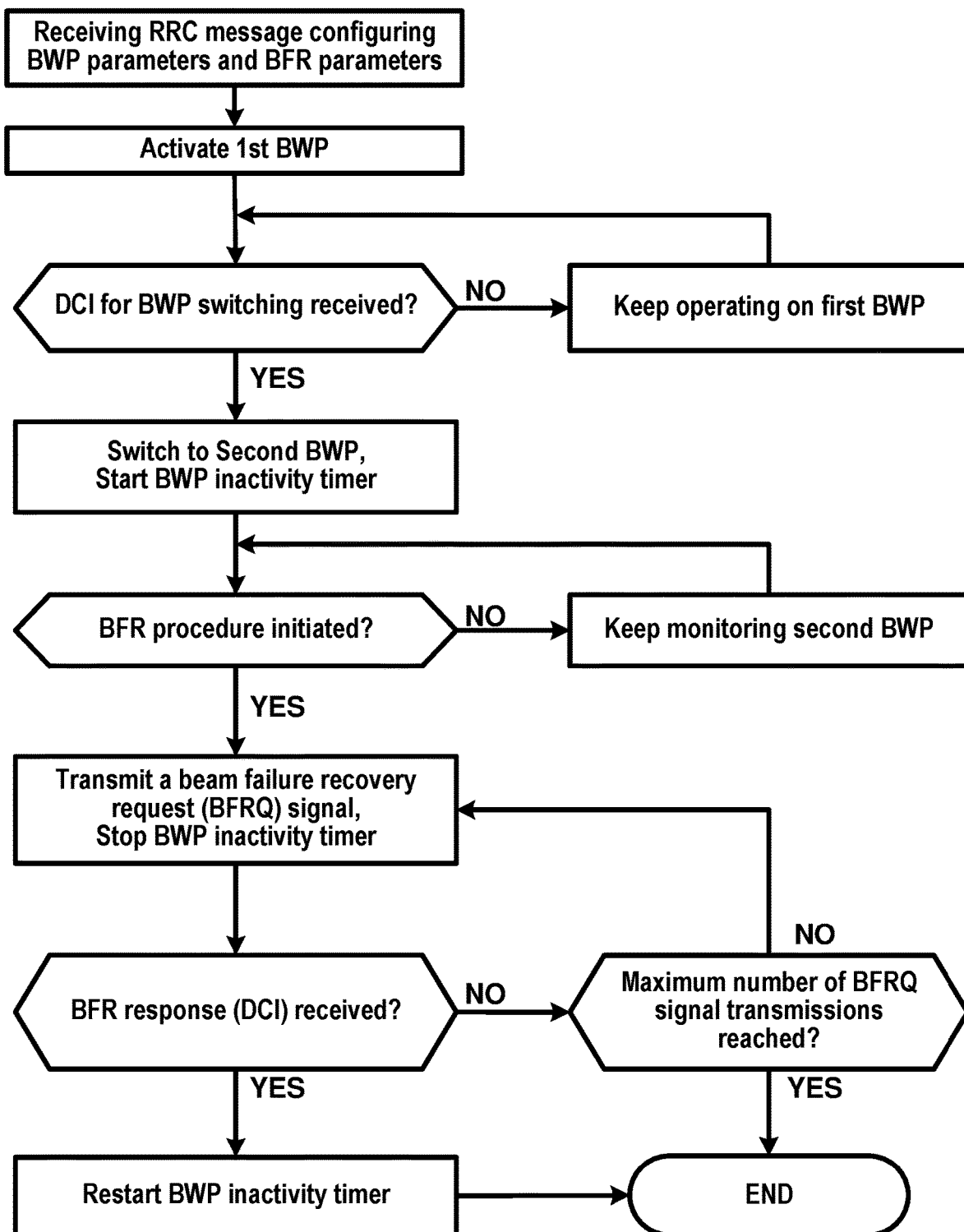
FIG. 34 is an example flowchart of downlink beam failure recovery procedure for a bandwidth part as per an aspect of an embodiment of the present disclosure.

FIG. 33 is an example of downlink beam failure recovery procedure for a bandwidth part as per an aspect of an embodiment of the present disclosure. FIG. 34 is a flow diagram of the downlink beam failure recovery procedure disclosed in FIG. 33. In FIG. 33, a wireless device may receive one or more messages comprising configuration parameters in time T0. The one or more messages may comprise one or more RRC messages (e.g. RRC connection reconfiguration message, or RRC connection reestablishment message, or RRC connection setup message). In an example, the configuration parameters may comprise bandwidth part (BWP) configuration parameters for a plurality of BWPs comprising a first BWP (e.g., default BWP) and a second BWP (e.g., non-default BWP). The configuration parameters may further comprise one or more beam failure recovery (BFR) configuration parameters. The one or more BFR configuration parameters may comprise a first set of RS resource configurations for the second BWP. The first set of RS resource configurations may comprise one or more first RSs (e.g., CSI-RS or SS blocks) of the second BWP. The one or more BFR configuration parameters may further comprise a second set of RS resource configurations comprising one or more second RSs (e.g., CSI-RS or SS blocks) of the second BWP. The wireless device may measure radio link quality of one or more beams associated with the one or more first RSs and/or the one or more second RSs. The one or more BFR configuration parameters may further comprise one or more beam failure recovery request (BFRQ)

resources associated with the second BWP. In an example, the one or more BFR configuration parameters may further comprise an association between each of the one or more second RSs and each of the one or more BFRQ resources.

In an example, a wireless device may receive a first DCI indicating switching a current active BWP from a first BWP to a second BWP (time T1). In an example, the first DCI may comprise a BWP indicator. The wireless device may determine that the first DCI indicates BWP switching in response to the BWP indicator indicating a BWP different from the current active BWP. At time T1, the wireless device may start a first inactivity timer in response to switching the current active BWP from the first BWP to the second BWP.

The wireless device may assess a first radio link quality of the one or more first RSs of the second BWP (First RS 1 and First RS 2) against a first threshold. In an example, the first threshold (e.g. hypothetical BLER, L1-RSRP) may be a first value provided by a higher layer (e.g. RRC, MAC). The wireless device may monitor at least one PDCCH of the second BWP. At least one RS (e.g., DM-RS) of the at least one PDCCH may be associated with (e.g., QCLed) the one or more first RSs.

A wireless device may detect a beam failure on the second BWP when the first radio link quality of the one or more first RSs meets certain criteria (time T2). For example, a beam failure may occur when RSRP/SINR of the one or more first RSs is lower than the first threshold and/or BLER is higher than the first threshold. The assessment may be for a consecutive number of times with a value provided by a higher layer (e.g. RRC, MAC).

In response to detecting the beam failure on the second BWP, the wireless device may initiate a random access procedure for a beam failure recovery (BFR) procedure of the second BWP (time T2). In an example, the wireless device may stop the first inactivity timer in response to initiating the random access procedure. In response to initiating the BFR procedure, the wireless device may start a second timer (if configured) and/or initiate a candidate beam identification procedure. For the candidate beam identification procedure, the wireless device may identify a first RS (Second RS 2) in the one or more second RSs. The first RS may be associated with a BFRQ resource of the one or more BFRQ resources. The BFRQ resource may comprise at least one preamble and at least one PRACH (e.g. time and/or frequency) resource. In an example, a second radio link quality (e.g. BLER, L1-RSRP) of the first RS may be better (e.g. lower BLER or higher L1-RSRP or higher SINR) than a second threshold. In the example, the second threshold may be a second value provided by the higher layer (e.g. RRC, MAC).

In an example, in response to detecting the beam failure on the second BWP and identifying the first RS of the second BWP, the wireless device may initiate a beam failure recovery request (BFRQ) transmission. The BFRQ transmission may comprise transmitting, in a first slot, the at least one preamble via the at least one PRACH resource for the BFR procedure of the second BWP (time T3). In an example, in response to the initiating the BFRQ transmission, the wireless device may stop the first inactivity timer. In an example, the wireless device may reset the first inactivity timer in addition to the stopping the first inactivity timer. In response to transmitting the at least one preamble in the first slot, the wireless device may start, from a second slot, monitoring for a BFR response. The monitoring for the BFR response may comprise monitoring at least one second PDCCH in one or more coresets associated with the second BWP for a second DCI (e.g. a downlink assignment or an uplink grant) within a configured response window. The second DCI may be with CRC scrambled by a C-RNTI of the wireless device.

In an example, in response to receiving the second DCI on the at least one second PDCCH in the one or more coresets, within the configured response window, the random access procedure for the BFR procedure may be successfully completed (time T4). In an example, in response to completing the random access procedure, the wireless device may restart the first inactivity timer.

In an example, a base station may configure a wireless device with downlink control channel(s) (or control resource sets (coresets)). The wireless device may detect a beam failure based on measuring the downlink control channel(s). When the quality of the downlink control channels is poor (e.g., higher BLER than a threshold), the wireless device may detect a beam failure and initiate a BFR procedure.

The wireless device may keep monitoring downlink control channel(s) during the ongoing BFR procedure. For example, while monitoring the downlink control channel(s), the obstacle between the base station and the wireless device causing the beam failure may disappear and/or move during the BFR procedure. For example, while monitoring the downlink control channel(s), a deep fading channel causing the beam failure may disappear and/or move during the BFR procedure. The downlink control channel(s) may recover during the ongoing BFR procedure. For example, the quality of the downlink control channel(s) may become good again (e.g., lower BLER than the threshold) during the BFR procedure. For example, the wireless device may receive a downlink control information via the downlink control channel(s) during the BFR procedure when the quality of the downlink control channel(s) becomes good again.

In legacy systems, a wireless device may start a BFR procedure when the quality of the channel is below a threshold. When the quality of the downlink control channel(s) changes to above a threshold (during a BFR procedure) and the wireless device receives downlink control information via the downlink control channel(s), the wireless device may continue the BFR procedure. The wireless device transmits uplink signals (e.g., preamble, BFRQ) for the BFR procedure resulting in increased uplink interference to other users/cells. The wireless device may continue the BFR procedure wherein the wireless device monitors an additional dedicated control channel (e.g., coreset) configured for the BFR procedure increasing the battery consumption of the wireless device. There is a need to develop an enhanced BFR procedure for the wireless device to reduce uplink interference and reduce wireless device battery power consumption.

In an example embodiment, when the quality of the downlink control channel(s) changes to above a certain threshold and the wireless device receives downlink control information via the downlink control channel(s), the wireless device stops the BFR procedure. When the wireless device receives a DCI via the downlink control channel(s) during the BFR procedure, the wireless device may stop the BFR procedure. For example, the DCI may be addressed to an identifier. If the identifier is common to a plurality of wireless devices, the wireless device may not determine if the DCI is destined for itself or another wireless device of the plurality of the wireless devices. When the wireless device receives a DCI via the downlink control channel(s) during the BFR procedure, the wireless device stops the BFR procedure if the DCI is addressed to an identifier specific to the wireless device. In an example, the identifier may be a Cell Radio Network Temporary Identifier (C-RNTI). In an example, the identifier may be a Configured Scheduling Radio Network Temporary Identifier (CS-RNTI). This enhanced BFR procedure reduces uplink interference and reduce wireless device battery power consumption.

In legacy systems, the wireless device stops the BWP inactivity timer when the wireless device initiates a random-access procedure. In legacy systems, BWP inactivity timer remains stop until the random-access procedure is successfully completed. This may result in increased mis-alignment between timers of a base station and wireless device, for example, when a random access procedure is stopped or aborted. There is a need to implement an enhanced BWP inactivity timer to reduce mis-alignment between timers of a base station and wireless device.

In an example embodiment, when the wireless device stops the random-access procedure, the wireless device restarts the BWP inactivity timer. Example embodiments may avoid the BWP misalignment between the wireless device and the base station and/or reduce the gap (misalignment) between the BWP inactivity timers at the wireless device and the base station from increasing.

Figure 35:
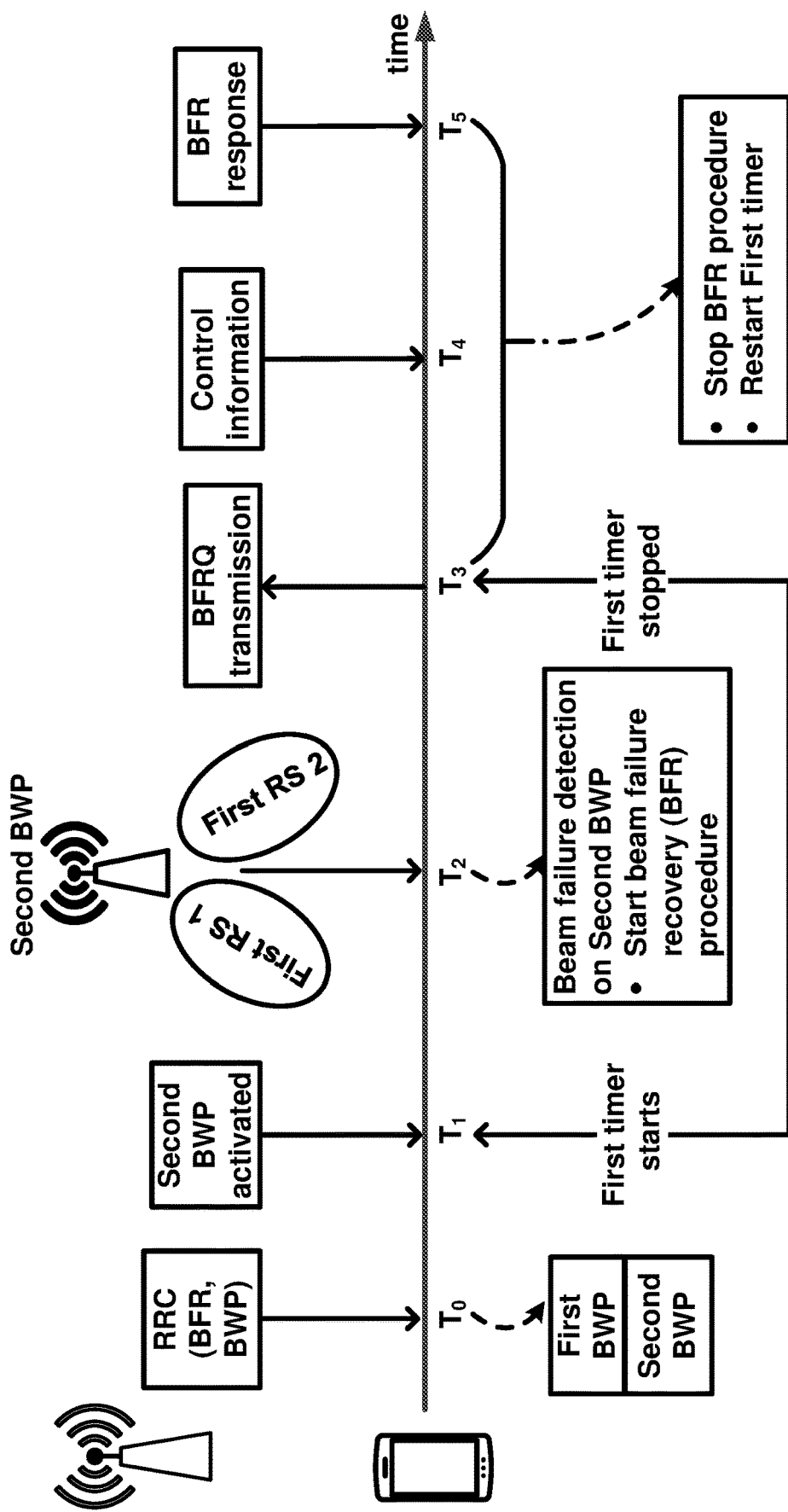
FIG. 35 is an example of downlink beam failure recovery procedure for a bandwidth part as per an aspect of an embodiment of the present disclosure.
Figure 36:
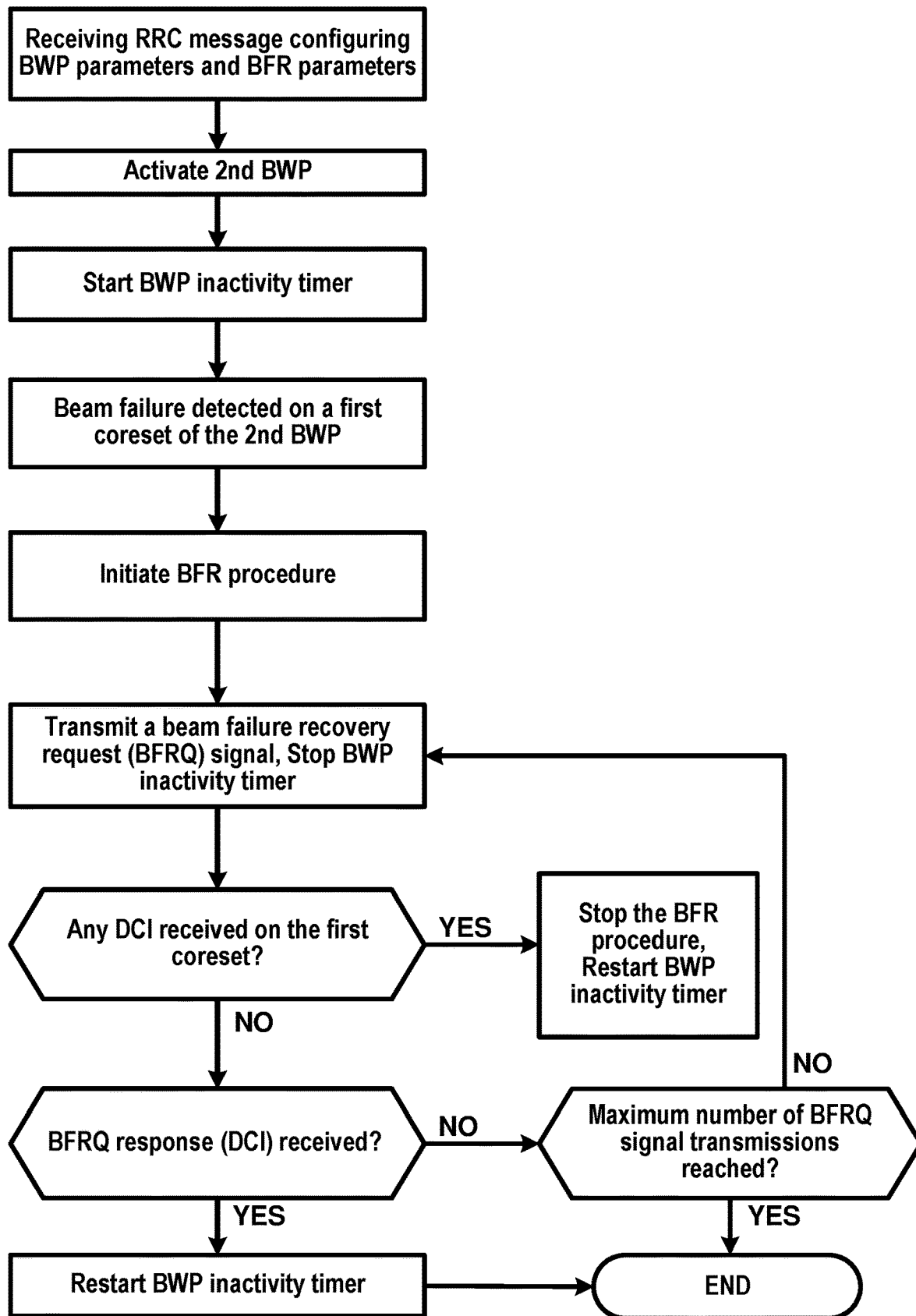
FIG. 36 is an example flowchart of downlink beam failure recovery procedure for a bandwidth part as per an aspect of an embodiment of the present disclosure.

FIG. 35 is an example of downlink beam failure recovery procedure for a bandwidth part as per an aspect of an embodiment of the present disclosure. FIG. 36 is a flow diagram of the downlink beam failure recovery procedure disclosed in FIG. 35. Actions in time T0, T1 and T2 in FIG. 35 are same as the actions in time T0, T1 and T2 in FIG. 33. In an example, a wireless device may stop a first inactivity timer in response to initiating a random access procedure for a beam failure recovery (time T3 in FIG. 35). The wireless device may detect a beam failure on at least one PDCCH of the second BWP at time T2. In an example, the at least one PDCCH of the second BWP may improve during the random access procedure for a beam failure recovery. The wireless device may monitor the at least one PDCCH before the random access procedure is initiated (e.g., before T2). In an example, while the random access procedure is ongoing, a blockage between a wireless device and a serving cell may not exist. In an example, a beam failure of the second BWP may be caused by a fading dip (e.g. deep fading). The fading deep may not exist during the random access procedure.

In an example, the wireless device may receive a control information (e.g., DCI) in time T4 on the at least one PDCCH during the random access procedure (e.g. before the random access procedure is completed in time T5). In an example, the wireless device may monitor the at least one PDCCH and a dedicated coreset during the random access procedure for the beam failure recovery. The dedicated coreset may be configured by the one or more messages (at time T0) to the wireless device. The wireless device monitors the dedicated coreset to receive a BFR response of a BFRQ transmission. In an example, the at least one PDCCH may be addressed to a C-RNTI of the wireless device. In an example, the at least one PDCCH may be addressed to a CS-RNTI of the wireless device. In response to receiving the at least one PDCCH, the wireless device may stop the random access procedure for the beam failure recovery. In response to stopping the random access procedure, the wireless device may restart the first inactivity timer associated with the second BWP.

In an example, a wireless device may receive, from a base station, one or more messages comprising one or more configuration parameters. The one or more configuration parameters may indicate at least a first value of a first BWP inactivity timer of a first BWP. In an example, the one or more configuration parameters may further indicate at least one of one or more first reference signals of the first BWP; one or more second RSs of the first BWP; and one or more beam failure recovery request (BFRQ) resources on the first BWP. In an example, the one or more configuration parameters may further indicate an association between each of the one or more second RSs and each of the one or more BFRQ resources. In an example, the one or more first RSs may comprise one or more first CSI-RSs and/or one or more first SS blocks. In an example, the one or more second RSs may comprise one or more second CSI-RSs and/or one or more second SS blocks.

In an example, the wireless device may start the first BWP inactivity timer in response to switching to the first BWP as an active BWP. The switching may be indicated by a DCI or an expiry of an inactivity timer.

The wireless device may initiate a random access procedure for a beam failure recovery in response to reaching a number of beam failure instance indications for the first BWP. In an example, the number of beam failure instance indications may be configured by a higher layer (e.g. RRC). In an example, the beam failure instance indications may comprise an indication of a beam failure instance from a physical layer of the wireless device to a medium-access layer of the wireless device. The beam failure instance may comprise assessing the one or more first RSs with radio quality lower than a first threshold. In an example, the first threshold may be based on hypothetical BLER, or RSRP, or RSRQ, or SINR.

In an example, the random access procedure may comprise selecting a selected RS, in the one or more second RSs. The selected RS may be associated with a BFRQ resource. In an example, the BFRQ resource may be one of the one or more BRFQ resources. In an example, the BFRQ resource may comprise at least one preamble and at least one random access channel resource of the first BWP. The random access procedure may further comprise transmitting, by the wireless device, the at least one preamble via the at least one random access channel resource. The at least one random access channel resource may comprise one or more time resources and/or one or more frequency resources. In an example, the selected RS may be associated with one of the one or more second RSs with radio quality higher than a second threshold. The second threshold may be based on L1-RSRP, or RSRQ, or hypothetical BLER, or SINR.

In an example, the wireless device may stop the first BWP inactivity timer in response to the transmitting the at least one preamble. In an example, the wireless device may monitor, for a control information, a downlink control channel in response to the transmitting the at least one preamble.

In an example, the monitoring the downlink control channel may comprise searching for the control information in the downlink control channel addressed for an identifier (e.g. C-RNTI, CS-RNTI) associated with the wireless device.

In an example, the wireless device may complete the random access procedure for the beam failure recovery in response to receiving the control information. The wireless device may successfully complete the beam failure recovery in response to completing the random access procedure.

In an example, the wireless device may restart the first BWP inactivity timer in response to the completing the beam failure recovery successfully.

In an example, the one or more configuration parameters may further indicate radio resources of a dedicated coreset. In an example, the control information may be received on the dedicated coreset.

In an example, the one or more configuration parameters may further indicate radio resources of a dedicated coreset. In an example, the control information may be received on the dedicated coreset or a common coreset.

In an example, the one or more configuration parameters may further indicate radio resources of a dedicated coreset. In an example, the control information may be received on a first coreset. The wireless device may be monitoring the first coreset before a random access procedure for a beam failure recovery is initiated. In an example, the control information may be received on the first coreset.

In an example embodiment, the at least one PDCCH of the second BWP may improve during a random access procedure for a beam failure recovery. A wireless device may monitor the at least one PDCCH before the random access procedure is initiated. In an example, the wireless device may monitor the at least one PDCCH while the random access procedure is ongoing. In an example, while the random access procedure is ongoing, a blockage between a wireless device and a serving cell may not exist. In an example, a beam failure of the second BWP may be caused by a fading dip (e.g. deep fading). The fading deep may not exist during the random access procedure.

In an example, a MAC entity of the wireless device may receive a DCI in on the at least one PDCCH during the random access procedure (e.g. before the random access procedure is completed). In an example, the DCI may be for BWP switching of a serving cell. In an example, the wireless device may stop the random access procedure for a beam failure recovery (e.g. ongoing) in response to the receiving the DCI. In an example, the wireless device may switch to a new BWP indicated by the DCI indicating BWP switching. In an example, the wireless device may be in RRC Connected state after the switching to the new BWP. The wireless device may not initiate a random access procedure on the new BWP in response to the switching to the new BWP.

In legacy systems, the base station may transmit a random-access response (RAR) for a random-access procedure of an SCell on a primary cell (PCell). Based on transmitting RAR, the wireless device may stop the BWP inactivity timer of the PCell to avoid BWP switching on the PCell. When the SCell is deactivated (e.g., by MAC-CE transmitted by the base station or an expiry of the SCell deactivation timer) during the random-access procedure, the wireless device does not continue the random-access procedure for the deactivated SCell. Implementation of legacy systems may increase mis-alignment in increased mis-alignment between timers of a base station and wireless device. There is a need to implement an enhanced BWP inactivity timer to reduce mis-alignment between timers of a base station and wireless device.

In an example embodiment, the wireless device may restart the BWP inactivity timer of the PCell based on (in response to) deactivation of the SCell with an ongoing random access procedure. Example embodiments may avoid the BWP misalignment between the wireless device and the base station and/or reduce the gap (misalignment) between the BWP inactivity timers at the wireless device and the base station from increasing.

Figure 37:
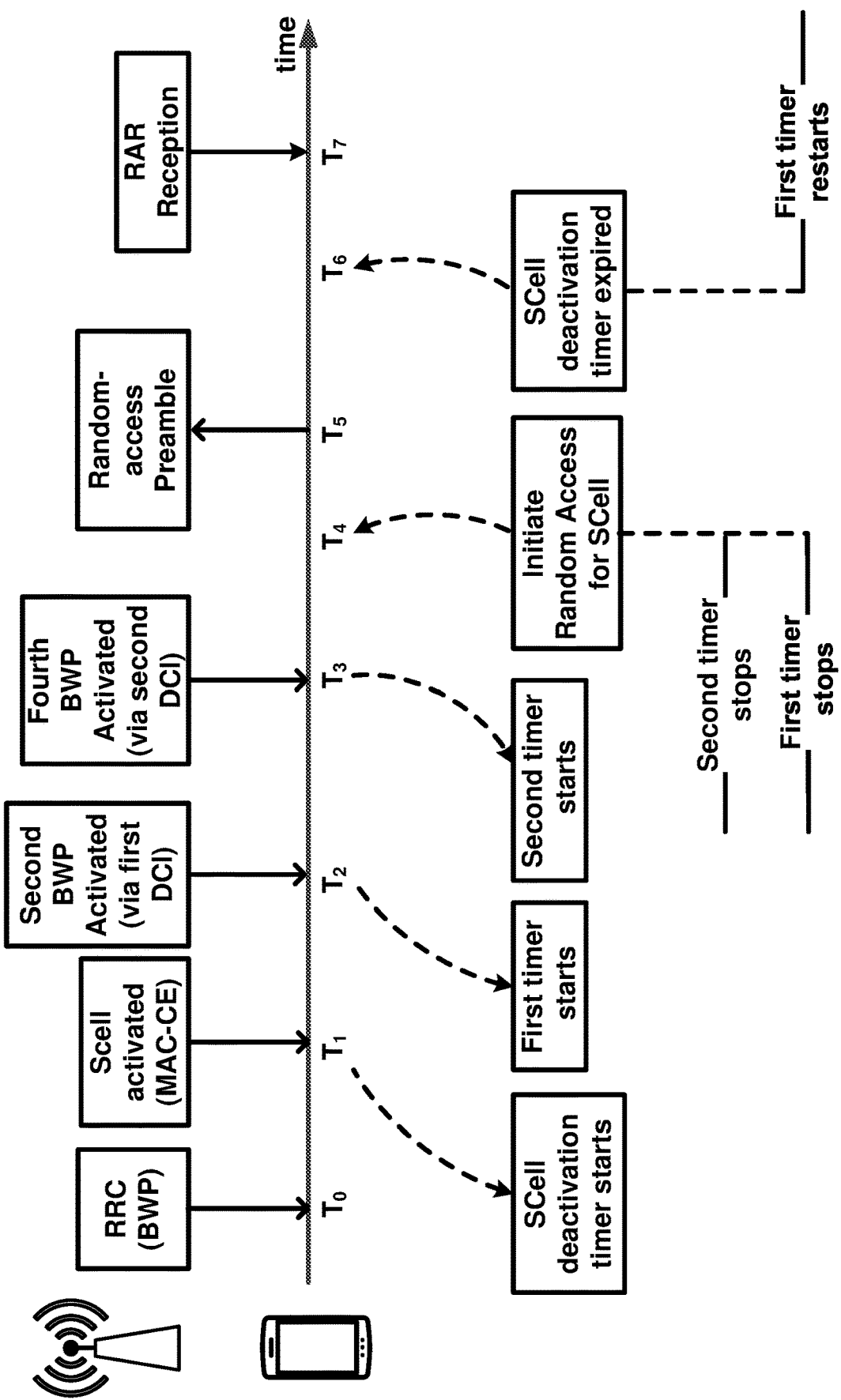
FIG. 37 is an example of random access procedure for a bandwidth part in carrier aggregation as per an aspect of an embodiment of the present disclosure.
Figure 38:
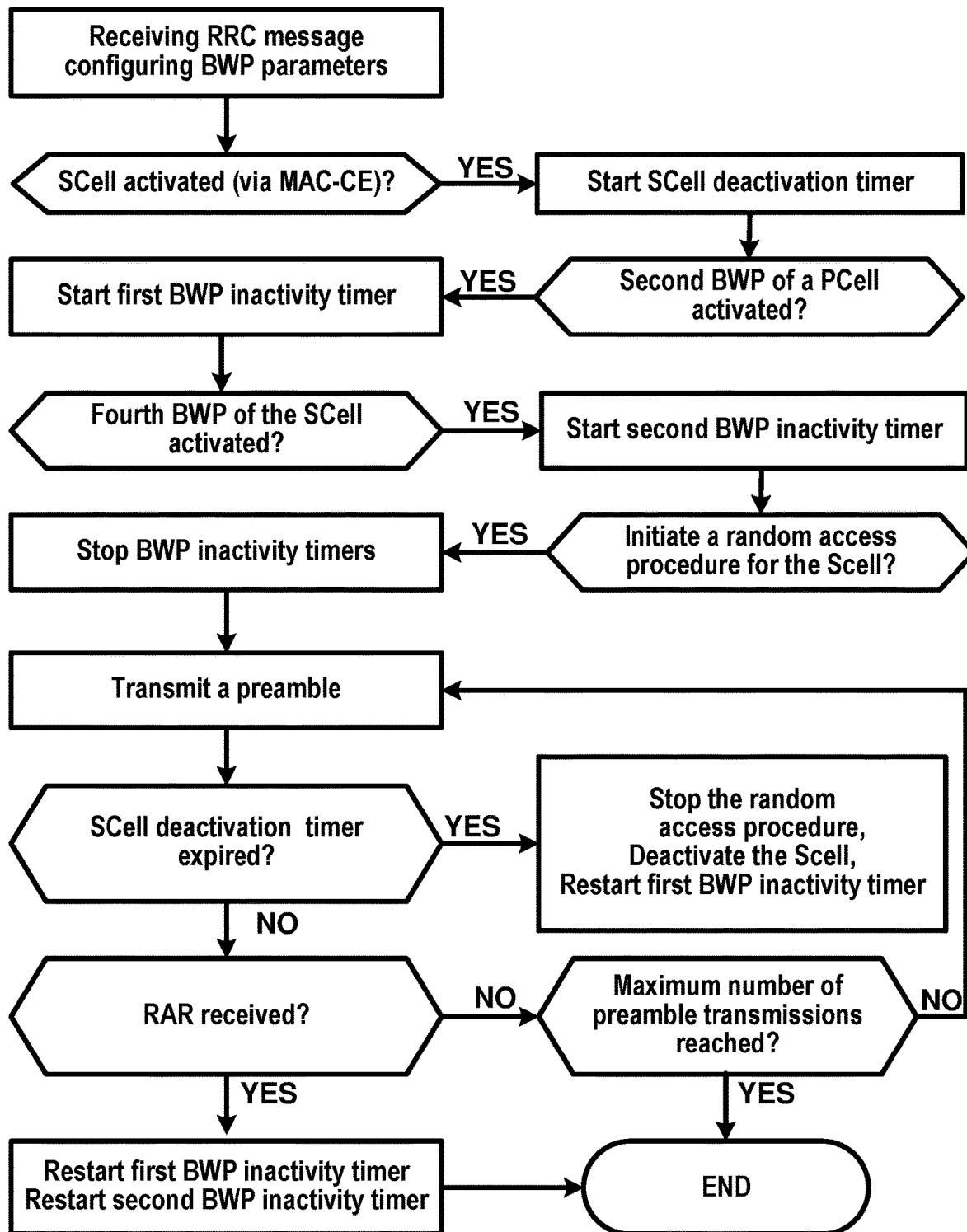
FIG. 38 is an example flowchart of random access procedure for a bandwidth part in carrier aggregation as per an aspect of an embodiment of the present disclosure.

FIG. 37 is an example of downlink beam failure recovery procedure for a bandwidth part as per an aspect of an embodiment of the present disclosure. FIG. 38 is a flow diagram of the downlink beam failure recovery procedure disclosed in FIG. 37. A wireless device may receive, from a base station, one or more messages comprising configuration parameters (time T0). The one or more messages may comprise one or more RRC messages (e.g. RRC connection reconfiguration message, or RRC connection reestablishment message, or RRC connection setup message). In an example, the configuration parameters may comprise configuration parameters for a primary cell and one or more secondary cells. The one or more secondary cells may comprise a first secondary cell. In an example, the configuration parameters may comprise bandwidth part (BWP) configuration parameters for a plurality of BWPs. The plurality of BWPs may comprise a first plurality of BWPs of the primary cell comprising a first DL BWP, a first BWP (e.g. UL BWP) and a second BWP (e.g. DL BWP). The plurality of BWPs may comprise a second plurality of BWPs of the first secondary cell comprising a second DL BWP, a third BWP (e.g. UL BWP) and a fourth BWP (e.g. DL BWP).

In an example, a wireless device may be configured with carrier aggregation (CA). A base station may transmit, to the wireless device, an SCell Activation/Deactivation MAC CE activating the first secondary cell. In response to receiving the SCell Activation/Deactivation MAC CE, the wireless device may activate the first secondary cell. In an example, in response to receiving the SCell Activation/Deactivation MAC CE, the wireless device may start or restart a SCell deactivation timer associated with the first secondary cell (time T1).

In an example, a wireless device may receive a first DCI indicating switching a first active BWP of the primary cell from the first DL BWP to the second BWP (time T2). In an example, the first DCI may comprise a first BWP indicator. The wireless device may determine that the first DCI indicates BWP switching in response to the first BWP indicator indicating a BWP different from the first active BWP. The wireless device may start a first inactivity timer in response to switching the first active BWP from the first DL BWP to the second BWP (time T2).

In an example, a wireless device may receive a second DCI indicating switching a second active BWP of the first secondary cell from the second DL BWP to the fourth BWP (time T3). In an example, the second DCI may comprise a second BWP indicator. The wireless device may determine that the second DCI indicates BWP switching in response to the second BWP indicator indicating a BWP different from the second active BWP. The wireless device may start a second inactivity timer in response to switching the second active BWP from the second DL BWP to the fourth BWP (time T3).

In an example, the wireless device may transmit a random access preamble (time T5) via the third BWP (e.g., active BWP) of the first secondary cell in response to initiating a random access procedure (e.g. contention free random access) for the first secondary cell (time T4). In an example, the random access preamble may be dedicated to the wireless. In an example, the random access preamble may be UE-specific and may be configured for the wireless device by the base station. In an example, the random access procedure may be for a beam failure recovery of the fourth BWP of the first secondary cell.

In an example, in response to the initiating the random access procedure, the wireless device may stop a first inactivity timer of the second BWP of the primary cell and a second inactivity timer of the fourth BWP of the first secondary cell (time T4). The wireless device may start a response window (e.g. ra-ResponseWindow) at a first PDCCH occasion from the end of the transmitting the random access preamble (time T5). In an example, the first PDCCH occasion may be on the second BWP of the primary cell. The response window may be configured by a higher layer (e.g. MAC, RRC). The wireless device may monitor the first PDCCH occasion for a third DCI while the response window is running In an example, an SCell deactivation timer of the first secondary cell may expire while the random access procedure is ongoing (time T6). In response to an expiry of the SCell deactivation timer of the first secondary cell while the random access procedure is ongoing, the wireless device may stop the second inactivity timer of the fourth BWP (if running). In an example, in response to an expiry of the SCell deactivation timer of the first secondary cell while the random access procedure is ongoing, the wireless device may restart the first inactivity timer of the second BWP of the primary cell.

In an example, restarting the first inactivity timer of the second BWP of the primary cell in response to an expiry of the SCell deactivation timer of the first secondary cell may decrease a power consumption of a wireless device.

In an example embodiment, a wireless device may receive one or more messages comprising configuration parameters. The one or more messages may comprise one or more RRC messages. The configuration parameters may comprise one or more beam failure recovery (BFR) configuration parameters of a serving cell. The one or more BFR configuration parameters may comprise a first set of RS resource configurations. The first set of RS resource configurations may comprise one or more first RSs (e.g., CSI-RS or SS blocks). The one or more BFR configuration parameters may further comprise a second set of RS resource configurations comprising one or more second RSs (e.g., CSI-RS or SS blocks). The wireless device may measure radio link quality of one or more beams associated with the one or more first RSs and/or the one or more second RSs. In an example, the one or more configuration parameters may further indicate radio resources of a dedicated coreset.

In an example, the wireless device may assess a first radio link quality of the one or more first RSs against a first threshold. In an example, the first threshold (e.g. hypothetical BLER, L1-RSRP) may be a first value provided by a higher layer (e.g. RRC, MAC). The wireless device may monitor at least one PDCCH. At least one RS (e.g., DM-RS) of the at least one PDCCH may be associated with (e.g., QCLed) the one or more first RSs.

A wireless device may detect a beam failure on the serving cell when the first radio link quality of the one or more first RSs meets certain criteria. For example, a beam failure may occur when RSRP/SINR of the one or more first RSs is lower than the first threshold and/or BLER is higher than the first threshold. The assessment may be for a consecutive number of times with a value provided by a higher layer (e.g. RRC, MAC).

In response to detecting the beam failure on the serving cell, the wireless device may initiate a random access procedure for a beam failure recovery (BFR) procedure of the serving cell. In an example, in response to initiating the random access procedure, the wireless device may initiate a candidate beam identification procedure if configured with the second set of RS resource configurations. In an example, the wireless device may not initiate a candidate beam identification procedure if not configured with the BFR configuration parameters (e.g., contention free random access resources for BFR). In an example, the wireless device may not initiate a candidate beam identification procedure if not configured with the second set of RS resource configurations.

For the candidate beam identification procedure, the wireless device may identify a first RS in the one or more second RSs. In an example, a second radio link quality (e.g. BLER, L1-RSRP) of the first RS may be better (e.g. lower BLER or higher L1-RSRP or higher SINR) than a second threshold. In the example, the second threshold may be a second value provided by the higher layer (e.g. RRC, MAC).

In an example, the wireless device may not identify a first RS in the one or more second RSs with a second radio link quality better than a second threshold. In response to not identifying the first RS, the wireless device may initiate a contention-based random access for a beam failure recovery.

In an example, in response to detecting the beam failure and not identifying the first RS, the wireless device may initiate a beam failure recovery request (BFRQ) transmission. The BFRQ transmission may comprise transmitting, in a first slot, the at least one preamble via the at least one PRACH resource for the BFR procedure. In an example, the at least one preamble may not be UE-specific. In an example, the at least one PRACH resource for the BFR procedure may not be UE-specific (e.g. shared by other users). In response to transmitting the at least one preamble in the first slot, the wireless device may start, from a second slot, monitoring for a BFR response. The monitoring for the BFR response may comprise monitoring at least one second PDCCH in one or more dedicated coresets associated for a second DCI (e.g. a downlink assignment or an uplink grant) within a configured response window. The second DCI may be with CRC scrambled by a C-RNTI of the wireless device. In an example, the one or more dedicated coresets may be configured by the base station to the wireless device via by the one or more configuration parameters. In an example, the one or more dedicated coresets may be used for a random access procedure for a BFR. In an example, the random access procedure may be contention-free random access or contention-based random access.

In an example, in response to receiving the second DCI on the at least one second PDCCH in the one or more dedicated coresets, within the configured response window, the random access procedure for the BFR procedure may be successfully completed.

Example embodiments also enhance existing BFR procedures for SCells. In an example, a wireless device may stop/abort an ongoing BFR procedure of an SCell in response to an expiry of SCellDeactivationTimer. In an example, a wireless device may stop and/or reset SCellDeactivationTimer in response to initiating a BFR procedure. The SCellDeactivationTimer may be restarted when the BFR procedure is completed. In an example, a wireless device may restart SCellDeactivationTimer, during an ongoing BFR procedure, in response to an expiry of the SCellDeactivationTimer. In an example, a wireless device may not deactivate an SCell in response to an expiry of SCellDeactivationTimer while a BFR procedure is ongoing.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 39:
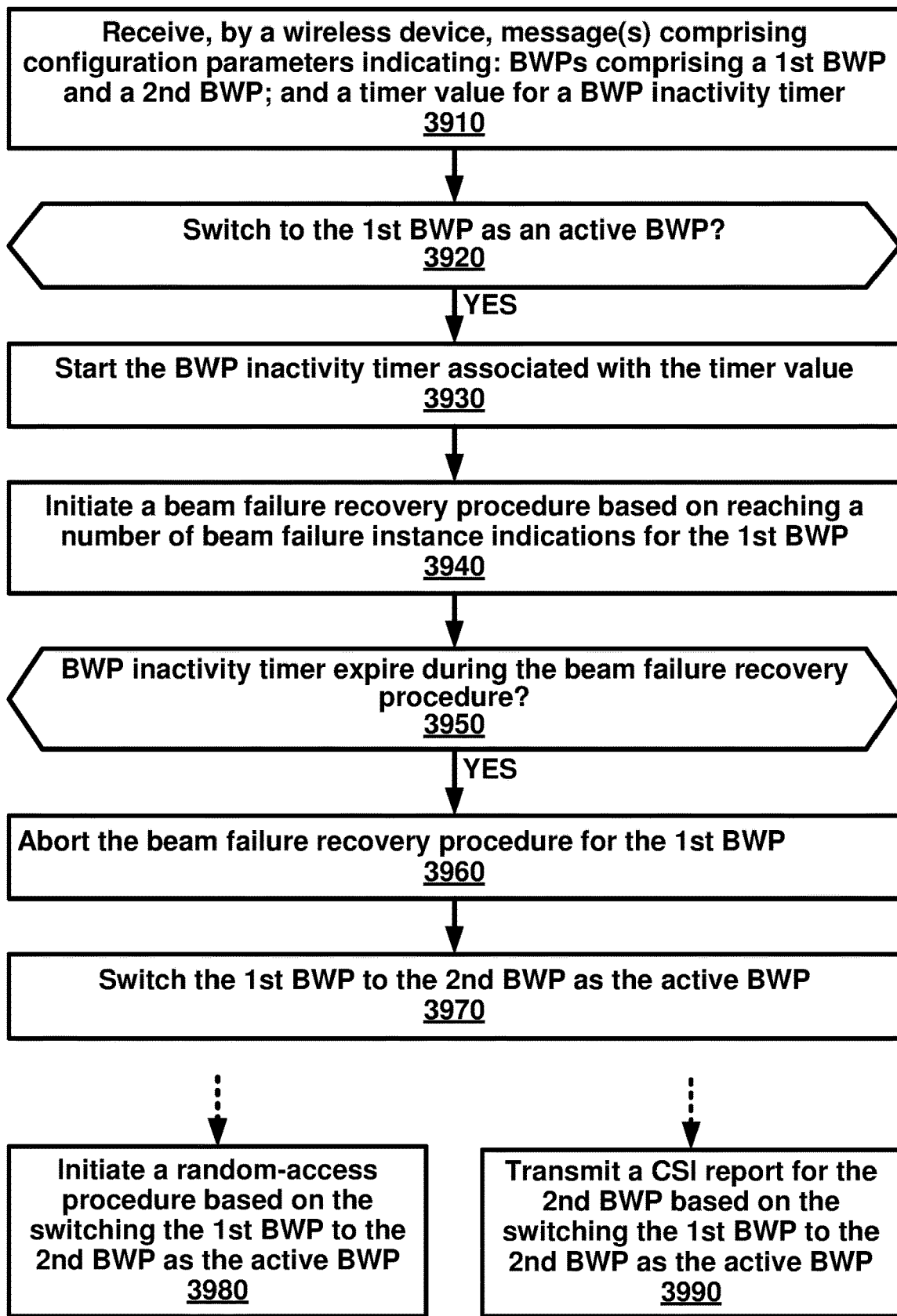
FIG. 39 is a flow diagram of aspects of embodiments of the present disclosure.

FIG. 39 is an example flow diagram as per an aspect of an embodiment of the present disclosure. At 3910, a wireless device may receive one or more messages comprising configuration parameters. The configuration parameters may indicate: a plurality of bandwidth parts (BWPs) comprising a first BWP and a second BWP; and a timer value for a BWP inactivity timer. At 3930, the BWP inactivity timer associated with the timer value may be started in response to switching to the first BWP as an active BWP at 3920. At 3940, a beam failure recovery procedure may be initiated based on reaching a number of beam failure instance indications for the first BWP. Based on an expiry of the BWP inactivity timer during the beam failure recovery procedure at 3950, the beam failure recovery procedure for the first BWP aborted at 3960, and the first BWP may be switched to the second BWP as the active BWP at 3970. According to an example embodiment, a random-access procedure may be initiated at 3980 based on the switching of the first BWP to the second BWP as the active BWP (at 3970). According to an example embodiment, a channel state information (CSI) report for the second BWP may be transmitted at 3990 based on the switching the first BWP to the second BWP as the active BWP (at 3970).

According to an example embodiment, the first BWP may be a non-default BWP. According to an example embodiment, the second BWP may be a default BWP. According to an example embodiment, the configuration parameters may further indicate a beam failure recovery timer. According to an example embodiment, the beam failure recovery timer may start based on the initiating the beam failure recovery procedure. According to an example embodiment, the beam failure recovery timer may stop based on the expiry of the BWP inactivity timer. According to an example embodiment, the wireless device may stop monitoring at least one downlink control channel of the first BWP based on the switching the first BWP to the second BWP as the active BWP. According to an example embodiment, the wireless device may start monitoring at least one second downlink control channel of the second BWP based on the switching the first BWP to the second BWP as the active BWP. According to an example embodiment, the configuration parameters may further indicate one or more reference signals for the first BWP. According to an example embodiment, the one or more reference signals may comprise one or more channel state information reference signals. According to an example embodiment, one or more reference signals may comprise one or more synchronization signal/physical broadcast channel blocks. According to an example embodiment, the configuration parameters may further indicate the number of beam failure instance indications for the first BWP. According to an example embodiment, a beam failure instance indication of the beam failure instance indications may comprise an assessment of one or more reference signals with radio quality lower than a threshold. According to an example embodiment, the configuration parameters may further indicate the threshold. According to an example embodiment, the threshold may be based on a hypothetical block error rate. According to an example embodiment, the initiation of the beam failure recovery procedure may comprise transmitting an uplink signal for the beam failure recovery procedure via an uplink resource. According to an example embodiment, the uplink resource may comprise a physical uplink control channel resource. According to an example embodiment, the uplink resource may comprise a physical uplink shared channel resource.

Figure 40:
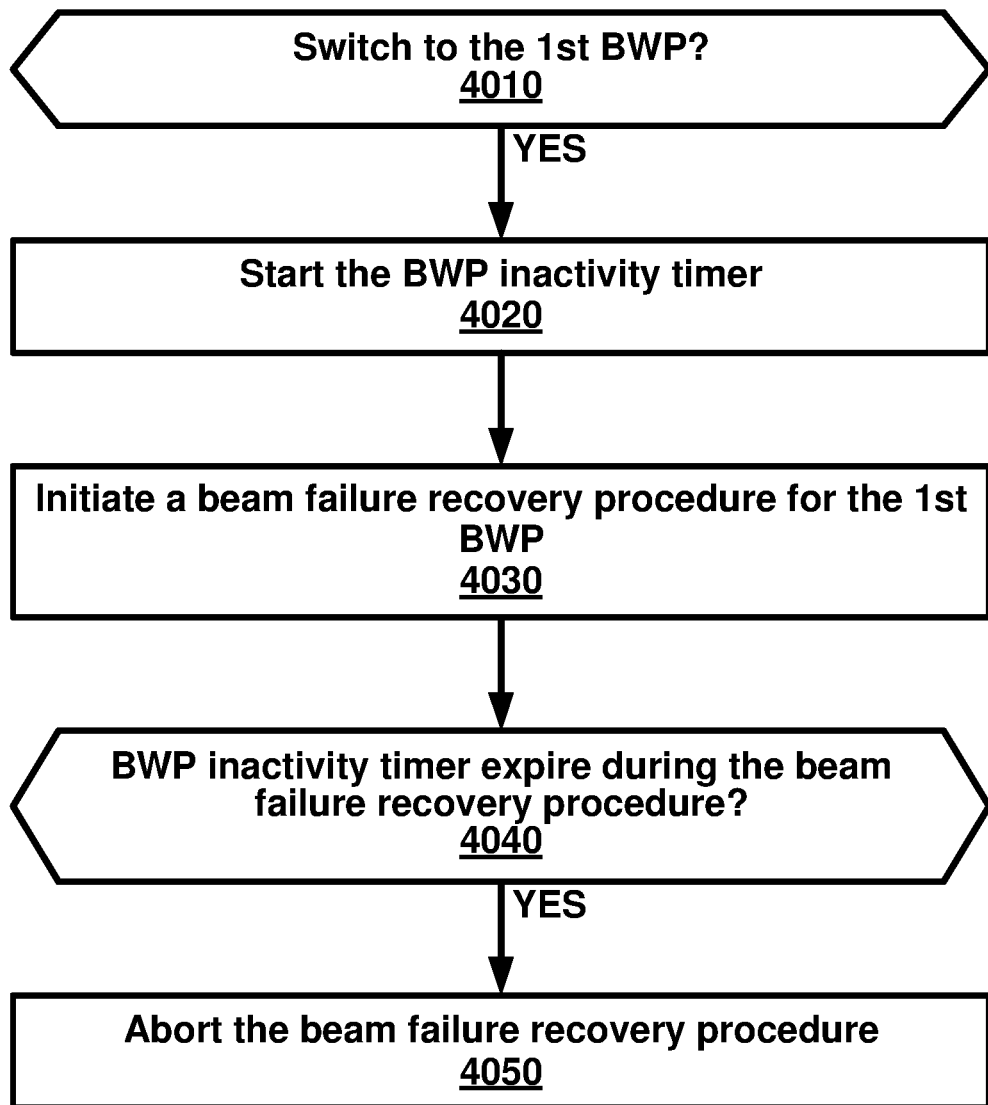
FIG. 40 is a flow diagram of an aspect of an embodiment of the present disclosure.

FIG. 40 is an example flow diagram as per an aspect of an embodiment of the present disclosure. A bandwidth part (BWP) inactivity timer may be started at 4020 based on switching to a first BWP at 4010. At 4030, a beam failure recovery procedure may be initiated for the first BWP. At 4050, the beam failure recovery procedure may be aborted, based on an expiry of the BWP inactivity timer during the beam failure recovery procedure (4040).

Figure 41:
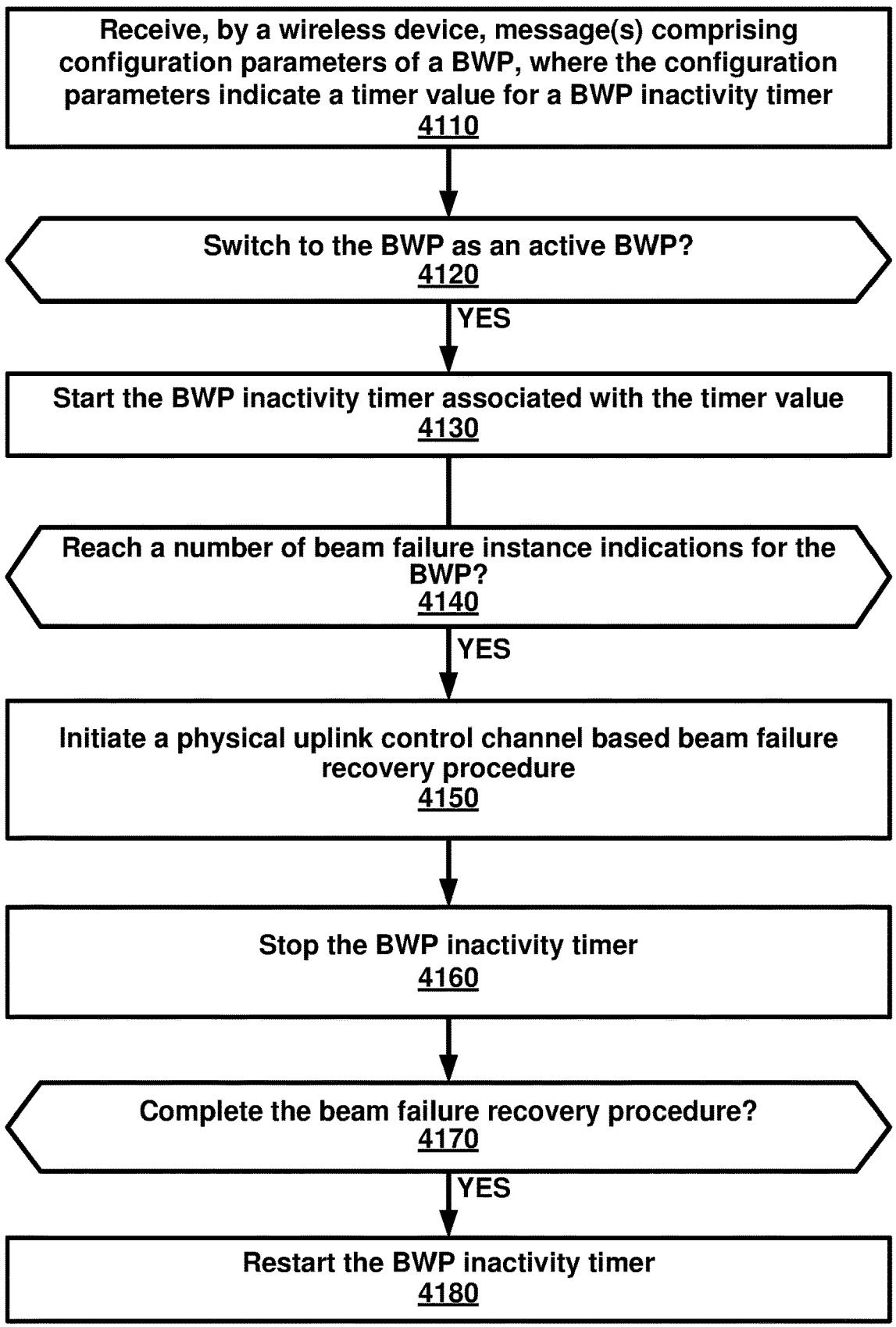
FIG. 41 is a flow diagram of an aspect of an embodiment of the present disclosure.

FIG. 41 is an example flow diagram as per an aspect of an embodiment of the present disclosure. At 4110, a wireless device may receive one or more messages comprising configuration parameters of a bandwidth part (BWP). The configuration parameters may indicate a timer value for a BWP inactivity timer. At 4130, the BWP inactivity timer associated with the timer value may be started in response to switching to the BWP as an active BWP (4120). At 4150, a physical uplink control channel based beam failure recovery procedure may be initiated based on reaching a number of beam failure instance indications for the BWP (4140). At 4160, the BWP inactivity timer may be stopped based on the initiating the physical uplink control channel based beam failure recovery procedure. At 4180, the BWP inactivity timer may be restarted in response to completing the beam failure recovery procedure (4170).

Figure 42:
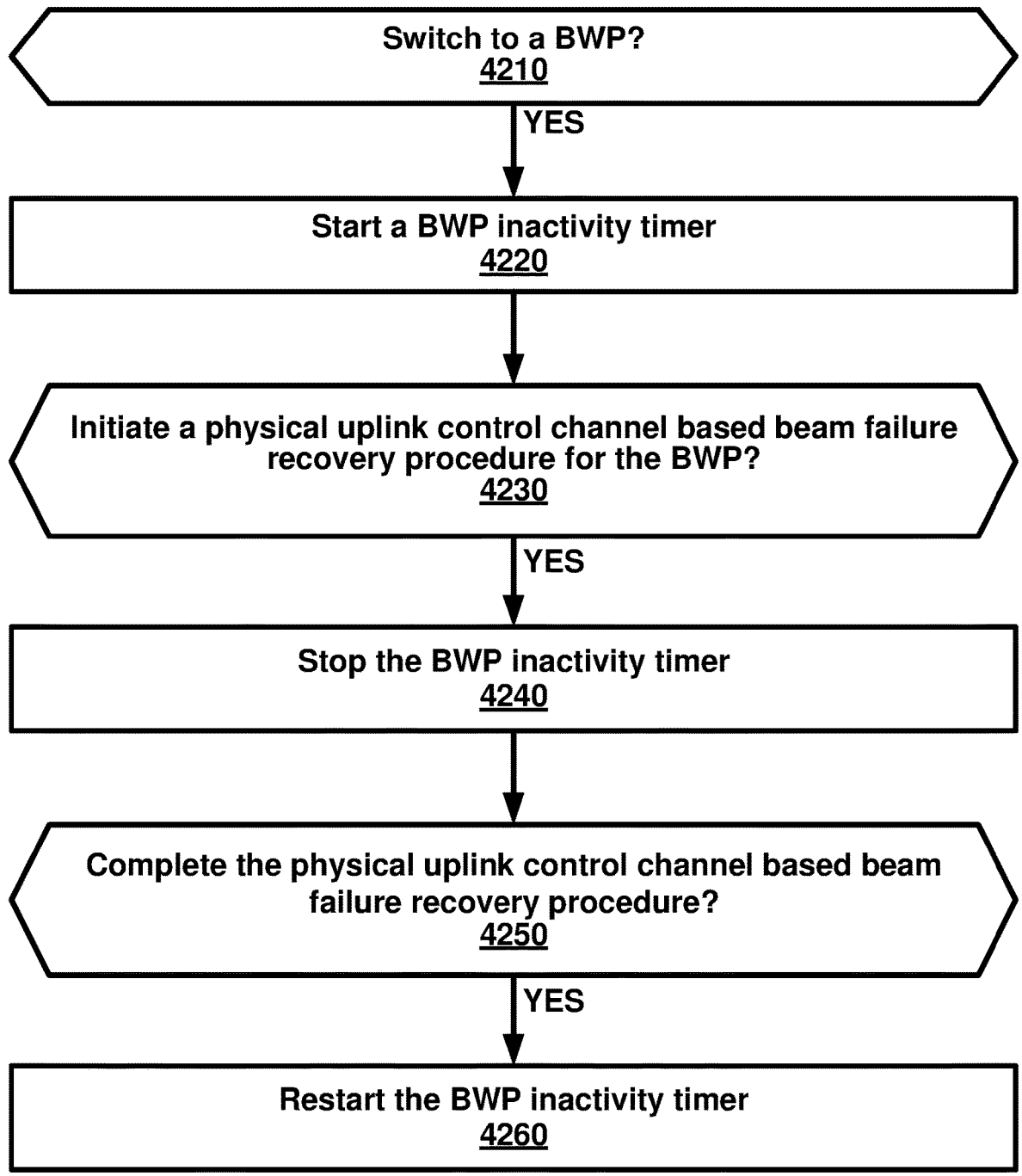
FIG. 42 is a flow diagram of an aspect of an embodiment of the present disclosure.

FIG. 42 is an example flow diagram as per an aspect of an embodiment of the present disclosure. At 4220, a bandwidth part (BWP) inactivity timer may be started based on switching to a BWP (4110). At 4240, the BWP inactivity timer may be stopped based on initiating a physical uplink control channel based beam failure recovery procedure for the BWP (4230). At 4260, the BWP inactivity timer may be restarted based on completing the physical uplink control channel based beam failure recovery procedure (4250).

FIG. 43 is an example flow diagram as per an aspect of an embodiment of the present disclosure. At 4310, a wireless device may receive one or more messages comprising configuration parameters. The configuration parameters may indicate: a plurality of bandwidth parts (BWPs) comprising a first BWP and a second BWP; and a parameter indicating a first period of time. At 4320, the first BWP may be switched to as an active BWP. At 4340, a beam failure recovery procedure may be initiated based on reaching a number of beam failure instance indications for the first BWP (4330). At 4360, the active BWP may switch from the first BWP to the second BWP during the beam failure recovery procedure based on not receiving any downlink control information (DCI) for the first BWP during the first period of time (4350). At 4370, the beam failure recovery procedure for the first BWP may be aborted based on the switching.

Figure 44:
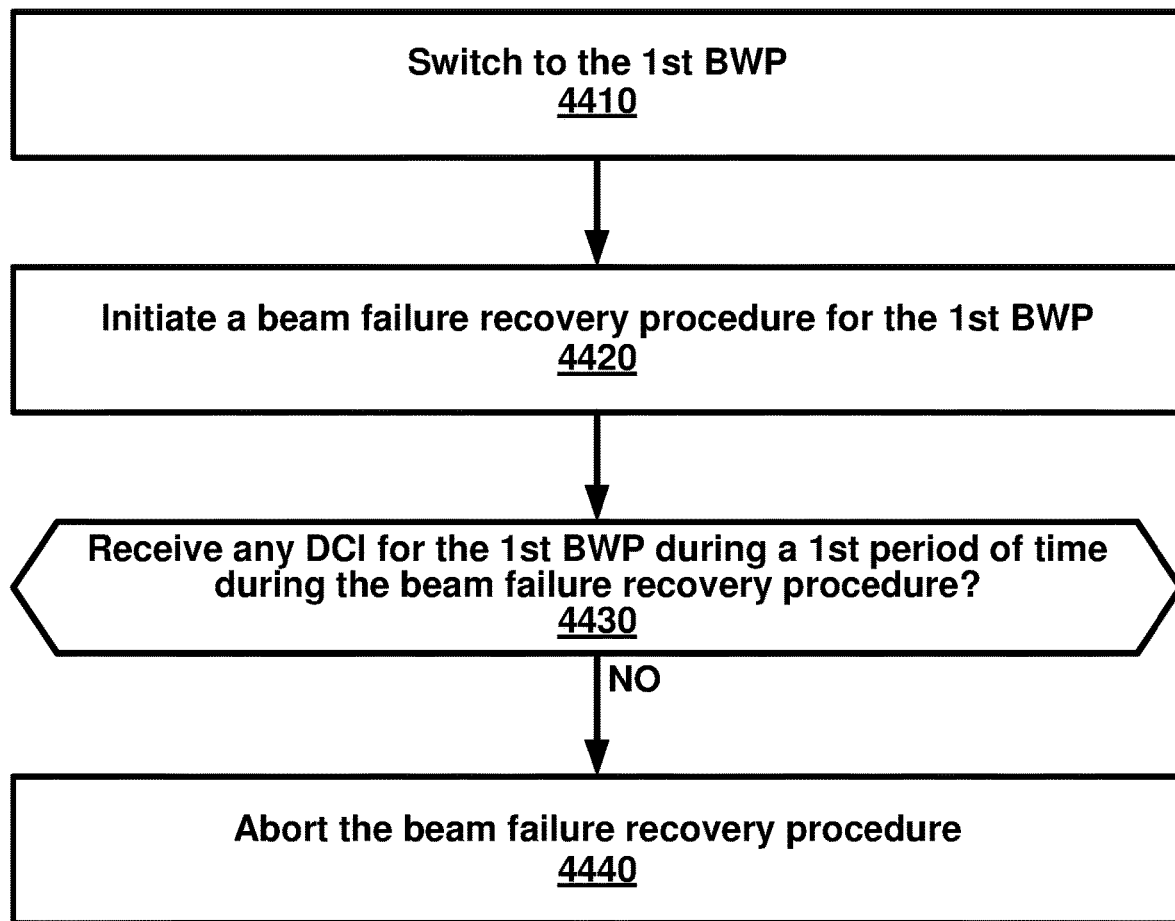
FIG. 44 is a flow diagram of an aspect of an embodiment of the present disclosure.

FIG. 44 is an example flow diagram as per an aspect of an embodiment of the present disclosure. At 4410, a device may switch to a first bandwidth part (BWP). At 4420, a beam failure recovery procedure may be initiated for the first BWP. At 4440, the beam failure recovery procedure may be aborted during the beam failure recovery procedure, based on not receiving any downlink control information (DCI) for the first BWP during a first period of time (4430).

Figure 45:
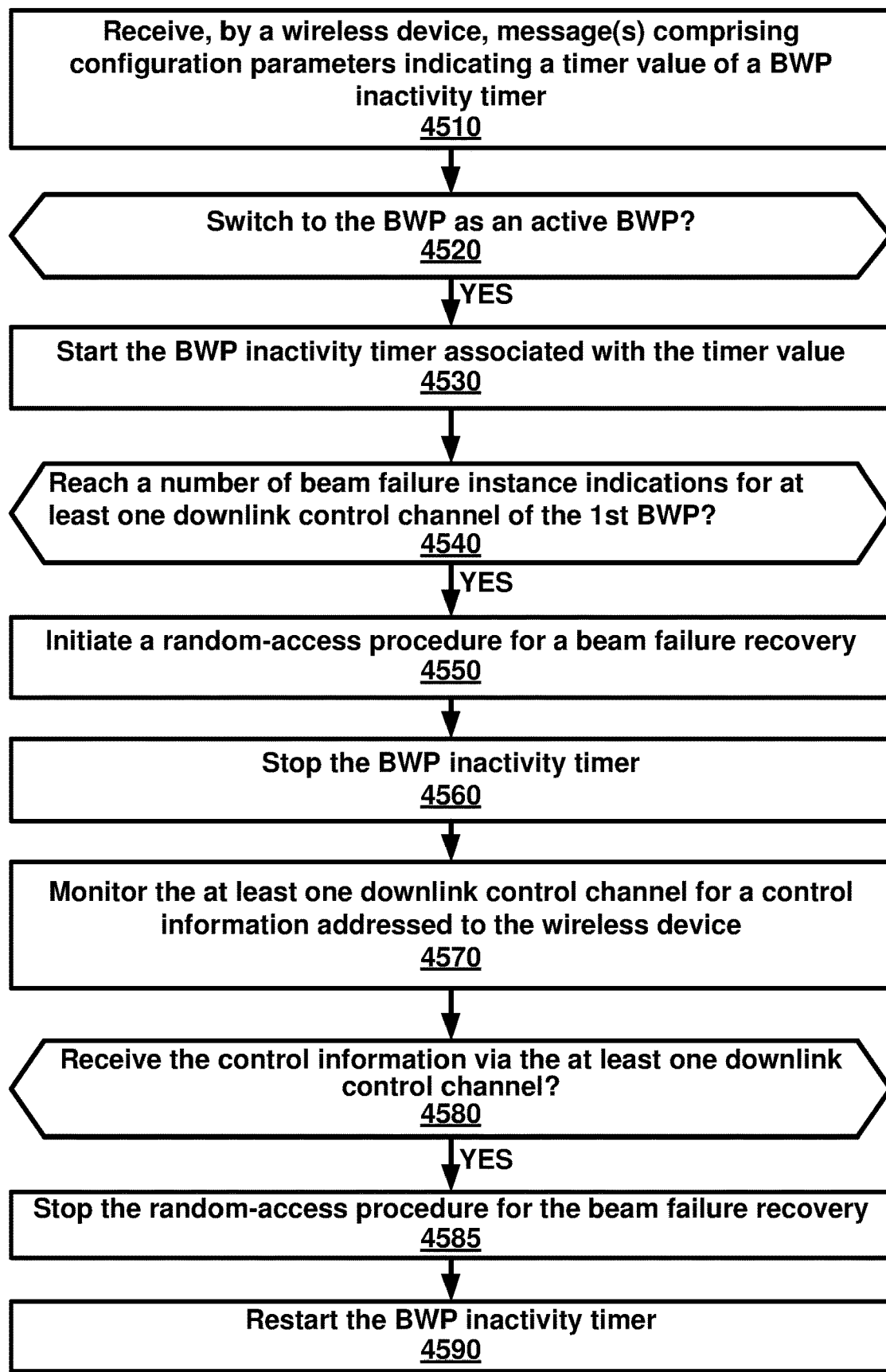
FIG. 45 is a flow diagram of an aspect of an embodiment of the present disclosure.
Figure 46:
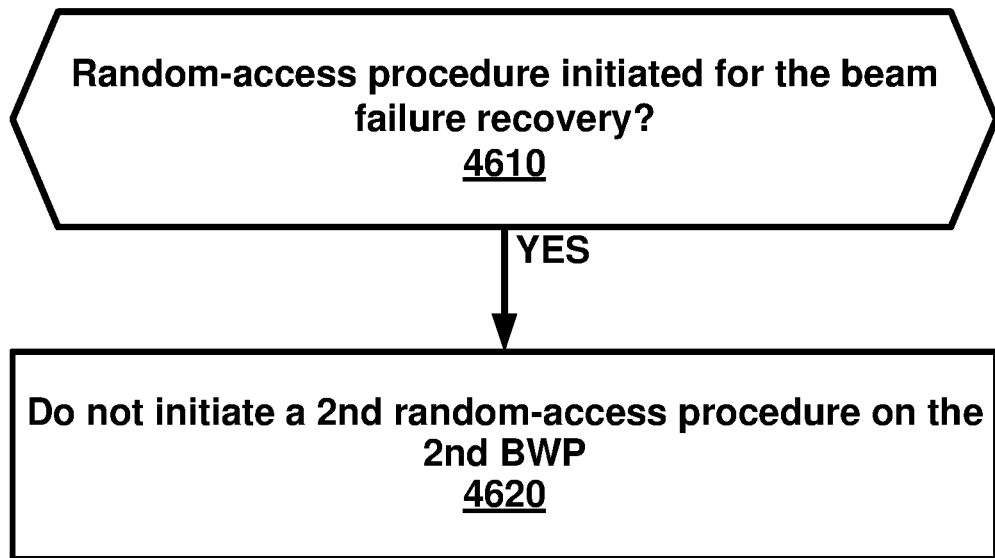
FIG. 46 is a flow diagram of an aspect of an embodiment of the present disclosure.

FIG. 45 is an example flow diagram as per an aspect of an embodiment of the present disclosure. At 4510, a wireless device may receive one or more messages comprising configuration parameters. The configuration parameters may indicate a timer value of a bandwidth part (BWP) inactivity timer. At 4530, the BWP inactivity timer associated with the timer value may be started in response to switching to a first BWP as an active BWP (4520). At 4550, a random-access procedure for a beam failure recovery may be initiated based on reaching a number of beam failure instance indications for at least one downlink control channel of the first BWP (4540). At 4560, the BWP inactivity timer may be stopped based on initiation of the random-access procedure. At 4570, the at least one downlink control channel may be monitored for control information addressed to the wireless device. At 4585, the random-access procedure for the beam failure recovery may be stopped in response to receiving the control information via the at least one downlink control channel (4580). At 4590, the BWP inactivity timer may be restarted based on the stopping of the random-access procedure. According to an example embodiment, action 4590 may continue at 4620 where a second random-access procedure may not be initiated on the second BWP based on the random-access procedure being initiated for the beam failure recovery (4610).

According to an example embodiment, the control information may be addressed to a configured scheduling radio network temporary identifier (CS-RNTI) of the wireless device. According to an example embodiment, the first BWP may switch to a second BWP based on the control information indicating the second BWP. According to an example embodiment, the first BWP may be a non-default BWP. According to an example embodiment, the configuration parameters may further indicate one or more reference signals for the first BWP. According to an example embodiment, the one or more reference signals may comprise one or more channel state information reference signals. According to an example embodiment, the one or more reference signals may comprise one or more synchronization signal/physical broadcast channel blocks. According to an example embodiment, the configuration parameters may further indicate the number of first BWP beam failure instance indications. According to an example embodiment, a beam failure instance indication of the first BWP beam failure instance indications may comprise an assessment of one or more reference signals with radio quality lower than a threshold. According to an example embodiment, the configuration parameters may further indicate the threshold. According to an example embodiment, the threshold may be based on a hypothetical block error rate. According to an example embodiment, the restarting of the BWP inactivity timer may further comprise restarting the BWP inactivity timer based on the timer value. According to an example embodiment, the control information may comprise an uplink grant or a downlink assignment. According to an example embodiment, the switching to the first BWP as the active BWP may be based on receiving a downlink control information indicating the first BWP. According to an example embodiment, the initiation of the random-access procedure may comprise transmitting a preamble via an uplink resource. According to an example embodiment, the uplink resource may be a physical random-access channel resource. According to an example embodiment, the configuration parameters may further indicate a dedicated control resource set. According to an example embodiment, the dedicated control resource set may be monitored for a second control information for the beam failure recovery. According to an example embodiment, completing the random-access procedure for the beam failure recovery may be based on receiving the second control information in the dedicated control resource set.

Figure 47:
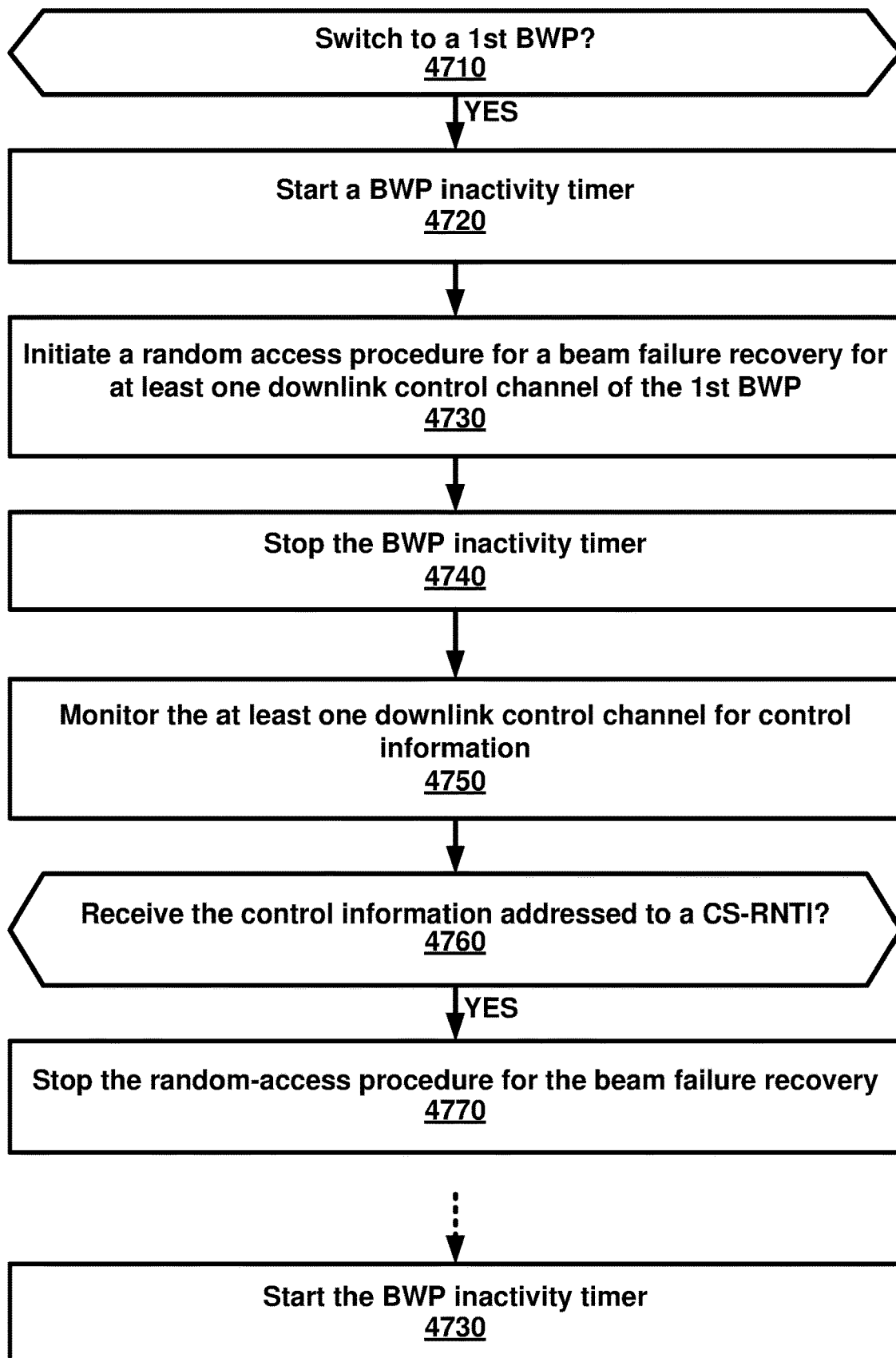
FIG. 47 is a flow diagram of aspects of embodiments of the present disclosure.

FIG. 47 is an example flow diagram as per an aspect of an embodiment of the present disclosure. At 4720, a bandwidth part (BWP) inactivity timer may be started based on switching to a first BWP (4710). At 4740, the BWP inactivity timer may be stopped based on an initiation of a random access procedure for a beam failure recovery for at least one downlink control channel of the first BWP at 4730. At 4750, the at least one downlink control channel may be monitored for a control information. At 4770, the random-access procedure for the beam failure recovery may be stopped based on receiving the control information (4760). According to an example embodiment, the BWP inactivity timer may be started based on stopping the random-access procedure.

Figure 48:
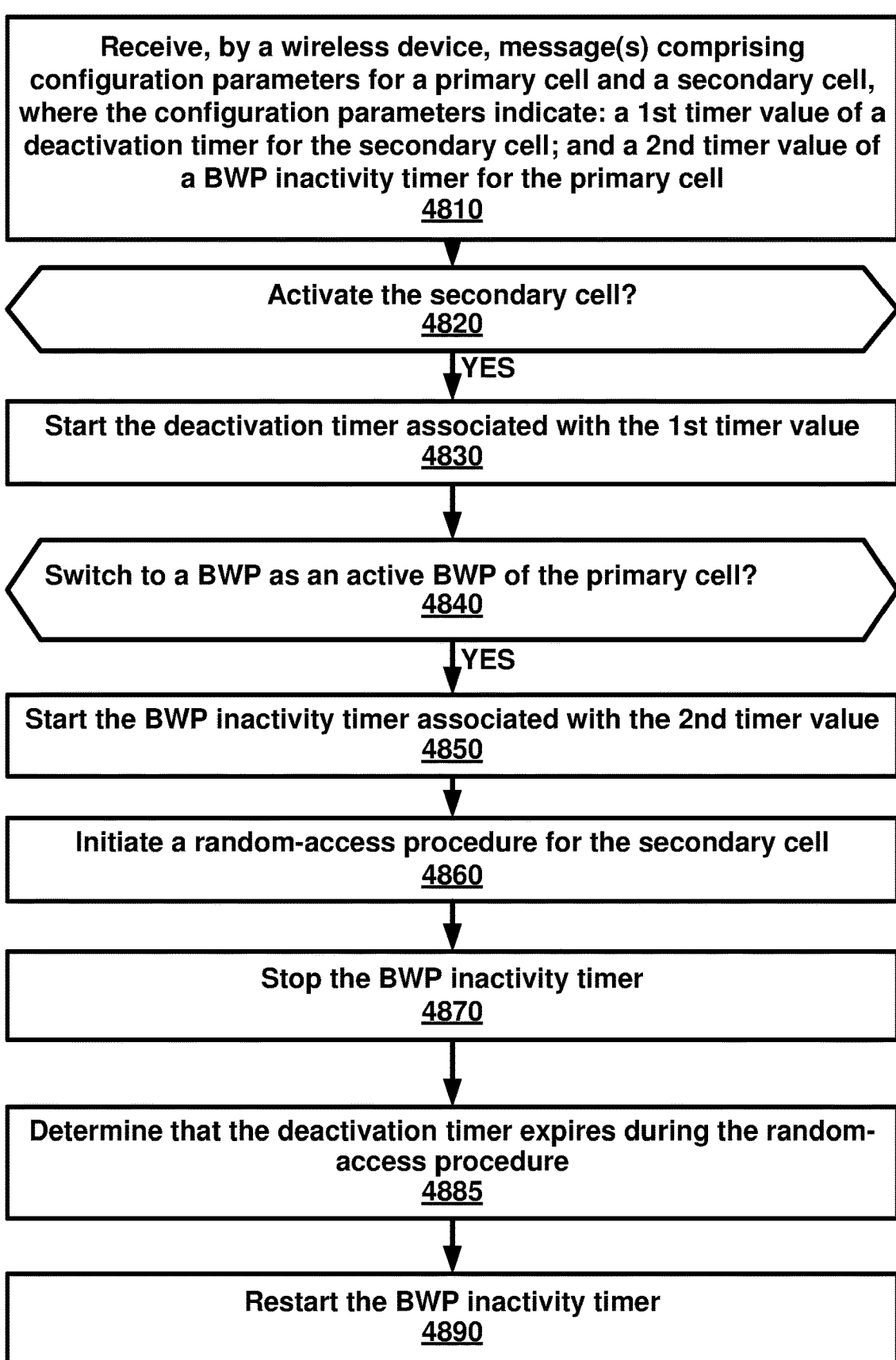
FIG. 48 is a flow diagram of an aspect of an embodiment of the present disclosure.

FIG. 48 is an example flow diagram as per an aspect of an embodiment of the present disclosure. At 4810, a wireless device may receive one or more messages comprising configuration parameters for a primary cell and a secondary cell. The configuration parameters may indicate: a first timer value of a deactivation timer for the secondary cell; and a second timer value of a bandwidth part (BWP) inactivity timer for the primary cell. At 4830, the deactivation timer associated with the first timer value may be started in response to activating the secondary cell (4820). At 4850, the BWP inactivity timer associated with the second timer value may be started in response to switching to a BWP as an active BWP of the primary cell (4830). At 4860, a random-access procedure may be initiated for the secondary cell. At 4870, the BWP inactivity timer may be stopped based on the initiation of the random-access procedure. At 4885, a determination may be made that the deactivation timer expired during the random-access procedure. At 4890, the BWP inactivity timer may be restarted in response to the determination.

Figure 49:
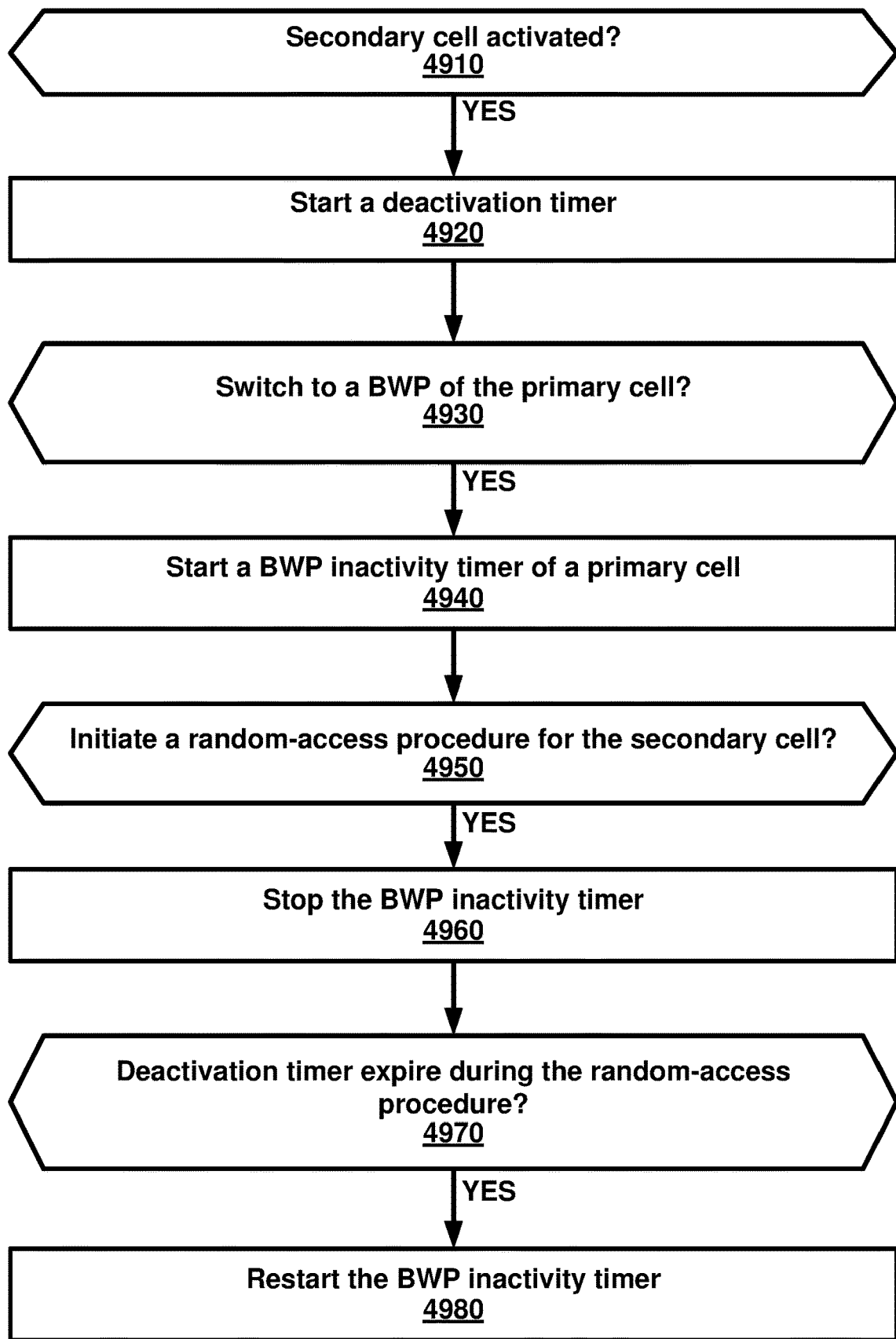
FIG. 49 is a flow diagram of an aspect of an embodiment of the present disclosure.

FIG. 49 is an example flow diagram as per an aspect of an embodiment of the present disclosure. At 4920, a deactivation timer may be started based on activating a secondary cell (4910). At 4940, a bandwidth part (BWP) inactivity timer of a primary cell may be started based on switching to a BWP of the primary cell (4930). At 4960, the BWP inactivity timer may be stopped based on initiating a random-access procedure for the secondary cell (4950). At 4980, the BWP inactivity timer may be restarted based on the deactivation timer expiring during the random-access procedure (4970).

Figure 50:
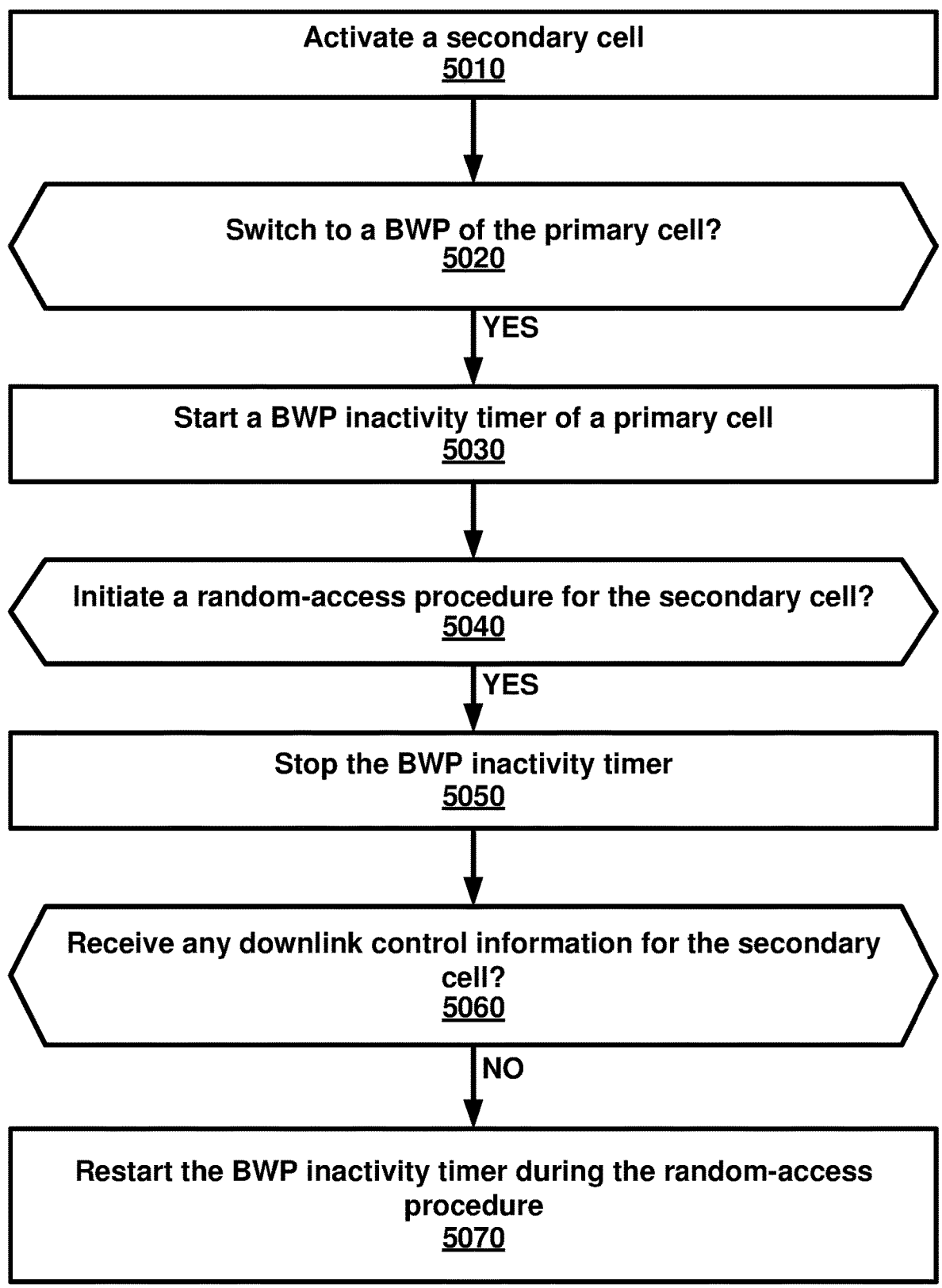
FIG. 50 is a flow diagram of an aspect of an embodiment of the present disclosure.

FIG. 50 is an example flow diagram as per an aspect of an embodiment of the present disclosure. At 5010, a secondary cell may be activated. At 5030, a bandwidth part (BWP) inactivity timer of a primary cell may be started based on switching to a BWP of the primary cell (5020). At 5050, the BWP inactivity timer may be stopped based on initiation of a random-access procedure for the secondary cell (5040). At 5070, the BWP inactivity timer may be restarted during the random-access procedure based on not receiving any downlink control information for the secondary cell (5060).

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
receiving, by a wireless device, one or more messages comprising configuration parameters indicating:
a plurality of bandwidth parts (BWPs) comprising a first BWP and a second BWP of a cell; and
a timer value for a BWP inactivity timer;
starting the BWP inactivity timer associated with the timer value in response to switching to the first BWP as an active BWP;
initiating a beam failure recovery procedure based on reaching a number of beam failure instance indications for the first BWP, wherein the initiating the beam failure recovery procedure for the cell comprises transmitting at least one beam failure recovery signal for the beam failure recovery procedure via a physical uplink control channel (PUCCH); and
based on an expiry of the BWP inactivity timer during the beam failure recovery procedure:
aborting the beam failure recovery procedure for the cell initiated via the PUCCH by not transmitting at least one subsequent beam failure recovery signal via the second BWP; and
switching the first BWP to the second BWP as the active BWP.

2. The method of claim 1, further comprising initiating a random-access procedure based on the switching the first BWP to the second BWP as the active BWP.

3. The method of claim 1, further comprising transmitting a channel state information (CSI) report for the second BWP based on the switching the first BWP to the second BWP as the active BWP.

4. The method of claim 1, wherein the first BWP is a non-default BWP.

5. The method of claim 1, wherein the second BWP is a default BWP.

6. The method of claim 1, wherein the configuration parameters further indicate a beam failure recovery timer.

7. The method of claim 6, further comprising starting the beam failure recovery timer based on the initiating the beam failure recovery procedure.

8. The method of claim 6, further comprising stopping the beam failure recovery timer based on the expiry of the BWP inactivity timer.

9. The method of claim 1, further comprising stopping monitoring, by the wireless device, at least one downlink control channel of the first BWP based on the switching the first BWP to the second BWP as the active BWP.

10. The method of claim 1, further comprising starting monitoring, by the wireless device, at least one second downlink control channel of the second BWP based on the switching the first BWP to the second BWP as the active BWP.

11. The method of claim 1, wherein the configuration parameters further indicate one or more reference signals for the first BWP.

12. The method of claim 11, wherein the one or more reference signals comprise one or more channel state information reference signals.

13. The method of claim 11, wherein the one or more reference signals comprise one or more synchronization signal/physical broadcast channel blocks.

14. The method of claim 1, wherein the configuration parameters further indicate the number of beam failure instance indications for the first BWP.

15. The method of claim 14, wherein a beam failure instance indication of the beam failure instance indications comprises an assessment of one or more reference signals with radio quality lower than a threshold.

16. The method of claim 15, wherein the configuration parameters further indicate the threshold.

17. The method of claim 15, wherein the threshold is based on a hypothetical block error rate.

18. The method of claim 1, wherein the at least one beam failure recovery signal for the beam failure recovery procedure is transmitted via a PUCCH resource of the PUCCH.

* * * * *